US012763797B2

(12) United States Patent
Chen

(10) Patent No.: US 12,763,797 B2
(45) Date of Patent: Oct. 13, 2026

(54) SYSTEMS AND METHODS FOR CYCLIC REDUNDANCY CHECK ERROR CORRECTION USING MAJORITY VOTE

(71) Applicant: Avago Technologies International Sales Pte. Limited, Singapore (SG)

(72) Inventor: Juin-Hwey Chen, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/933,418

(22) Filed: Oct. 31, 2024

(65) Prior Publication Data

US 2026/0012206 A1 Jan. 8, 2026

Related U.S. Application Data

(60) Provisional application No. 63/667,485, filed on Jul. 3, 2024.

(51) Int. Cl.
*H03M 13/15* (2006.01)
*H03M 13/00* (2006.01)
(Continued)

(52) U.S. Cl.
CPC .......... *H03M 13/15* (2013.01); *H03M 13/09* (2013.01); *H03M 13/13* (2013.01);
(Continued)

(58) Field of Classification Search
CPC ...... H03M 13/15; H03M 13/09; H03M 13/13; H03M 13/6306; H04L 1/0052; H04L 1/0061; H04L 1/1816; H04L 9/00
(Continued)

(56) References Cited

U.S. PATENT DOCUMENTS 5,131,012 A 7/1992 Dravida
5,517,508 A 5/1996 Scott
(Continued)

FOREIGN PATENT DOCUMENTS

CN 113078985 A 7/2021
CN 113938248 B 1/2022
(Continued)

OTHER PUBLICATIONS

Non-Final Office Action on U.S. Appl. No. 18/933,457 Dtd Feb. 11, 2026.
(Continued)

*Primary Examiner* — John J Tabone, Jr.
(74) *Attorney, Agent, or Firm* — Foley & Lardner LLP

(57) ABSTRACT

An apparatus may receive a first copy, a second copy and a third copy of data including a cyclic redundancy check (CRC) code, determine that a number of one or more bit positions, at each of which at least two of the first copy, the second copy or the third copy have bit values different from each other, is greater than a threshold value, divide the one or more bit positions into a first set of bit positions corresponding to the threshold value and remaining bit positions, determine, among the remaining bit positions, a second set of bit positions at each of which both the second copy and the third copy have a same bit value different from a bit value at a corresponding bit position of the first copy, and correct, using the second set of bit positions, an error in the first copy.

20 Claims, 38 Drawing Sheets

3100

(51) Int. Cl.
*H03M 13/09* (2006.01)
*H03M 13/13* (2006.01)
*H04L 1/00* (2006.01)
*H04L 1/1812* (2023.01)
*H04L 9/00* (2022.01)

(52) U.S. Cl.
CPC ...... *H03M 13/6306* (2013.01); *H04L 1/0052* (2013.01); *H04L 1/0061* (2013.01); *H04L 1/1816* (2013.01); *H04L 9/00* (2013.01)

(58) Field of Classification Search
USPC .................... 714/758.76, 797, 799, 800, 821
See application file for complete search history.

(56) References Cited

U.S. PATENT DOCUMENTS

| | | | |
|---|---|---|---|
| 5,577,053 | A | 11/1996 | Dent |
| 5,745,502 | A | 4/1998 | Khayrallah et al. |
| 5,923,680 | A | 7/1999 | Brueckheimer et al. |
| 5,968,197 | A | 10/1999 | Doiron |
| 6,052,812 | A | 4/2000 | Chen et al. |
| 6,195,780 | B1 | 2/2001 | Dravida et al. |
| 6,427,219 | B1 | 7/2002 | Yang |
| 6,684,363 | B1 | 1/2004 | Cassiday et al. |
| 6,744,746 | B1 | 6/2004 | Bartelme |
| 6,754,824 | B1 | 6/2004 | Persson et al. |
| 6,802,038 | B1 | 10/2004 | Yu |
| 6,820,232 | B2 | 11/2004 | Kim et al. |
| 6,904,558 | B2 | 6/2005 | Cavanna et al. |
| 6,931,581 | B1 | 8/2005 | Cassiday et al. |
| 6,961,893 | B1 | 11/2005 | Mukund et al. |
| 7,353,446 | B2 | 4/2008 | Gorshe |
| 7,392,459 | B2 | 6/2008 | Bernadac et al. |
| 7,395,492 | B2 | 7/2008 | Dominique et al. |
| 7,398,451 | B2 | 7/2008 | Propp et al. |
| 7,496,825 | B2 | 2/2009 | Degn |
| 8,127,211 | B2 | 2/2012 | Richard |
| 8,196,015 | B2 | 6/2012 | Zivic et al. |
| 8,255,754 | B2 | 8/2012 | Tsfati et al. |
| 8,327,232 | B2 | 12/2012 | Budampati et al. |
| 8,392,808 | B2 | 3/2013 | Spencer et al. |
| 8,489,526 | B2 | 7/2013 | Cantin |
| 8,522,117 | B2 | 8/2013 | Hassan et al. |
| 8,522,121 | B2 | 8/2013 | Zopf |
| 8,555,135 | B2 | 10/2013 | Tran |
| 8,572,468 | B2 | 10/2013 | Furodet |
| 8,667,363 | B2 | 3/2014 | Steele et al. |
| 9,130,748 | B2 | 9/2015 | Bai et al. |
| 9,204,437 | B2 | 12/2015 | Smee et al. |
| 9,225,477 | B1 | 12/2015 | Lee et al. |
| 9,559,724 | B2 | 1/2017 | Caillerie et al. |
| 9,991,989 | B2 | 6/2018 | Malladi et al. |
| 10,205,562 | B1 | 2/2019 | Patel |
| 10,700,710 | B2 | 6/2020 | Yang et al. |
| 10,779,193 | B2 | 9/2020 | Nguyen et al. |
| 10,784,993 | B1 | 9/2020 | Batra et al. |
| 11,044,047 | B2 | 6/2021 | Sun et al. |
| 11,283,543 | B2 | 3/2022 | Zopf et al. |
| 11,469,855 | B2 | 10/2022 | Raza et al. |
| 11,489,624 | B2 | 11/2022 | Gopalan et al. |
| 11,496,242 | B2 | 11/2022 | Chandrasekher et al. |
| 11,546,201 | B1 | 1/2023 | Newman et al. |
| 11,784,664 | B2 | 10/2023 | Boussard et al. |
| 11,824,556 | B1 * | 11/2023 | Cowell ............... H03M 13/453 |
| 2003/0149869 | A1 | 8/2003 | Gleichauf |
| 2004/0003334 | A1 | 1/2004 | Boyanapalli |
| 2004/0010746 | A1 | 1/2004 | Lucas et al. |
| 2005/0028066 | A1 | 2/2005 | Raahemi |
| 2005/0180363 | A1 | 8/2005 | Yano et al. |
| 2005/0193193 | A1 | 9/2005 | Skovira |
| 2005/0193314 | A1 | 9/2005 | Lamy et al. |
| 2005/0257118 | A1 | 11/2005 | Shien |
| 2006/0041826 | A1 | 2/2006 | Bhattacharya et al. |
| 2006/0182124 | A1 | 8/2006 | Cole et al. |
| 2007/0192667 | A1 | 8/2007 | Nieto et al. |
| 2008/0104492 | A1 | 5/2008 | Miller |
| 2008/0172589 | A1 | 7/2008 | Gallezot et al. |
| 2008/0229174 | A1 | 9/2008 | Miranda |
| 2008/0288845 | A1 | 11/2008 | Tsfati et al. |
| 2009/0019346 | A1 | 1/2009 | Tzannes |
| 2009/0154916 | A1 | 6/2009 | Huang et al. |
| 2009/0158120 | A1 | 6/2009 | Palanki et al. |
| 2011/0209029 | A1 | 8/2011 | Zopf |
| 2012/0054572 | A1 | 3/2012 | Andersen et al. |
| 2012/0151285 | A1 | 6/2012 | Aue |
| 2012/0207027 | A1 | 8/2012 | Duan et al. |
| 2013/0346826 | A1 | 12/2013 | Zopf |
| 2014/0006890 | A1 | 1/2014 | Liberg et al. |
| 2014/0040675 | A1 | 2/2014 | Achir |
| 2014/0059407 | A1 | 2/2014 | Zopf et al. |
| 2014/0189474 | A1 | 7/2014 | Kwan |
| 2015/0278008 | A1 | 10/2015 | Ren et al. |
| 2015/0333876 | A1 | 11/2015 | Svedman et al. |
| 2016/0147595 | A1 | 5/2016 | Licardie et al. |
| 2016/0269148 | A1 | 9/2016 | Kim et al. |
| 2016/0371141 | A1 | 12/2016 | Daniel |
| 2018/0309547 | A1 | 10/2018 | Cheng et al. |
| 2019/0363823 | A1 | 11/2019 | Zhang |
| 2020/0021309 | A1 | 1/2020 | Xu et al. |
| 2020/0052812 | A1 | 2/2020 | Kittichokechai et al. |
| 2020/0328760 | A1 | 10/2020 | Xu et al. |
| 2021/0049100 | A1 | 2/2021 | Roberts |
| 2021/0058190 | A1 * | 2/2021 | Zopf ..................... H04L 1/1845 |
| 2021/0152290 | A1 | 5/2021 | Li et al. |
| 2022/0209893 | A1 | 6/2022 | Chandrasekher et al. |
| 2022/0294557 | A1 | 9/2022 | Gopalan et al. |
| 2022/0351192 | A1 | 11/2022 | Mcgregor et al. |
| 2022/0375479 | A1 | 11/2022 | Zopf |
| 2024/0080133 | A1 | 3/2024 | Vijayasingh Gnanaprakasam |
| 2025/0378314 | A1 | 12/2025 | Kearey et al. |
| 2026/0012206 | A1 * | 1/2026 | Chen ..................... H03M 13/15 |
| 2026/0012287 | A1 * | 1/2026 | Chen ..................... H04L 1/0045 |

FOREIGN PATENT DOCUMENTS

| | | | |
|---|---|---|---|
| EP | 2 015 494 | B1 | 1/2009 |
| EP | 2 061 176 | B1 | 5/2009 |
| EP | 2 408 136 | A2 | 1/2012 |
| EP | 3 221 969 | B1 | 9/2017 |
| EP | 3 579 473 | A1 | 12/2019 |
| WO | WO-2015/196568 | A1 | 12/2015 |
| WO | WO-2017/177926 | A1 | 10/2017 |
| WO | WO-2017/222582 | A1 | 12/2017 |
| WO | WO-2018/210624 | A1 | 11/2018 |
| WO | WO-2021/007830 | A1 | 1/2021 |
| WO | WO-2024/168933 | A1 | 8/2024 |

OTHER PUBLICATIONS

Non-Final Office Action on U.S. Appl. No. 18/933,482 Dtd Mar. 18, 2026.
Non-Final Office Action on U.S. Appl. No. 18/933,574 Dtd Feb. 9, 2026.
Final Office Action on U.S. Appl. No. 18/933,574 DTD May 27, 2026.
Non-Final Office Action on U.S. Appl. No. 18/933,537 DTD May 20, 2026.

* cited by examiner

700

880

2400

SYSTEMS AND METHODS FOR CYCLIC REDUNDANCY CHECK ERROR CORRECTION USING MAJORITY VOTE

CROSS-REFERENCE TO RELATED APPLICATIONS

This application claims the benefit of and priority to U.S. Provisional Patent Application No. 63/667,485 filed on Jul. 3, 2024, which is incorporated herein by reference in its entirety for all purposes.

FIELD OF THE DISCLOSURE

This disclosure generally relates to systems and methods for improving error detection and/or correction process of a communications system, including but not limited to systems and methods of detecting and/or correcting bit errors in a plurality of bit streams using cyclic redundancy check (CRC) and a majority vote.

BACKGROUND

A cyclic redundancy check (CRC) is an error-detecting code commonly used in digital networks and storage devices to detect accidental changes (e.g., bit errors) to digital data. CRCs were originally developed for bit error detection, and not for bit error correction.

When a codec (e.g., Low Complexity Communication Codec (LC3)) is used for transmission of audio signals through a Bluetooth Low Energy (LE) wireless link, the transmission channel may be subject to packet loss and bit errors. While many Packet Loss Concealment (PLC) techniques are available to reduce the audio quality degradation due to packet loss, few techniques are available to improve audio quality when there are bit errors in the received bit-stream. One of the few techniques available to correct bit errors is Cyclic Redundancy Check Error Correction (CRC-EC), which was originally proposed by Robert Zopf (U.S. Pat. No. 9,124,298 B2) and later enhanced by Norbert Grunert (U.S. Pat. No. 8,996,962 B2). These techniques use the error detection capability of CRC to correct bit errors. However, Zopf's CRC-EC scheme cannot handle encrypted bit-streams and is grossly suboptimal for the case of 2 retransmissions. Grunert's CRC-EC enhancements can handle encrypted bit-streams and improve the performance for 2 retransmissions, but there is still substantial room for improvements.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
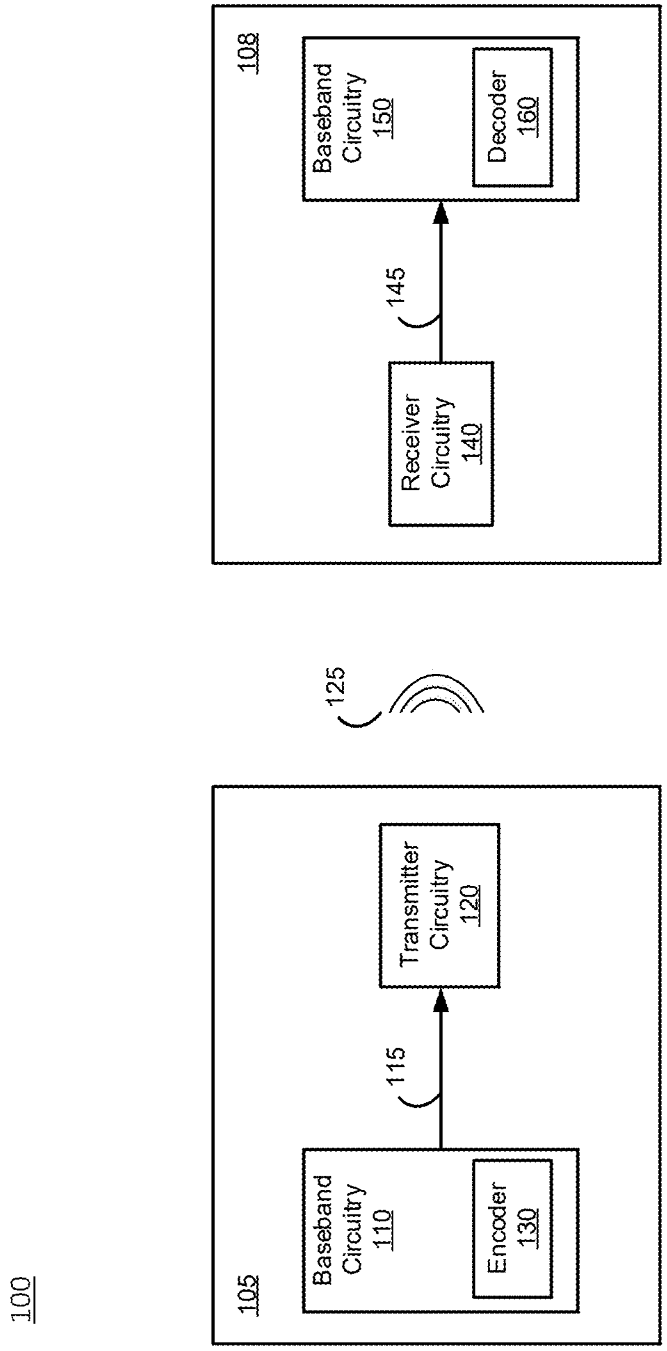
FIG. 1 is a diagram depicting an example communication environment with communication systems, according to one or more embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

Although various embodiments disclosed herein are described for encoding and/or decoding data for a wireless communication (e.g., wireless local area network (WLAN) conforming to any IEEE 802.11 standard including IEEE 802.11bn), principles disclosed herein are applicable to other types of communication (e.g., wired communication) or any process that performs encoding for error correction codes (e.g., low-density parity check (LDPC) codes, forward error correction (FEC) codes).

I. Example Configurations of Communication Systems

Figure 2:
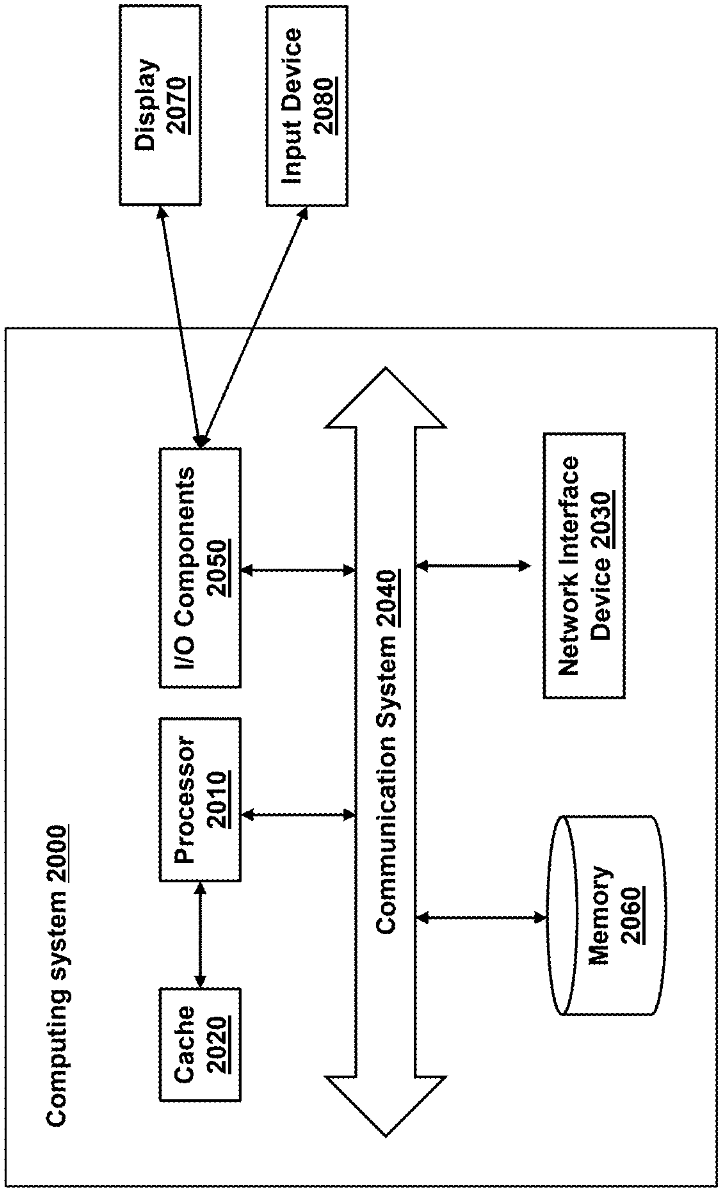
FIG. 2 is a schematic block diagram of a computing system, according to one or more embodiments.

Referring to FIG. 1, illustrated is a diagram depicting an example communication environment 100 including communication systems (or communication apparatuses) 105, 108, according to one or more embodiments. In one embodiment, the communication system 105 (e.g., transmitter system) includes a baseband circuitry 110 and a transmitter circuitry 120, and the communication system 108 (e.g., receiver system) includes a baseband circuitry 150 and a receiver circuitry 140. In one aspect, the communication system 105 is considered a transmitter communication system, and the communication system 108 is considered a receiver communication system. These components operate together to exchange data (e.g., messages or frames) through a wireless medium. These components are embodied as application specific integrated circuit (ASIC), field programmable gate array (FPGA), or any combination of these, in one or more embodiments. In some implementations, the communication systems 105, 108 include more, fewer, or different components than shown in FIG. 1. For example, each of the communication systems 105, 108 includes transceiver circuitry to allow bi-directional communication between the communication systems 105, 108 or with other communication systems. In some implementations, each of the communication systems 105, 108 may have configuration similar to that of a computing system 2000 as shown in FIG. 2.

The baseband circuitry 110 of the communication system 105 is a circuitry that generates the baseband data 115 for transmission. The baseband data 115 includes information data (e.g., signal(s)) at a baseband frequency for transmission. In one approach, the baseband circuitry 110 includes an encoder 130 that encodes the data and generates or outputs parity bits. In one aspect, the baseband circuitry 110 (or encoder 130) obtains a generator matrix or a parity check matrix or uses a previously produced generator matrix or a previously produced parity check matrix and encodes the information data by applying the information data to the generator matrix or the parity check matrix to obtain a codeword. In some implementations, the baseband circuitry 110 stores one or more generator matrices or one or more parity check matrices that conform to any IEEE 802.11 standard for WLAN communication. The baseband circuitry 110 retrieves the stored generator matrix or the stored parity check matrix in response to detecting information data to be transmitted, or in response to receiving an instruction to encode the information data. In one approach, the baseband circuitry 110 generates the parity bits according to a portion of the generator matrix or using the parity check matrix and appends the parity bits to the information bits to form a codeword. The baseband circuitry 110 generates the baseband data 115 including the codeword for the communication system 108 and provides the baseband data 115 to the transmitter circuitry 120.

The transmitter circuitry 120, generally referred to as transmitter(s), of the communication system 105 includes or corresponds to a circuitry that receives the baseband data 115 from the baseband circuitry 110 and transmits a wireless signal 125 according to the baseband data 115. In one configuration, the transmitter circuitry 120 is coupled between the baseband circuitry 110 and an antenna (not shown). In this configuration, the transmitter circuitry 120 up-converts the baseband data 115 from the baseband circuitry 110 onto a carrier signal to generate the wireless signal 125 at a radio frequency (RF) frequency (e.g., 10 MHz to 60 GHz), and transmits the wireless signal 125 through the antenna.

The receiver circuitry 140 of the communication system 108 is a circuitry that receives the wireless signal 125 from the communication system 105 and obtains baseband data 145 from the received wireless signal 125. In one configuration, the receiver circuitry 140 is coupled between the baseband circuitry 150 and an antenna (not shown). In this configuration, the receiver circuitry 140 receives the wireless signal 125 though the antenna, and down-converts the wireless signal 125 at an RF frequency according to a carrier signal to obtain the baseband data 145 from the wireless signal 125. The receiver circuitry 140 then provides the baseband data 145 to the baseband circuitry 150.

The baseband circuitry 150 of the communication system 108 includes or corresponds to a circuitry that receives the baseband data 145 from the receiver circuitry 140 and obtains information data from the received baseband data 145. In one embodiment, the baseband circuitry 150 includes a decoder 160 that extracts information and parity bits from the baseband data 145. The decoder 160 decodes the baseband data 145 to obtain the information data generated by the baseband circuitry 110 of the communication system 105.

In some implementations, each of the baseband circuitry 110 (including the encoder 130), the transmitter circuitry 120, the receiver circuitry 140, and the baseband circuitry 150 (including the decoder 160) may be as one or more processors, application specific integrated circuit (ASIC), field programmable gate array (FPGA), or any combination of them.

FIG. 2 is a schematic block diagram of a computing system, according to an embodiment. An illustrated example computing system 2000 includes one or more processors 2010 in direct or indirect communication, via a communication system 2040 (e.g., bus), with memory 2060, at least one network interface controller 2030 with network interface port for connection to a network (not shown), and other components, e.g., input/output ("I/O") components 2050. Generally, the processor(s) 2010 will execute instructions (or computer programs) received from memory. The processor(s) 2010 illustrated incorporate, or are connected to, cache memory 2020. In some instances, instructions are read from memory 2060 into cache memory 2020 and executed by the processor(s) 2010 from cache memory 2020. The computing system 2000 may not necessarily contain all of these components shown in FIG. 2 and may contain other components that are not shown in FIG. 2.

In more detail, the processor(s) 2010 may be any logic circuitry that processes instructions, e.g., instructions fetched from the memory 2060 or cache 2020. In many implementations, the processor(s) 2010 are microprocessor units or special purpose processors. The computing device 2050 may be based on any processor, or set of processors, capable of operating as described herein. The processor(s) 2010 may be single core or multi-core processor(s). The processor(s) 2010 may be multiple distinct processors.

The memory 2060 may be any device suitable for storing computer readable data. The memory 2060 may be a device with fixed storage or a device for reading removable storage media. Examples include all forms of volatile memory (e.g., RAM), non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 2000 may have any number of memory devices 2060.

The cache memory 2020 is generally a form of computer memory placed in close proximity to the processor(s) 2010 for fast read times. In some implementations, the cache memory 2020 is part of, or on the same chip as, the processor(s) 2010. In some implementations, there are multiple levels of cache 2020, e.g., L2 and L3 cache layers.

The network interface controller 2030 manages data exchanges via the network interface (sometimes referred to as network interface ports). The network interface controller 2030 handles the physical and data link layers of the OSI model for network communication. In some implementations, some of the network interface controller's tasks are handled by one or more of the processor(s) 2010. In some implementations, the network interface controller 2030 is part of a processor 2010. In some implementations, the computing system 2000 has multiple network interfaces controlled by a single controller 2030. In some implementations, the computing system 2000 has multiple network interface controllers 2030. In some implementations, each network interface is a connection point for a physical network link (e.g., a cat-5 Ethernet link). In some implementations, the network interface controller 2030 supports wireless network connections and an interface port is a wireless (e.g., radio) receiver or transmitter (e.g., for any of the IEEE 802.11 protocols, near field communication "NFC", Bluetooth, ANT, or any other wireless protocol). In some implementations, the network interface controller 2030 implements one or more network protocols such as Ethernet. Generally, a computing device 2050 exchanges data with other computing devices via physical or wireless links through a network interface. The network interface may link directly to another device or to another device via an intermediary device, e.g., a network device such as a hub, a bridge, a switch, or a router, connecting the computing device 2000 to a data network such as the Internet.

The computing system 2000 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 2000 may include an interface (e.g., a universal serial bus (USB) interface) for connecting input devices, output devices, or additional memory devices (e.g., portable flash drive or external media drive). In some implementations, a computing device 2000 includes an additional device such as a co-processor, e.g., a math co-processor can assist the processor 2010 with high precision or complex calculations.

The components 2090 may be configured to connect with external media, a display 2070, an input device 2080 or any other components in the computing system 2000, or combinations thereof. The display 2070 may be a liquid crystal display (LCD), an organic light emitting diode (OLED) display, a flat panel display, a solid state display, a cathode ray tube (CRT) display, a projector, a printer or other now known or later developed display device for outputting determined information. The display 2070 may act as an interface for the user to see the functioning of the processor(s) 2010, or specifically as an interface with the software stored in the memory 2060.

The input device 2080 may be configured to allow a user to interact with any of the components of the computing system 2000. The input device 2080 may be a plurality pad, a keyboard, a cursor control device, such as a mouse, or a joystick. Also, the input device 2080 may be a remote control, touchscreen display (which may be a combination of the display 2070 and the input device 2080), or any other device operative to interact with the computing system 2000, such as any device operative to act as an interface between a user and the computing system 2000.

II. Cyclic Redundancy Check (CRC) in Transmitter Systems and Receiver Systems CRC was originally developed for bit error detection, and not for bit error correction. In this section, error detections using CRC are described and illustrated. Here, an error of data refers to (1) one or more bit errors that occur when one or more bits of the data are incorrectly received by a communication device during transmission of the data over a communication channel or a communication network, (2) one or more bit errors that occur during transmission of the data over a communication channel or a communication network due to noise, interference, distortion or multipath fading, (3) a number of received bits of the data that have been altered during transmission of the data over a communication channel or a communication network, or (4) any errors of data that occur during transmission of the data over a communication channel or a communication network. In one aspect, in a communication system (e.g., a transmitter system 105), the bit values of an M-bit message payload (M is an integer greater than 1) can be treated as the coefficients of an $(M-1)^{th}$ order polynomial M(x). The payload (or payload data) refers to a content of a message transmitted from a source device to a destination device over a communication channel or a communication network, a portion of the message excluding any headers, metadata or control information, or a portion of the message that is intended to reach the destination device. The system can obtain an n-bit CRC code (referred to as "CRC parity bits") using an $n^{th}$ order "generator polynomial" G(x) that has (n+1) coefficients (n is a positive integer). The system can append n bits with value 0 to the end of the M-bit payload to obtain $M(x)x^n$. Here, "appending" first data to second data refers to adding the first data to an end of the second data, or adding the first data to the second data such that that the left most bit of the first data is positioned on the right side of the second data. The system can do a long division of $M(x)x^n$ using G(x) by replacing subtraction by "exclusive or" (XOR). In finite field arithmetic, addition and subtraction are performed bitwise-parallel without carry or borrow, so they are equivalent to bitwise XOR. As a result of the long division, at the end of long division, the system can obtain the n-bit remainder R(x) as the n-bit CRC code using the following equation.

$$M(x)x^n = Q(x)G(x) + R(x);\text{ or} \quad \text{(Equation 1)}$$

$$R(x) = M(x)x^n \bmod G(x), \quad \text{(Equation 2)}$$

where the order of R(x)<n.

The system can append the n-bit CRC code to the end of the M-bit payload, and transmit the resulting (M+n) bits to a receiver system (e.g., a receiver system 108).

Figure 3B:
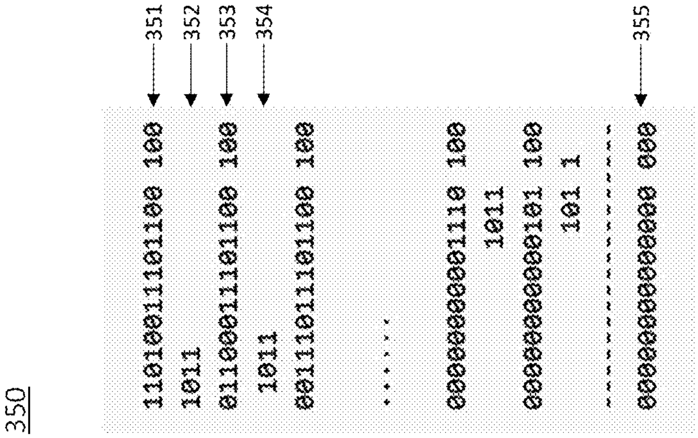
FIG. 3B is a diagram depicting example calculation steps of performing CRC check on a received message in a receiver system, according to one or more embodiments.
Figure 3A:
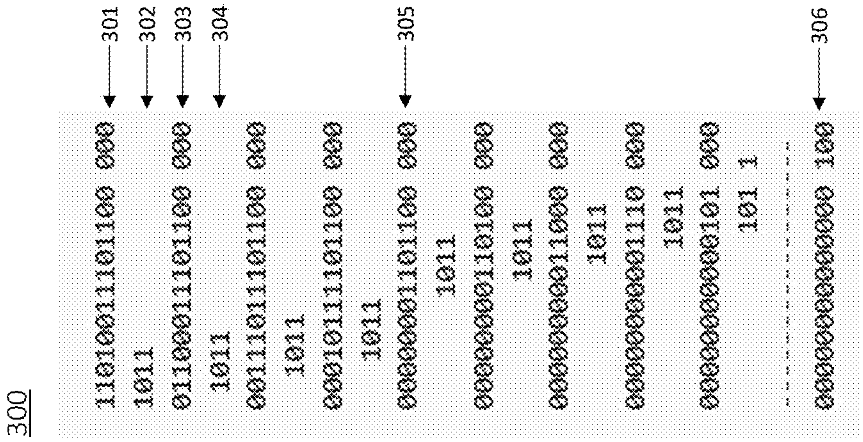
FIG. 3A is a diagram depicting example calculation steps of deriving a 3-bit cyclic redundancy check (CRC) from a 14-bit message in a transmitter system, according to one or more embodiments.

FIG. 3A is a diagram 300 depicting example calculation steps of deriving a 3-bit cyclic redundancy check (CRC) from a 14-bit message in a transmitter system, according to one or more embodiments. Referring to FIG. 3A, a communication system (e.g., transmitter system) can treat the bit values of a 14-bit message payload as the coefficients of an $(M-1)^{th}$ order polynomial M(x) as follows.

$$M(x) = x^{13} + x^{12} + x^{10} + x^7 + x^6 + x^5 + x^3 + x^2. \quad \text{(Equation 3)}$$

The system can append 3 bits (n=3) with value 0 to the end of the M-bit payload to obtain $M(x)x^n$ 301. The system can use an $n^{th}$ order "generator polynomial" G (x) that has 4 (=n+1) coefficients as follows.

$$G(x) = x^3 + x + 1. \quad \text{(Equation 4)}$$

The system can do a long division of $M(x)x^n$ with G (x) as a divisor by using XOR. For example, referring to FIG. 3A, in doing the long division, the first four bits in the $M(x)x^n$ 301 are XOR'ed with the divisor 302 (or 304) and, the rest of the bits in the dividend $M(x)x^n$ 301 are not changed in the remainder 304 of the division. It is noted that the divisor moves over to align with the next 1 in the dividend 305 since quotient for that step is zero. In other words, the divisor does not necessarily move one bit per iteration. In this manner, the system can do the long division until the system obtains a remainder 306 ("100") which is 3 bit long. The division stops here as a dividend is equal to zero.

In one aspect, a communication system (e.g., receiver system) can receive (M+n) bits as the coefficients of an (M+n−1)-th order polynomial S(x). The system can do a long division of S(x) using the n-th order generator polynomial G(x) to obtain a remainder as a result of the long division. If the remainder is zero, then the system can determine that the CRC check passes, and that the payload is considered to be error-free. If the remainder is non-zero, then the system can determine that at least one of the received (M+n) bits is in error. Obtaining a zero remainder from the received (M+n) bits above can be equivalent to (1) appending n bits of zeros to the received version of the M-bit M(x) to obtain $M(x)x^n$, (2) dividing $M(x)x^n$ by the n-th order generator polynomial G(x), and then obtaining the same n-bit remainder R(x) as the n-bit remainder R (x) obtained in the transmitter system.

FIG. 3B is a diagram 350 depicting example calculation steps of performing CRC check on a received message in a receiver system, according to one or more embodiments. Referring to FIG. 3A, a communication system (e.g., receiver system or decoder system) can receive a message 351 in which the 3-bit CRC "100" is appended to a 14-bit message. The 3-bit CRC "100" can be the remainder 306 obtained in the transmitter system (see FIG. 3A). If the remainder "100" obtained in the transmitter system (e.g., the remainder 306 in FIG. 3A) is appended to the message bits and both the message bits and the remainder "100" are transmitted to the receiver system, a CRC check (e.g., division by G(x) 352) in the receiver system (or decoder system) will result in a zero remainder (assuming that there is no error in the received message bits). Alternatively, if the value "000" is appended to the message bits and both the message bits and the value "100" are transmitted to the receiver system, the CRC check (e.g., division by G(x)) in the receiver system (or decoder system) will result in the same remainder as the remainder obtained in the transmitter system. Referring to FIG. 3B, the system (e.g., receiver system or decoder system) can perform the CRC check by doing a long division on the received message 351 (including a payload and the CRC "100") by the same divisor 352 as that used in the transmitter system (see FIG. 3A). The system can obtain a remainder 353 as a result of the division, continue to do the division on the remainder 353 using the divisor 354, and so on, resulting in the resulting remainder 355. As the remainder 355 is zero, the system can determine that the CRC check passes, and that the payload is considered to be error-free.

In one aspect, a communication system (e.g., transmitter system, encoder system, receiver system, decoder system) can calculate CRC syndromes. If the bit values of the (M+n)-bit polynomial $M(x)x^n$ are all 0 except a value of 1 at bit position k, then the system can do a long division using G(x), resulting in an n-bit remainder which is referred to the "CRC syndrome" of the bit position k. The superposition principle applies to the CRC syndromes of different bit positions with a bit value of 1. In other words, if the (M+n)-bit polynomial S(x) has only J bits (J is an integer greater than 1) with a bit value of 1 at bit positions $k_1$, $k_2$, . . . , $k_J$. Then, after a long division of S(x) with G (x), the n-bit remainder will be equal to the sum of the J CRC syndromes of the bit positions $k_1$, $k_2$, . . . , $k_J$, where the summation can be performed with XOR. Superposition of CRC syndromes can enable CRC error correction (CRC-EC) schemes.

In one aspect, a communication system (e.g., transmitter system, encoder system, receiver system, decoder system) can use CRC syndromes to update CRC remainders. For example, a receiver system can use G(x) to perform a long division of the received (M+n)-bit S(x) that includes the received version of the M-bit payload and n-bit CRC code. If the resulting n-bit CRC remainder (as a result of the long division) is not zero, there can be at least one bit error in the received (M+n) bits. If there are a total of E bit errors in S(x) occurring at bit positions $e_1$, $e_2$, . . . , $e_E$, then the system can update the CRC remainder by performing XOR between the n-bit CRC remainder obtained from the long division above and the CRC syndromes of bit positions $e_1$, $e_2$, . . . , $e_E$, resulting in the updated CRC remainder being zero. Equivalently, the system can also perform XOR between the CRC syndromes of bit positions $e_1$, $e_2$, . . . , $e_E$, and if the result of XOR is the same as the n-bit CRC remainder obtained from the long division above, the system can determine that there are a total of E bit errors in S(x) occurring at bit positions $e_1$, $e_2$, . . . , $e_E$.

III. Cyclic Redundancy Check Error Correction (CRC-EC) in Receiver Systems

In one aspect, a communication system (e.g., receiver system, decoder system) can use CRC syndromes to perform error correction rather than error detection. The system can pre-compute and store the (M+n) CRC syndromes corresponding to the (M+n) bit positions in S(x). Assuming that each of the (M+n) bits in the received S(x) polynomial can be either error-free or in error, there can be $2^{(M+n)}$ possible combinations. After doing a long division of the received S(x) with G(x) to obtain the n-bit CRC remainder, theoretically the system can use a brute-force approach by trying out all $2^{(M+n)}$ possibilities. For example, the system can do XOR between the CRC remainder and the CRC syndromes of bit error positions in each of the $2^{(M+n)}$ possibilities to determine which combination results in an updated CRC remainder of zero. Then, in response to determining a combination of bit error positions resulting in the updated CRC remainder of zero, the system can flip the bit values of the combination of bit error positions to obtain the corrected bit-stream. The problem of this brute-force approach is the astronomical computational complexity. For example, for LC3 codecs, typically, n=24 and M is in the range of 320 to 1280 for 32 kbps to 128 kbps LC3. Thus, the number of possible combinations is $3.6\times10^{103}$ (see the equation below) or more, which may incur a tremendous computing overhead.

$$2^{(320+24)}=3.6\times10^{103}. \quad \text{(Equation 5)}$$

In one aspect, Zopf (U.S. Pat. No. 9,124,298 B2) recognized that if a communication system (e.g., receiver system) has received 2 bit-streams (e.g., 1 original transmission and 1 retransmission), then the system can do XOR between the 2 bit-streams to find D bit positions (D is an integer greater than or equal to zero) where the bit values are different. The system can determine that these D bit positions may have potential bit errors. Then, rather than $2^{(M+n)}$, the system can try $2^D$ possible combinations to find a bit combination that makes the updated CRC remainder zero. The complexity can be further reduced by going through the $2^D$ possible bit combinations using a Gray code sequence where adjacent codes differ by only one bit. In summary, Zopf's CRC-EC scheme (referred to as Z-CRC-EC) can utilize CRC error detection capability to correct bit errors in a focused search, and as a result, the computational complexity can be quite modest for D≤10. The Z-CRC-EC scheme is complexity-constrained. In other words, the Z-CRC-EC scheme is configured to correct bit errors only when D≤N where a suitable value is N=10. If D>N, then the Z-CRC-EC scheme aborts. This approach may not be able to catch the situation where bit errors hit the same bit position of both received bit-streams, although the situation is a low-probability event.

Figure 4:
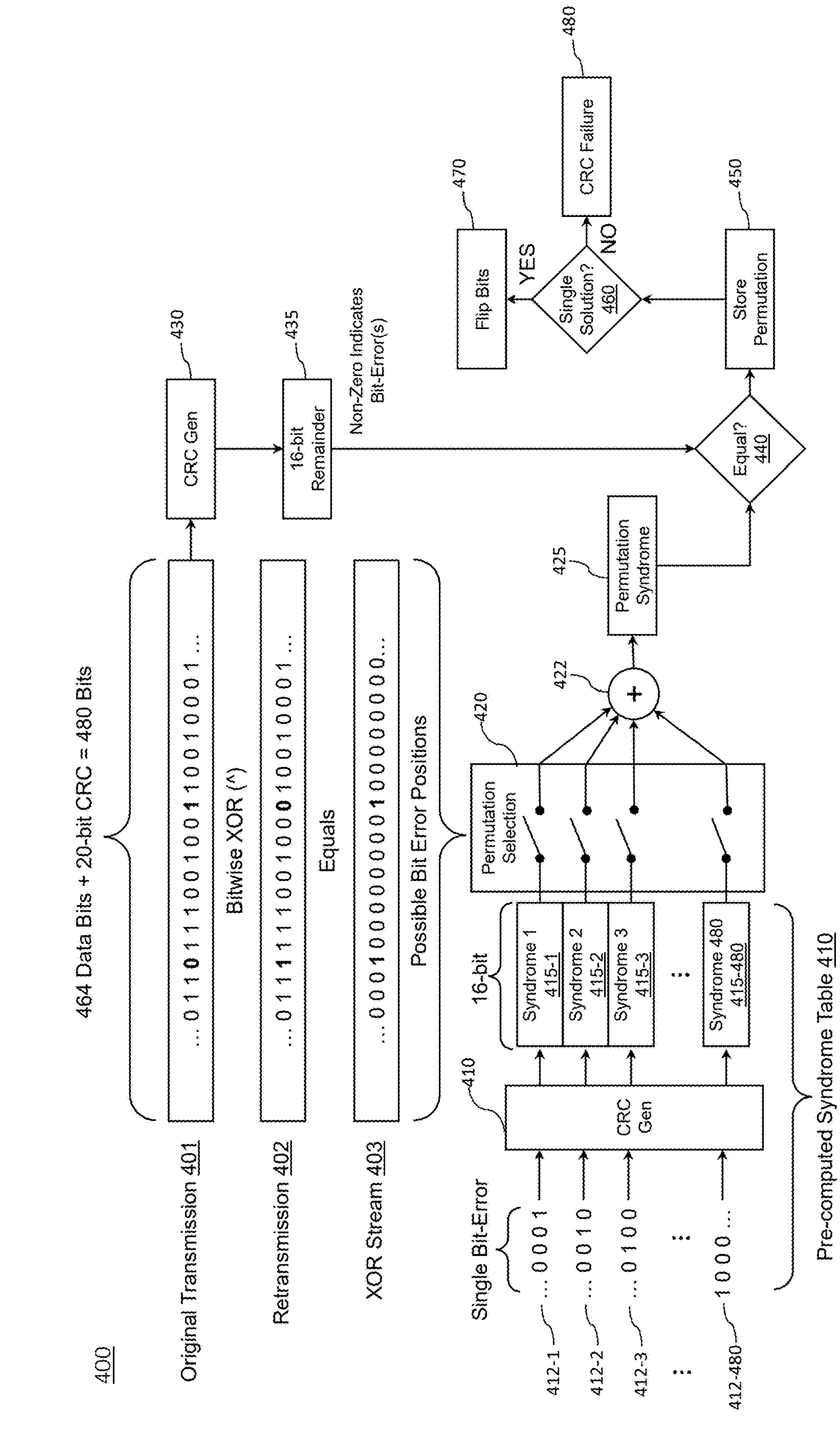
FIG. 4 is a diagram depicting an example process of cyclic redundancy check error correction (CRC-EC) according to one or more embodiments.

FIG. 4 is a diagram 400 depicting an example process of Z-CRC-EC according to one or more embodiments. Referring to FIG. 4, a communication system (e.g., receiver system) may receive 2 bit-streams (e.g., 1 original transmission 401 and 1 retransmission 402), each having a size of 480 bits (including 464 data bits and 16-bit CRC). The system can pre-compute a syndrome table 410 by performing CRC generation 410 on 480 single-bit error streams 412-1, 412-2, . . . , 412-480 to generate corresponding 480 syndromes 415-1, 415-2, . . . , 415-480, respectively. The system can perform a CRC check 430 on the original bit-stream 401 to generate a 16-bit remainder 435. In response to determining that the remainder 435 equals zero, the system can determine that the CRC check passes. In response to determining that the remainder 435 is non-zero, the system can perform XOR between the 2 bit-streams 401, 402 to obtain an XOR'ed bit-stream (or "XOR map") 403. The system can find D bit positions (e.g., D=2 in FIG. 4) where the bit values are different. The system can determine that these D bit positions may have potential bit errors, and try $2^D$ possible combinations to find a bit combination such that a sum of syndromes corresponding to the bit combination equals the remainder 435 calculated from the original bit-stream 401.

To find potential bit error positions, the system can first perform permutation selection 420 based on the D bit positions to generate possible combinations of potential bit positions. For example, if D=2 and corresponding bit positions are i and j, possible combinations of potential bit positions can include (1) $i^{th}$ position only, (2) $j^{th}$ position only, and (3) both $i^{th}$ position and $j^{th}$ position. For each of the three combinations of bit positions, the system calculate the sum of syndromes that correspond to each combination of bit positions, and determine 440 whether the sum of syndromes for each combination (e.g., permutation syndrome 425) is equal to the remainder 435. In response to determining that the permutation syndrome 425 is equal to the remainder 435, the system can store 450 the permutation syndrome 425 as a solution. In response to performing the determination 440 for all of the combinations, the system can determine 460 whether there is a single solution. In response to determining that there is a single solution corresponding to a combination of bit positions, the system can flip bits at the combination of bit positions. In response to determining that there are more than a single solution (e.g., two solutions or three solutions), the system can abort indicating a CRC failure 480.

In one aspect, in the Z-CRC-EC scheme, in response to determining that a unique solution is found, the system can determine that the unique solution is the correct solution (without considering the failure scenario described below). In response to determining that multiple solutions are found (e.g., CRC check provides the same remainder for multiple permutations or combinations of bit positions, and/or Hamming distance is exceeded), the system can determine to fail the CRC check (and/or the message is retransmitted if available). For example, the Hamming distance between an original bit-stream and an erroneous bit-stream is the number of bit errors in the erroneous bit-stream. When the Z-CRC-EC scheme finds multiple solutions, the system can determine that the actual number of bit errors exceeds the number of bit errors the CRC code can detect.

In response to determining that no solutions are found (e.g., the XOR map does not include any bit error position), the system may determine that one or more bit errors hit the same location in both bit-streams. The Z-CRC-EC scheme may fail if the following conditions are met: (1) one or more bit errors hit the same location in both bit-streams; AND (2) Hamming distance is exceeded; AND (3) a unique solution is found. Although the probability of satisfying the three conditions is extremely low, the probability of erroneous CRC passes can be greater than zero in normal conditions. The Z-CRC-EC scheme is capable of fixing greater than Hamming distance errors. For example Z-CRC-EC can fix a number of bit errors greater than the number of bit errors the original CRC code can detect (which is the maximum Hamming distance the CRC code can handle). The Z-CRC-EC scheme also can be source-independent and/or application-independent. For example, the Z-CRC-EC scheme can be used for any CRC-based retransmission system.

IV. CRC-EC On Encrypted Bit-Streams

Figure 5:
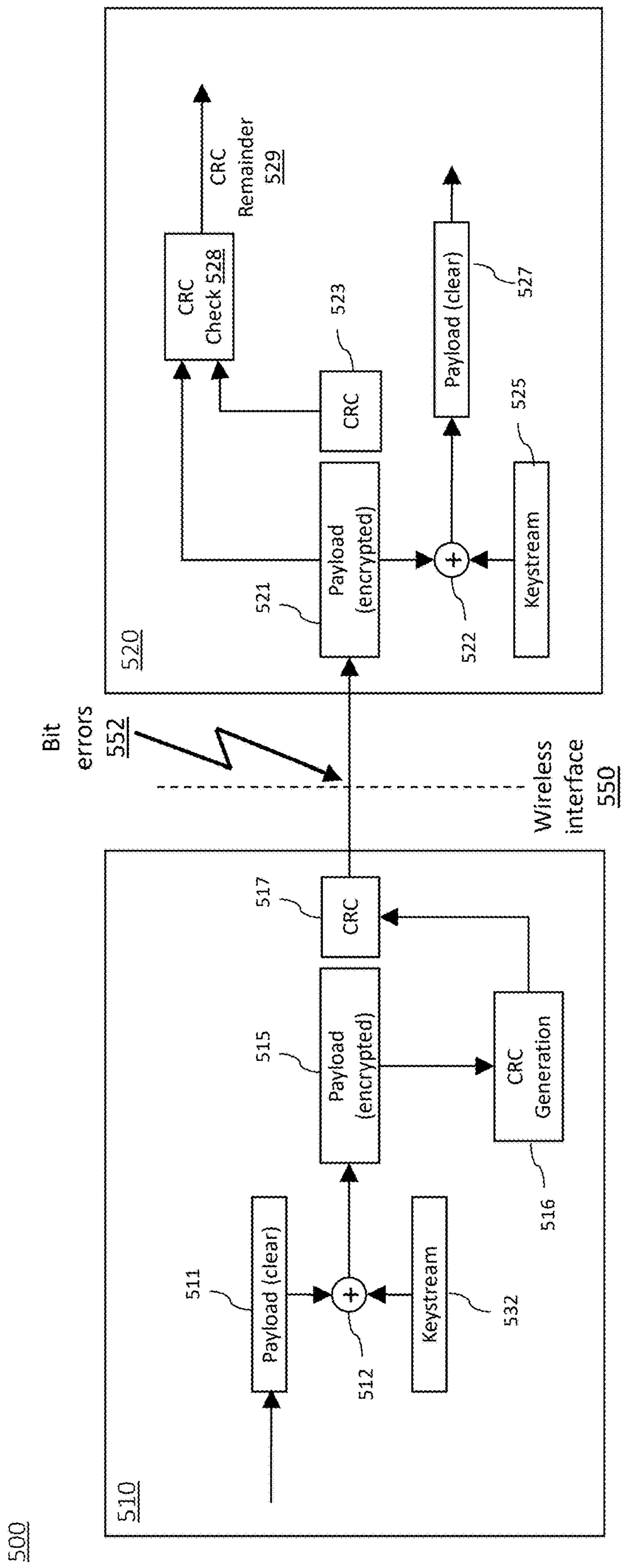
FIG. 5 is a diagram depicting an example process of CRC check on encrypted bit-streams according to one or more embodiments.

FIG. 5 is a diagram depicting an example process 500 of CRC check on encrypted bit-streams according to one or more embodiments. A communication system 510 (e.g., transmitter system) may generate or store an unencrypted (clear) payload 511, and encrypt the payload 511 by applying XOR 512 using a keystream 513 to generate an encrypted payload 515. The keystream refers to a sequence of pseudorandom bits to be combined with an original message (or plaintext) to produce an encrypted message (or cyphertext), a sequence of pseudorandom bits to be combined with an encrypted message (or ciphertext) to produce an original message (or plaintext), or any sequence of random or pseudorandom characters (e.g., bis, bytes, alphabets) to produce an encrypted message. The system 510 may generate, based on the encrypted payload 515 using CRC generation 516, a CRC code 517. The CRC generation 516 may be implemented in software, firmware, hardware or a combination thereof. The system 510 may transmit the encrypted payload 515 and the CRC code 517 via a wireless interface (e.g., wireless network interface device 2030) to a wireless communication system 520 (e.g., receiver system or decoder system). One or more bit errors 552 may occur during the transmission. The system 520 may receive an encrypted payload 521 and a CRC code 523, which correspond to the encrypted payload 515 and the CRC code 517, respectively. The system may decrypt the (received) encrypted payload 521 by applying XOR 522 using a keystream 525 to generate an unencrypted (clear) payload 527. The system 520 may perform a CRC check 528 on the encrypted payload 521 and the CRC code 523 to generate a CRC remainder 529. The CRC check 528 may be implemented in software, firmware, hardware or a combination thereof. The system may determine whether the CRC remainder 529 is zero. In response to determining that the CRC remainder 529 is zero, the system may determine that the CRC check passes. In response to determining that the CRC remainder 529 is non-zero, the system can determine to fail the CRC check, and request for retransmitting the message if available.

In one aspect, encryption may complicate the process of correcting bit errors (e.g., the Z-CRC-EC scheme). In wireless communications (e.g., Bluetooth, BT LE, WLAN), encryption can be performed on a payload (e.g., payload bit-stream) using a keystream (e.g., a bit-stream representing an encryption key or a decryption key). For example, a wireless communication system can perform Advanced Encryption Standard (AES) encryption on payload data to be transmitted over Bluetooth (e.g., Bluetooth 4.1). A wireless communication system can use different enhanced synchronous connection-oriented (eSCO) keystreams in retransmissions. For Bluetooth LE audio, the same keystream can be used in retransmissions by default, but different keystreams can be used in retransmissions in a proprietary mode.

Whether the same keystream or different keystreams can be used in retransmissions may complicate CRC-EC schemes.

In one aspect, in many wireless communication systems, only decrypted bit-streams are available to firmware (e.g., decoder firmware). In other words, only hardware (e.g., CRC hardware and/or decryption hardware) can have or access received encrypted bit-streams, and encrypted bit-streams are not available to firmware. As a result, without CRC-EC hardware, the system cannot perform CRC-EC on encrypted bit-streams using firmware. Assuming encryption keystreams used in two transmissions (e.g., one transmission and one retransmission) are the same, a wireless communication system (e.g., transmitter system) can generate an n-bit CRC code (e.g., n=24) using an encrypted payload, and transmit the encrypted payload and the CRC code to another wireless communication system (e.g., receiver system). The receiver system can perform a CRC check by dividing each received encrypted payload with 24-bit CRC code using G(x) to obtain a 24-bit CRC remainder. If the received encrypted payload is available or accessible, the most straightforward way to perform the Z-CRC-EC scheme would be to use this 24-bit CRC remainder and the received encrypted payload to identify the error bits, and then flip those bits in the decrypted payload. However, in many wireless communication systems, CRC hardware and decryption hardware (e.g., AES decryption hardware) do not make the CRC remainder and received encrypted payload available to firmware. Changes in both CRC hardware and decryption hardware can solve the problem but incur a higher cost of implementation.

To solve this problem, systems and methods according to some embodiments of the present disclosure can correct bit errors of received encrypted payload even when the received encrypted payload is not available or accessible to firmware of a wireless communication system. In some implementations, when the (transmitted) 24-bit CRC parity bits (or CRC code) are generated in the transmitter system using the encrypted bit-stream (e.g., encrypted LC3 payload), a wireless communication system (e.g., receiver system) can append the received CRC parity bits to the decrypted bit-stream to generate a combined or extended bit-stream and use the extended bit-stream to perform a CRC-EC search. For example, the receiver system can find potential bit error positions by comparing the extended bit-stream for the original transmission and an extended bit-stream for the retransmission, and determine whether the sum of CRC syndromes corresponding to the potential bit error positions is equal to the CRC remainder calculated from the encrypted payload and the CRC code. In some implementations, in response to determining that multiple transmissions of the same payload or packet use the same encryption keystream, the receiver system can append the received CRC code to the decrypted bit-stream to perform a CRC-EC. This approach is advantageous in that when firmware (e.g., decoder firmware) does not have access to the received version of the encrypted bit-stream, CRC-EC can be performed without change in CRC hardware and/or decryption hardware (e.g., AES decryption hardware).

In some implementations, a wireless communication system (e.g., receiver system) can perform CRC-EC on encrypted bit-streams that are encrypted using the same encryption keystream. In some implementations, in response to receiving an encrypted payload (or bit-stream) and a CRC code (e.g., 24-bit CRC code) corresponding to the encrypted payload, the system can (1) decrypt the received encrypted payload (or bit-stream) to generate a decrypted payload (or bit-stream), (2) append the received CRC code to the decrypted payload to generate an extended or combined bit-stream, (3) use XOR to compare two such extended bit-streams from 2 transmissions (e.g., the original transmission of the payload and a retransmission of the payload) to identify D number of bit positions having different bit values between the two extended bit-streams. Next, for each of the $2^D$ possible combinations of 1 and 0 out of these D bits, the system can (3) perform XOR between the CRC remainder calculated by CRC hardware and the CRC syndromes for all bit positions among the D bits with a value of 1 in the possible combination. In response to determining that a result of performing the XOR as an updated CRC remainder is equal to 0, the system can (4) determine that a set of the bit positions used in performing the XOR is the correct CRC-EC solution, and (5) correct the bit errors by flipping those decrypted payload bits corresponding to, or identified by, the set of the bit positions in the CRC-EC solution that have a bit value of 1. In some implementations, a hardware register may be added to CRC hardware (e.g., decoder CRC hardware) of the system so that firmware can read the CRC remainder from the hardware register. Such addition of hardware register is a simple hardware change compared to change in CRC hardware and/or decryption hardware to provide received encrypted payloads to the firmware.

In some implementations, a communication system (e.g., transmitter system) may generate or store a first unencrypted (clear) payload, and encrypt the first payload by applying XOR using a keystream to generate a first encrypted payload. The transmitter system may generate, based on the first encrypted payload using CRC generation, a first CRC code. The CRC generation may be implemented in software, firmware, hardware or a combination thereof. The transmitter system may transmit the first encrypted payload and the first CRC code via a wireless interface (e.g., wireless network interface device) to a wireless communication system (e.g., receiver system or decoder system). One or more bit errors may occur during the transmission. The receiver system may store a first received encrypted payload and a first received CRC code, which correspond to the first encrypted payload and the first CRC code, respectively. The receiver system may decrypt the first received encrypted payload by applying XOR using a keystream to generate a first decrypted payload. The receiver system may perform a CRC check on the first received encrypted payload and the first received CRC code to generate a CRC remainder. The CRC check may be implemented in software, firmware, hardware or a combination thereof. The receiver system may determine whether the CRC remainder is zero. In response to determining that the CRC remainder is zero, the receiver system may determine that the CRC check passes. In response to determining that the CRC remainder is non-zero, the receiver system can determine to fail the CRC check, request for retransmitting the message (e.g., a copy of first encrypted payload) if available. Here, a copy of first data refers to an exact duplicate of the first data, an exact replica of the first data, or second data having the same number of bits as the number of bits in the first data and having the same sequence of bit values as the sequence of bit values in the first data.

In some implementations, in response to the request for retransmitting the message, the transmitter system can generate or store a second unencrypted (clear) payload which contains the same bit values as the first unencrypted payload, and encrypt the second payload by applying XOR using the same keystream to generate a second encrypted payload. The transmitter system may generate, based on the second encrypted payload using CRC generation, a second CRC code. The transmitter system may transmit the second encrypted payload and the second CRC code via the wireless interface to the receiver system. The receiver system may receive a second received encrypted payload and a second received CRC code, which correspond to the second encrypted payload and the second CRC code, respectively. The receiver system may decrypt the second received encrypted payload by applying XOR using the same key-stream as the keystream in the transmitter system to generate a second decrypted payload.

In some implementations, the receiver system may append the first received CRC code to the first decrypted payload to generate a first (extended) bit-stream, and append the second received CRC code to the second decrypted payload to generate a second (extended) bit-stream. The receiver system may compare (e.g., using bitwise XOR) the first bit-stream and the second bit-stream to generate a bitmap (e.g., XOR map). The receiver system may identify, from the XOR map, D number of bit positions having different bit values between the first bit-stream and the second bit-stream (e.g., D number of bit positions having a value of 1 in the XOR map). Next, the receiver system may perform a CRC-EC using the D number of bit positions. In some implementations, for each of the $2^D$ possible combinations of 1 and 0 out of these D bits, the receiver system may perform XOR between the CRC remainder calculated by CRC hardware and the CRC syndromes for all bit positions among the D bits with a value of 1 in the possible combination. In response to determining that a result of performing the XOR as an updated CRC remainder is equal to 0, the receiver system may determine that a set of the bit positions used in performing the XOR is the correct CRC-EC solution, and correct the bit errors by flipping those bits in the first decrypted payload corresponding to, or identified by, the set of the bit positions in the CRC-EC solution that have a bit value of 1.

In some implementations, in response to determining that the CRC remainder calculated by CRC hardware equals 0, the receiver system may determine that there is no bit errors. In some implementations, in response to determining that the CRC remainder calculated by CRC hardware is non-zero, the receiver system may determine that there is one or more bit errors, and for each of the $2^D$ possible combinations of 1 and 0 out of the D bits, determine whether the CRC remainder equals the sum of CRC syndromes corresponding to the possible combination. In response to determining that the CRC remainder equals the sum of the CRC syndromes, the receiver system may determine to find a solution and correct the first decrypted payload by flipping those bits in the first decrypted payload corresponding to the bit positions of the solution.

In some implementations, in response to determining that the CRC remainder calculated by CRC hardware is non-zero, for each of the $2^D$ possible combinations of 1 and 0 out of the D bits, the receiver system may add (e.g., perform XOR) the sum of CRC syndromes corresponding to the possible combination to the CRC remainder to generate an updated CRC remainder, determine whether the updated CRC remainder equals zero. The sum of CRC syndromes corresponding to each possible combination of 1 and 0 may be a sum of the CRC syndromes that correspond to the bit positions with a bit value of 1 in each possible combination. In response to determining that the updated CRC remainder equals zero, the receiver system may determine to find a solution and correct the first decrypted payload by flipping those bits in the first decrypted payload corresponding to the bit positions of the solution. In some implementations, the receiver system may decrypt each of the first and second received encrypted payloads by performing bitwise XOR between the keystream and each received encrypted payload. Therefore, a bit error occurring at a bit position of a received encrypted payload may simply flip the bit in the decrypted payload at the corresponding bit position. Hence, comparing decrypted payloads of 2 transmissions can find the same bit positions with different bit values as those bit positions found by comparing received encrypted payloads of the same 2 transmissions.

In some implementations, the receiver system may perform the CRC check on the second received encrypted payload and the second received CRC code to generate a second CRC remainder. The receiver system may determine whether the second CRC remainder is zero. In response to determining that the second CRC remainder is zero, the receiver system may determine that the CRC check passes. In some implementations, in response to determining that the second CRC remainder calculated by CRC hardware is non-zero, for each of the $2^D$ possible combinations of 1 and 0 out of the D bits, the receiver system may add (e.g., perform XOR) the sum of CRC syndromes corresponding to the possible combination to the second CRC remainder to generate an updated second CRC remainder, determine whether the updated second CRC remainder equals zero. In response to determining that the updated second CRC remainder equals zero, the receiver system may determine to find a solution and correct the second decrypted payload by flipping those bits in the second decrypted payload corresponding to the bit positions of the solution. Alternatively, in response to determining that the second CRC remainder is non-zero, for each of the $2^D$ possible combinations of 1 and 0 out of the D bits, the receiver system can determine whether the second CRC remainder equals the sum of the CRC syndromes corresponding to the possible combination. In response to determining that the second CRC remainder equals the sum of the CRC syndromes, the receiver system may determine to find a solution and correct the second decrypted payload by flipping those bits in the second decrypted payload corresponding to the bit positions of the solution.

In one aspect, in some cases, a wireless communication system (e.g., transmitter system) can use different key-streams for multiple transmissions to another wireless communication system (e.g., receiver system). For example, the transmitter system can use a first keystream to encrypt a payload for transmission and use a second keystream which is different from the first keystream, to encrypt the same payload for retransmission. Because the transmitter system uses different keystreams to encrypt the same payloads to generate different encrypted payloads, the transmitter system may generate different CRC codes based on the different encrypted payloads. When the receiver system receives the two different encrypted payloads and the corresponding two different CRC codes (e.g., one for the original transmission and the other for the retransmission of the payload), the receiver system may perform a CRC check and/or a CRC-EC (e.g., Z-CRC-EC). However, because the two versions of encrypted payloads (and the corresponding CRC codes) are generated based on different keystreams, comparing the two versions of CRC codes cannot reveal potential bit error positions in the CRC codes.

To solve this problem, systems and methods according to some embodiments of the present disclosure can determine that different encryption keystreams are used for multiple transmissions of the same packet or payload, and perform a CRC-EC on two encrypted bit-streams that are generated by encrypting the same payload using the different encryption keystreams. In some implementations, a wireless communication system (e.g., receiver system) can receive two encrypted bit-streams and decrypt the received two encrypted bit-streams using the corresponding different keystreams to generate two decrypted bit-streams, respectively. The receiver system can compare only the payload portion of the two decrypted bit-streams to find D bit positions at which the two decrypted bit-streams have different bit values. Then, for each of the $2^D$ possible combinations of 1 and 0 out of the D bits, the receiver system can compare the sum of CRC syndromes corresponding to the possible combination with either of the two CRC remainders computed at the receiver system for the two received encrypted bit-streams. The receiver system can determine whether there is a match with either of the two CRC remainders. In response to determining that there is a match with either of the two CRC remainders, the receiver system can determine to find a CRC-EC solution.

In some implementations, the receiver system can compare two decrypted payloads (which correspond to two received encrypted bit-streams) for possible or potential bit error positions in the payload instead of comparing two encrypted payloads that are encrypted using different keystreams. Based on a result of comparing the two decrypted payloads, the receiver system can find potential bit error positions at which the two decrypted payloads have different values. In some implementations, the receiver system can compare an XOR summation of CRC syndromes of some of the potential error bits with a first CRC remainder generated by hardware (e.g., CRC hardware) from the first encrypted bit-stream. In response to determining that there is a match between the XOR summation and the first CRC remainder, the receiver system can determine that a (CRC-EC) solution is found, and flip those bits identified by the CRC-EC solution in the first decrypted bit-stream. In this manner, errors occurring in the payload portion can be corrected only if the received CRC code in the first encrypted bit-stream has no bit errors.

In some implementations, to achieve better performance in finding a solution, the receiver system can compare the XOR summation of CRC syndromes with the first CRC remainder (generated from the first encrypted bit-stream), and compare the XOR summation of CRC syndromes with a CRC remainder (generated from the second encrypted bit-stream). In some implementations, in response to determining that a match between the XOR summation of CRC syndromes and the first CRC remainder is not found, the receiver system can determine that the first CRC code corresponding to the first encrypted bit-stream has bit errors. In response to determining that a match between the XOR summation of CRC syndromes and the second CRC remainder is found, the receiver system can determine that the second encrypted bit-stream has errors, and correct the second encrypted bit-stream by bit-flipping the second decrypted payload to obtain an error-corrected payload.

In some implementations, a communication system (e.g., transmitter system) may generate or store a first unencrypted (clear) payload, and encrypt the first payload by applying XOR using a first keystream to generate a first encrypted payload. The transmitter system may generate, based on the first encrypted payload using CRC generation, a first CRC code. The CRC generation may be implemented in software, firmware, hardware or a combination thereof. The transmitter system may transmit the first encrypted payload and the first CRC code via a wireless interface (e.g., wireless network interface device) to a wireless communication system (e.g., receiver system or decoder system). One or more bit errors may occur during the transmission. The receiver system may store a first received encrypted payload and a first received CRC code, which correspond to the first encrypted payload and the first CRC code, respectively. The receiver system may decrypt the first received encrypted payload by applying XOR using a keystream (which is the same as the first keystream) to generate a first decrypted payload. The receiver system may perform a CRC check on the first received encrypted payload and the first received CRC code to generate a first CRC remainder. The CRC check may be implemented in software, firmware, hardware or a combination thereof. The receiver system may determine whether the first CRC remainder is zero. In response to determining that the first CRC remainder is zero, the receiver system may determine that the CRC check passes. In response to determining that the first CRC remainder is non-zero, the receiver system can determine to fail the CRC check, and request for retransmitting the message (e.g., a copy of first encrypted payload) if available.

In some implementations, in response to the request for retransmitting the message, the transmitter system can generate or store a second unencrypted (clear) payload which contains the same bit values as the first unencrypted payload, and encrypt the second payload by applying XOR using a second keystream (which is different from the first keystream) to generate a second encrypted payload. The transmitter system may generate, based on the second encrypted payload using the CRC generation, a second CRC code. The transmitter system may transmit the second encrypted payload and the second CRC code via the wireless interface to the receiver system. One or more bit errors may occur during the transmission. The receiver system may store a second received encrypted payload and a second received CRC code, which correspond to the second encrypted payload and the second CRC code, respectively. The receiver system may decrypt the second received encrypted payload by applying XOR using the same keystream as the second keystream in the transmitter system to generate a second decrypted payload. The receiver system may perform the CRC check on the second received encrypted payload and the second received CRC code to generate a second CRC remainder. The receiver system may determine whether the second CRC remainder is zero. In response to determining that the second CRC remainder is zero, the receiver system may determine that the CRC check passes. In response to determining that the second CRC remainder is non-zero, the receiver system can determine to fail the CRC check, and perform CRC-EC.

In some implementations, the receiver system may compare (e.g., using bitwise XOR) the first decrypted payload and the second decrypted payload to generate a bitmap (e.g., XOR map). The receiver system may identify, from the XOR map, D number of bit positions having different bit values between the first decrypted payload and the second decrypted payload (e.g., D number of bit positions having a value of 1 in the XOR map). Next, the receiver system may perform a CRC-EC using the D number of bit positions. In some implementations, for each of the $2^D$ possible combinations of 1 and 0 out of these D bits, the receiver system may determine whether the first CRC remainder equals the sum of CRC syndromes corresponding to the possible combination. In response to determining that the first CRC remainder equals the sum of the CRC syndromes, the receiver system may determine to find a solution and correct the first decrypted payload by flipping those bits in the first decrypted payload corresponding to the bit positions of the solution. In response to determining that there is no match between the first CRC remainder equals the sum of the CRC syndromes for all of the $2^D$ possible combinations of 1 and 0 out of these D bits, the receiver system may determine that no solution is found and that there is one or more errors in the first CRC code.

In some implementations, for each of the $2^D$ possible combinations of 1 and 0 out of these D bits, the receiver system may determine whether the second CRC remainder equals the sum of CRC syndromes corresponding to the possible combination. In response to determining that the second CRC remainder equals the sum of the CRC syndromes, the receiver system may determine to find a solution and correct the second decrypted payload by flipping those bits in the second decrypted payload corresponding to the bit positions of the solution.

Embodiments in the present disclosure have at least the following advantages and benefits. First, embodiments in the present disclosure can provide useful techniques for performing a CRC-EC even when the received encrypted payload is not available or accessible to firmware of a wireless communication system. In some implementations, a wireless communication device (e.g., receiver system) can receive two versions of encrypted payload and corresponding CRC codes, decrypt the two versions of encrypted payload using the same keystream, and append the two CRC codes to the two versions of decrypted payload to generate a first bit-stream and a second bit-stream, respectively. The receiver system can then compare the two bit-streams to find D number of potential bit error positions at which the two bit-streams have different bit values. The receiver system can then perform a CRC-EC (or CRC-EC search) based on D number of potential bit error positions.

Second, embodiments in the present disclosure can provide useful techniques for performing a CRC-EC when two versions of encrypted payload (and the corresponding CRC codes) in two transmissions (e.g., one transmission and one retransmission) are generated based on different keystreams. In some implementations, a wireless communication device (e.g., receiver system) can decrypt the two versions of encrypted payload using the different keystreams and compare two versions of decrypted payloads to find D number of potential bit error positions at which the two versions of decrypted payloads have different bit values. The receiver system can then perform a CRC-EC (or CRC-EC search) based on D number of potential bit error positions. CRC-EC performance for different keystreams can be quite close to that of same keystream.

Third, embodiments in the present disclosure can provide useful techniques for performing a CRC-EC when only one transmission of payload and the corresponding CRC code are available (in other words, when no retransmission is performed). In some implementations, a wireless communication device (e.g., receiver system) can identify, using modem soft information on the received payload and the received CRC code, D number of bit positions corresponding to D number of least reliable decoded bits among decoded bits of the received payload and the received CRC code. The receiver system can then perform a CRC-EC (or CRC-EC search) based on D number of potential bit error positions.

Figure 6:
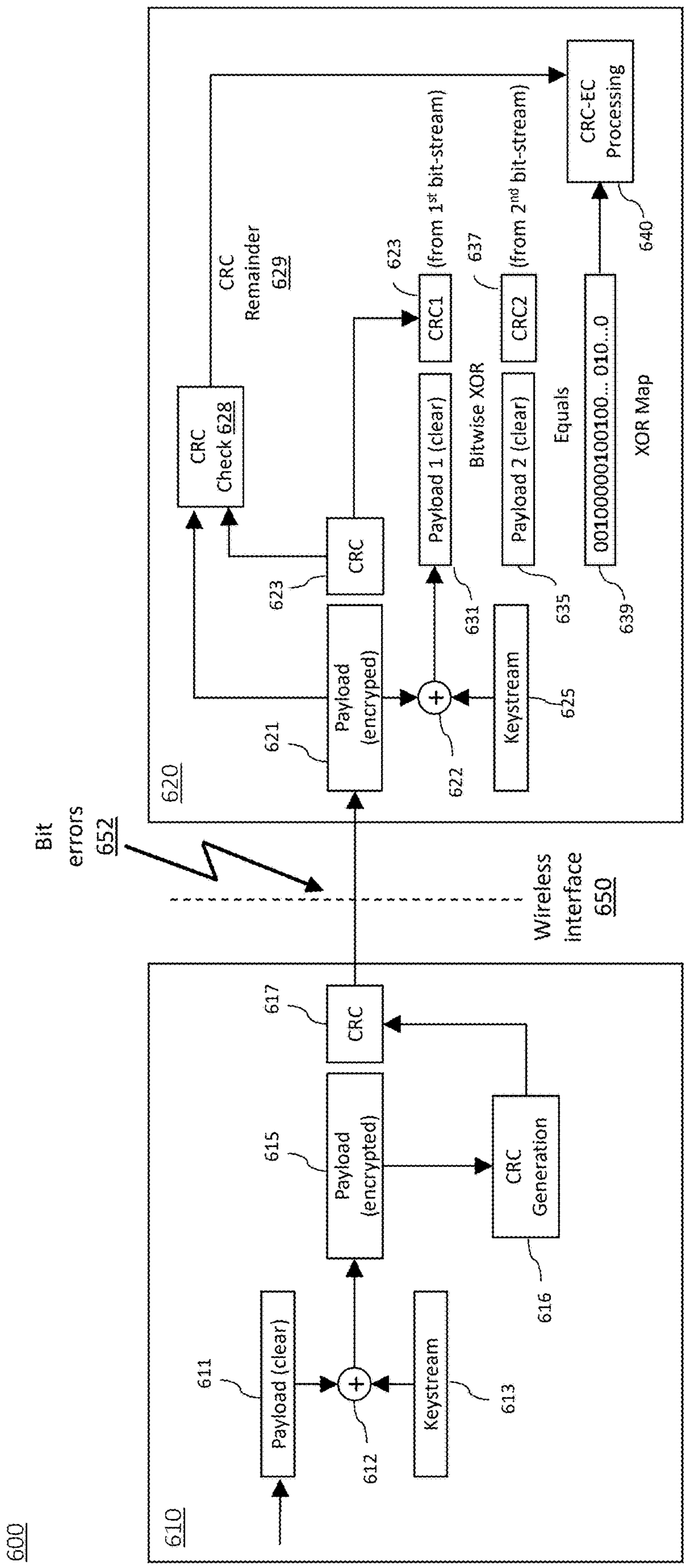
FIG. 6 is a diagram depicting an example process of CRC-EC on encrypted bit-streams encrypted with the same keystream, according to one or more embodiments.

FIG. 6 is a diagram depicting an example process 600 of CRC-EC on encrypted bit-streams encrypted with the same keystream, according to one or more embodiments. Referring to FIG. 6, a communication system (e.g., transmitter system 610) may generate or store a first unencrypted (clear) payload 611, and encrypt the first payload 611 by applying XOR 612 using a keystream 613 to generate a first encrypted payload 615. The transmitter system 610 may generate, based on the first encrypted payload 615 using CRC generation 616, a first CRC code 617. The CRC generation 616 may be implemented in software, firmware, hardware or a combination thereof. The transmitter system 610 may transmit the first encrypted payload 615 and the first CRC code 617 via a wireless interface 650 (e.g., wireless network interface device 2030) to a wireless communication system (e.g., receiver system or decoder system 620). One or more bit errors may occur during the transmission. The receiver system 620 may store a first received encrypted payload 621 and a first received CRC code 623, which correspond to the first encrypted payload 615 and the first CRC code 617, respectively. The receiver system 620 may decrypt the first received encrypted payload 621 by applying XOR 622 using a keystream 625 to generate a first decrypted payload 631. The receiver system 620 may perform a CRC check 628 on the first received encrypted payload 621 and the first received CRC code 623 to generate a CRC remainder 629. The CRC check 628 may be implemented in software, firmware, hardware or a combination thereof. The receiver system 620 may determine whether the CRC remainder 629 is zero. In response to determining that the CRC remainder 629 is zero, the receiver system 620 may determine that the CRC check 628 passes. In response to determining that the CRC remainder 629 is non-zero, the receiver system can determine to fail the CRC check 628, request for retransmitting the message (e.g., a copy of first encrypted payload) if available.

In some implementations, in response to the request for retransmitting the message, the transmitter system 610 can generate or store a second unencrypted (clear) payload (not shown) which contains the same bit values as the first unencrypted payload, and encrypt the second payload by applying XOR using the same keystream 613 to generate a second encrypted payload (not shown). The transmitter system 610 may generate, based on the second encrypted payload using CRC generation 616, a second CRC code (not shown). The transmitter system 610 may transmit the second encrypted payload and the second CRC code via the wireless interface 650 to the receiver system 620. The receiver system 620 may receive a second received encrypted payload (not shown) and a second received CRC code 637, which correspond to the second encrypted payload and the second CRC code, respectively. The receiver system 610 may decrypt the second received encrypted payload by applying XOR 622 using the same keystream 625 as the keystream 613 in the transmitter system 610 to generate a second decrypted payload 635.

In some implementations, the receiver system 620 may append the first received CRC code 623 to the first decrypted payload 631 to generate a first (extended) bit-stream, and append the second received CRC code 637 to the second decrypted payload 635 to generate a second (extended) bit-stream. The receiver system 620 may compare (e.g., using bitwise XOR) the first bit-stream and the second bit-stream to generate a bitmap (e.g., XOR map 639). The receiver system 620 may identify, from the XOR map 639, D number of bit positions having different bit values between the first bit-stream and the second bit-stream (e.g., D number of bit positions having a value of 1 in the XOR map 639). Next, the receiver system 620 may perform a CRC-EC using the D number of bit positions. For each of the $2^D$ possible combinations of 1 and 0 out of these D bits, the receiver system 620 may add, or perform XOR between, the CRC remainder 629 calculated by CRC hardware and the CRC syndromes for all bit positions among the D bits with a value of 1 in the possible combination. In response to determining that a result of performing the XOR as an updated CRC remainder is equal to 0, the receiver system 620 may determine that a set of the bit positions used in performing the XOR is the correct CRC-EC solution, and correct the bit errors by flipping those bits in the first decrypted payload 631 corresponding to, or identified by, the set of the bit positions in the CRC-EC solution that have a bit value of 1.

In some implementations, in response to determining that the CRC remainder 629 calculated by CRC hardware equals 0, the receiver system 620 may determine that there is no bit errors. In response to determining that the CRC remainder 629 calculated by CRC hardware is non-zero, the receiver system 620 may determine that there is one or more bit errors, and for each of the $2^D$ possible combinations of 1 and 0 out of the D bits, determine whether the CRC remainder 629 equals the sum of CRC syndromes corresponding to the possible combination. In response to determining that the CRC remainder 629 equals the sum of the CRC syndromes, the receiver system 620 may determine to find a solution and correct the first decrypted payload 631 by flipping those bits in the first decrypted payload 631 corresponding to the bit positions of the solution.

In some implementations, the receiver system 620 may perform the CRC check 628 on the second received encrypted payload and the second received CRC code 637 to generate a second CRC remainder (not shown). The receiver system 620 may determine whether the second CRC remainder is zero. In response to determining that the second CRC remainder is zero, the receiver system 620 may determine that the CRC check passes. In some implementations, in response to determining that the second CRC remainder calculated by CRC hardware is non-zero, for each of the $2^D$ possible combinations of 1 and 0 out of the D bits, the receiver system 620 may add (e.g., perform XOR) the sum of CRC syndromes corresponding to the possible combination to the second CRC remainder to generate an updated second CRC remainder (not shown), and determine whether the updated second CRC remainder equals zero. In response to determining that the updated second CRC remainder equals zero, the receiver system 620 may determine to find a solution and correct the second decrypted payload 635 by flipping those bits in the second decrypted payload 635 corresponding to the bit positions of the solution. Alternatively, in response to determining that the second CRC remainder is non-zero, for each of the $2^D$ possible combinations of 1 and 0 out of the D bits, the receiver system 620 can determine whether the second CRC remainder equals the sum of the CRC syndromes corresponding to the possible combination. In response to determining that the second CRC remainder equals the sum of the CRC syndromes, the receiver system 620 may determine to find a solution and correct the second decrypted payload 635 by flipping those bits in the second decrypted payload 635 corresponding to the bit positions of the solution.

Figure 7A:
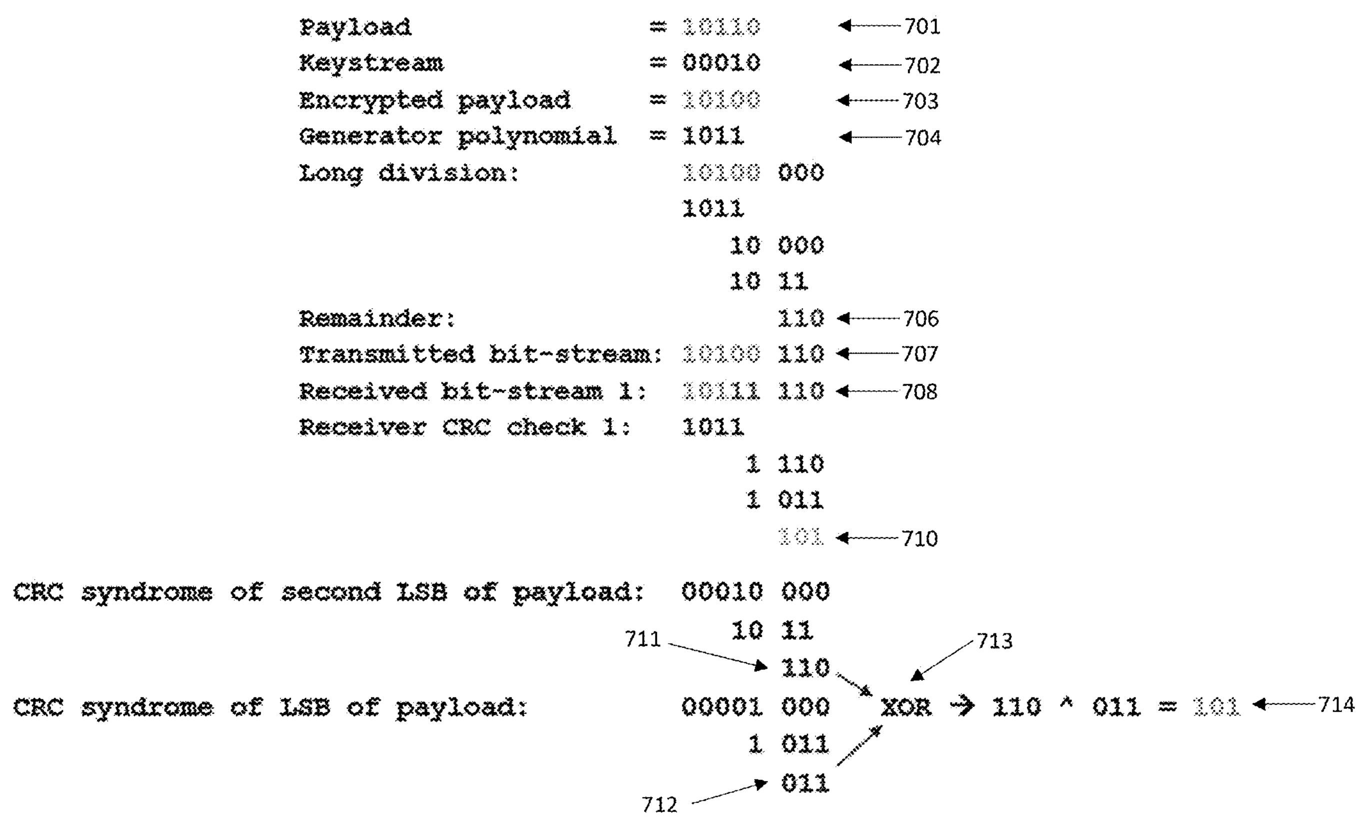
FIG. 7A and FIG. 7B are diagrams depicting example calculation steps of performing CRC-EC on encrypted bit-streams encrypted with the same keystream according to one or more embodiments.
Figure 7B:
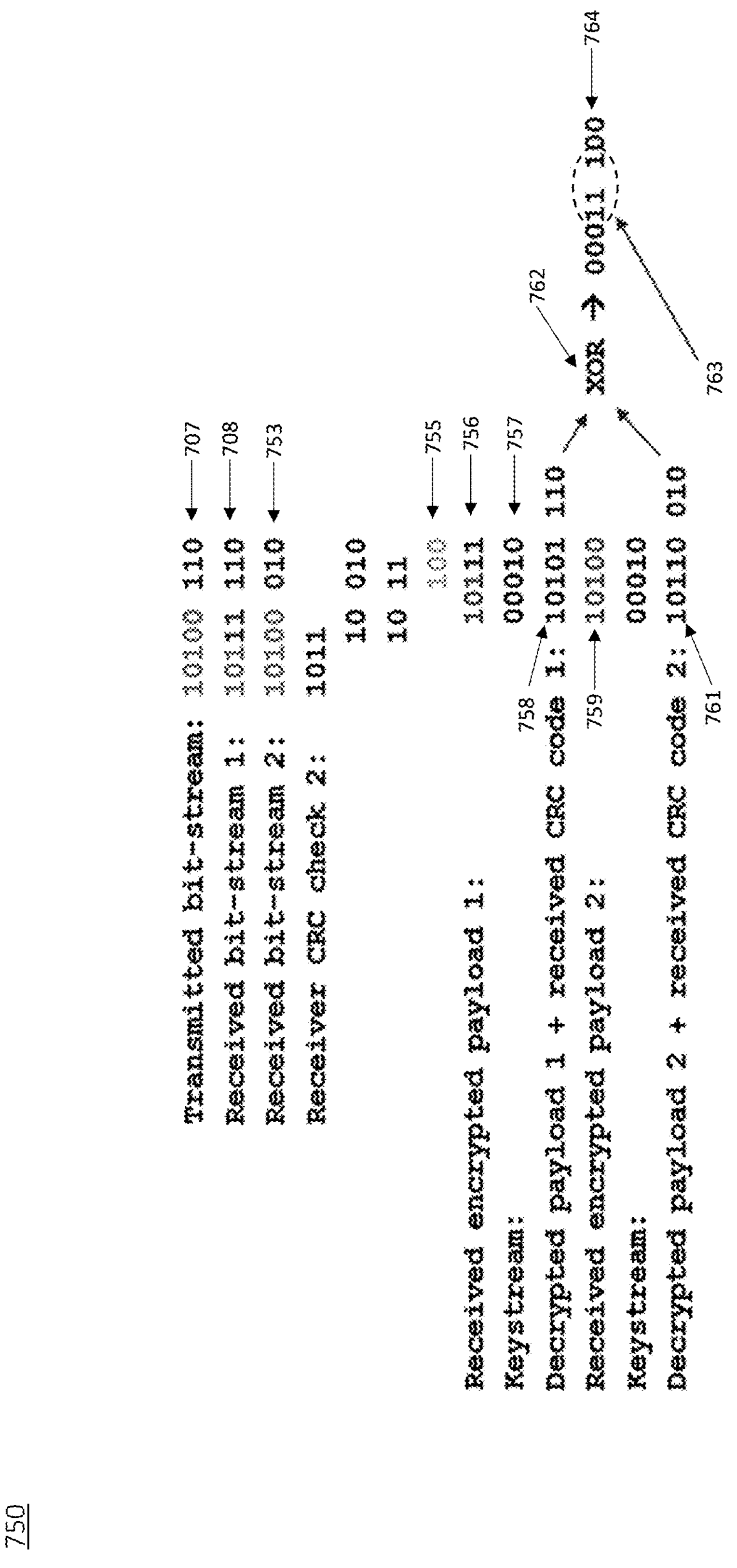

FIG. 7A and FIG. 7B are diagrams 700, 750 depicting example calculation steps of performing CRC-EC on encrypted bit-streams encrypted with the same keystream according to one or more embodiments. The diagram 700 shows example values of (actual) bit error positions, a CRC remainder, and the sum (or XOR) of CRC syndromes calculated based on the bit error positions. Referring to FIG. 7A, a transmitter system (e.g., transmitter system 610) can encrypt a 5-bit payload ("10110") 701 using a keystream "00010" 702 to generate an encrypted payload "10100" 703. The transmitter system can calculate a CRC code "110" 706 corresponding to the encrypted payload 703 by appending "000" to the encrypted payload 703 and doing a long division using G(x) polynomial "1011" 704. The transmitter system can transmit a first bit-stream 707 including the encrypted payload 703 and the CRC code 706. A receiver system (e.g., receiver system 620) can store a first received bit-stream 708 in which 2-bit errors occur at the LSB and the second least significant bit (LSB) of the encrypted payload. The receiver system can perform a CRC check to calculate a first 3-bit CRC remainder "101" 710 (e.g., from CRC hardware in the receiver system). FIG. 7A shows that the first CRC remainder 710 is equal to the sum "101" 714 of a CRC syndrome 711 of the second LSB of the payload and a CRC syndrome 712 of the LSB of the payload, calculated using XOR 713.

The diagram 750 shows example calculation steps of performing CRC-EC on two encrypted bit-streams encrypted with the same keystream. Referring to FIG. 7B, the receiver system can store the first received bit-stream 708 including the first received encrypted payload 756 and a received first CRC code "110". The receiver system can store a second received bit-stream 753 including the second received encrypted payload 759 and a received second CRC code "010". It is noted that the first received bit-stream 708 contains 2 bit errors in the payload (compared with the transmitted bit-stream 707); and that the second received bit-stream 753 contains a 1 bit error in the CRC code (compared with the transmitted bit-stream 707).

The receiver system can perform the CRC check to calculate a second 3-bit CRC remainder "100" 755 (e.g., from CRC hardware in the receiver system). The receiver system can decrypt the first received encrypted payload 756 using a keystream 757 (which is the same as the keystream 702 in the transmitter system) to generate a first decrypted payload. The receiver system can append the received first CRC code "110" to the first decrypted payload to generate a first (extended) bit-stream 758. The receiver system can decrypt the second received encrypted payload 759 using the keystream 757 to generate a second decrypted payload. The receiver system can append the received second CRC code "010" to the second decrypted payload to generate a second (extended) bit-stream 761. The receiver system can compare (e.g., using XOR 762) the first bit-stream 758 and the second bit-stream 761 to generate an XOR map 764. The receiver system can identify, from the XOR map 764, potential 3-bit error positions 763 (D=3).

In some implementations, the receiver system can search through $2^D$ possible combinations of 1 and 0 (actually only $2^D-1$, because the combination "000" indicates no bit error, which is not a CRC-EC solution). The receiver system can calculate a sum (or XOR) of CRC syndromes corresponding to one or more combinations of bit error positions (e.g., LSB and second LSB of the payload), and determine whether the sum matches the first CRC remainder 710. In response to determining that the sum (e.g., sum 714) matches the first CRC remainder 710, the receiver system can correct the first decrypted payload to generate a corrected first decrypted payload "10110" by flipping the LSB and second LSB of the first decrypted payload (or calculating XOR of the first decrypted payload "10101" with a bit pattern of the LSB and second LSB of the payload "00011").

In some implementations, the receiver system can calculate a sum (or XOR) of CRC syndromes corresponding to one or more combinations of bit error positions (e.g., most significant bit (MSB) of the CRC code), and determine whether the sum (e.g., the CRC syndrome "100" for a single bit error bit-stream "00000 100") matches the second CRC remainder "100' 755. In response to determining that the sum matches the second CRC remainder 755, the receiver system can determine that the solution is "00000 100" in the XOR map. Since the first 5 bits of the XOR map are 0, there is no bit error in the second decrypted payload, the receiver system can determine that the second decrypted payload "10110" is the error-corrected payload.

Figure 8A:
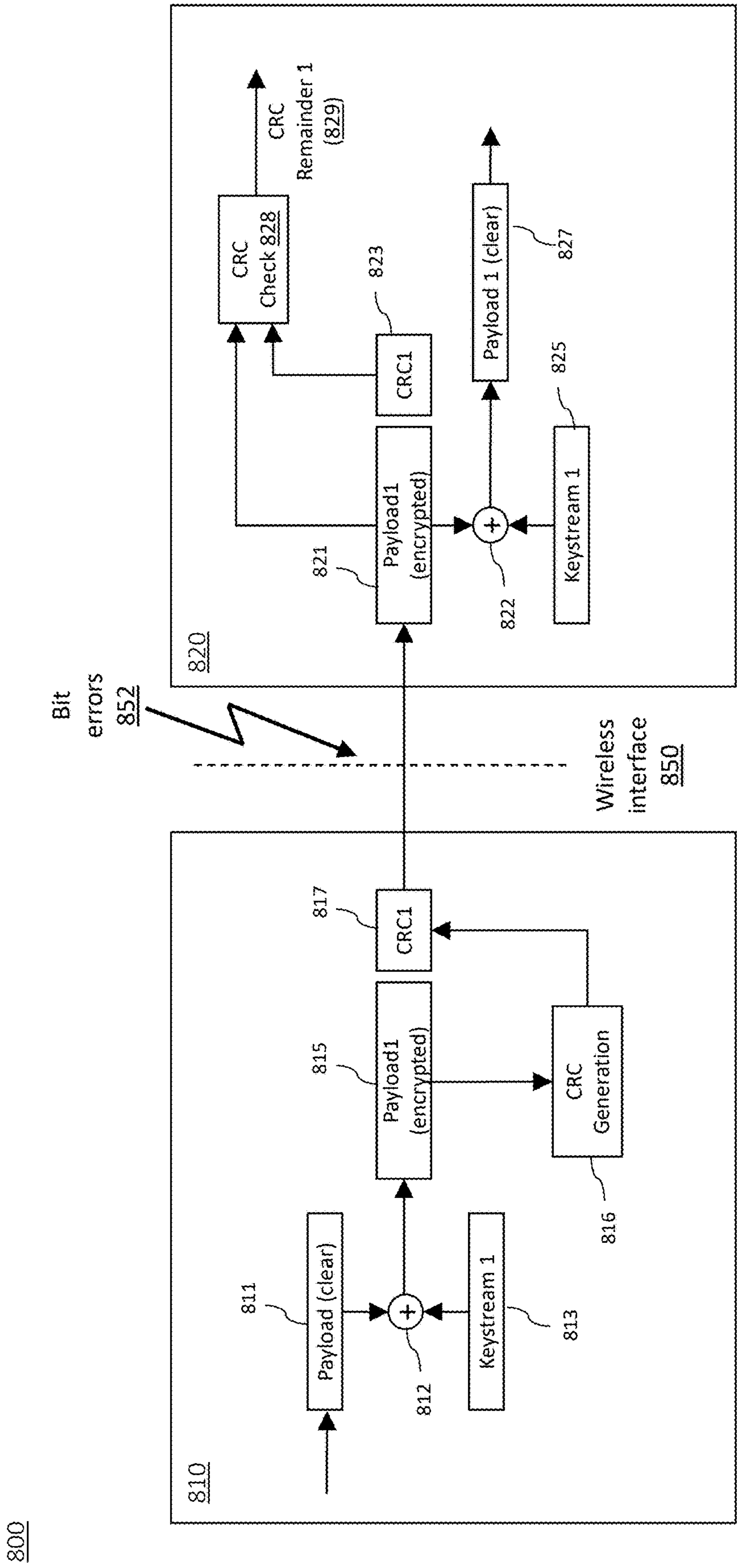
FIG. 8A to FIG. 8C are diagrams depicting an example process of CRC-EC on encrypted bit-streams encrypted with different keystreams, according to one or more embodiments.
Figure 8B:
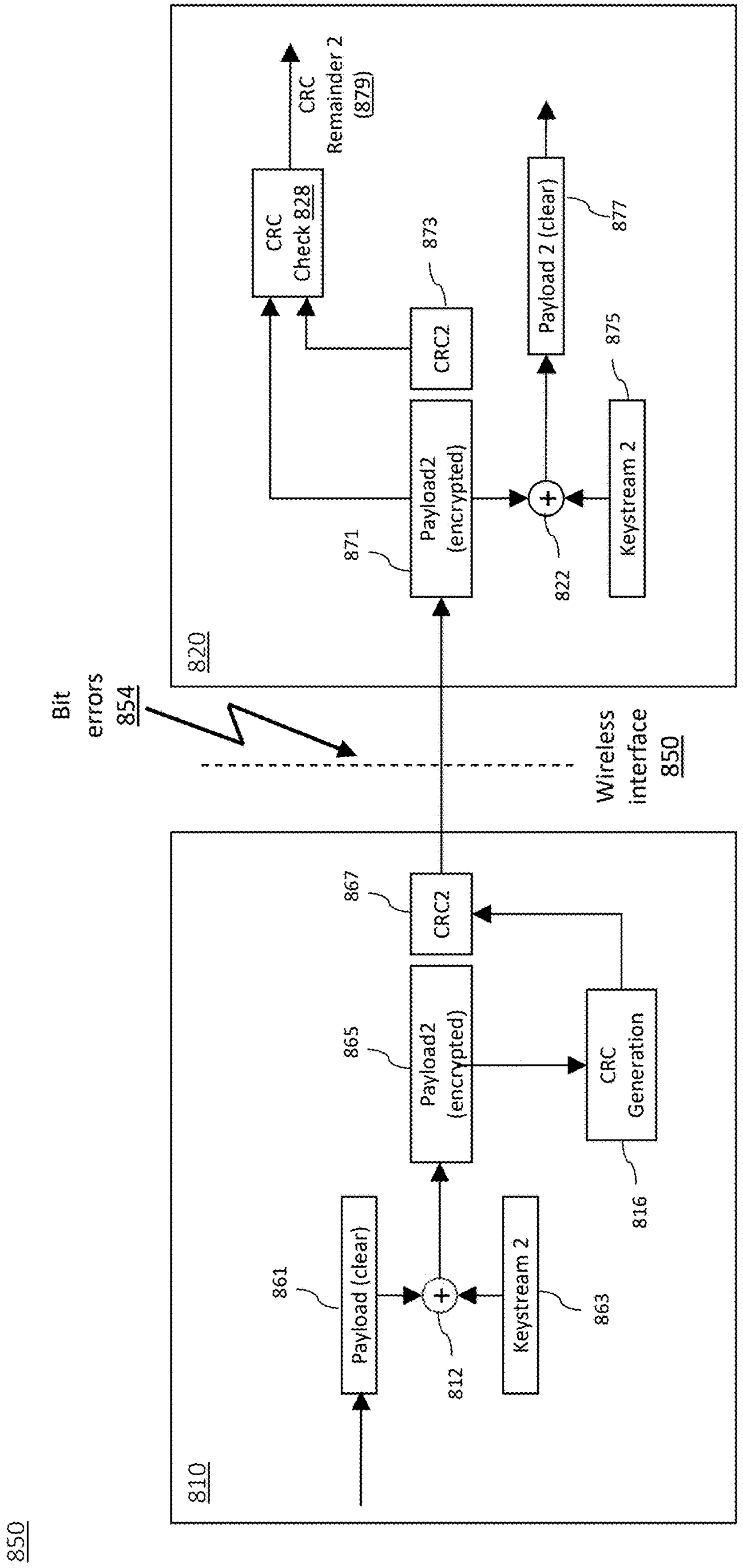
Figure 8C:
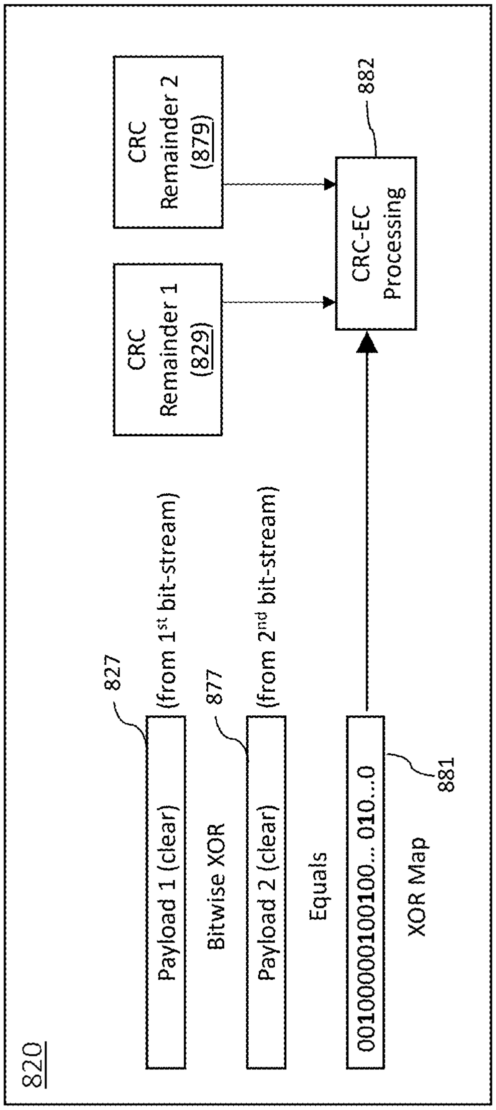

FIG. 8A to FIG. 8C are diagrams 800, 850, 880 depicting an example process of CRC-EC on encrypted bit-streams encrypted with different keystreams, according to one or more embodiments. Referring to FIG. 8A, a communication system (e.g., transmitter system 810) may generate or store a first unencrypted (clear) payload 811, and encrypt the first payload 811 by applying XOR 812 using a first keystream 813 to generate a first encrypted payload 815. The transmitter system 810 may generate, based on the first encrypted payload 815 using CRC generation 816, a first CRC code 817. The CRC generation 816 may be implemented in software, firmware, hardware or a combination thereof. The transmitter system 810 may transmit the first encrypted payload 815 and the first CRC code 817 via a wireless interface 850 (e.g., wireless network interface device 2030) to a wireless communication system (e.g., receiver system or decoder system 820). One or more bit errors 852 may occur during the transmission. The receiver system 820 may store a first received encrypted payload 821 and a first received CRC code 823, which correspond to the first encrypted payload 815 and the first CRC code 817, respectively. The receiver system 820 may decrypt the first received encrypted payload 821 by applying XOR 822 using a keystream 825 (which is the same as the first keystream 813) to generate a first decrypted payload 827. The receiver system 820 may perform a CRC check 828 on the first received encrypted payload 821 and the first received CRC code 823 to generate a first CRC remainder 829. The CRC check 828 may be implemented in software, firmware, hardware or a combination thereof. The receiver system 820 may determine whether the first CRC remainder 829 is zero. In response to determining that the first CRC remainder 829 is zero, the receiver system 820 may determine that the CRC check passes. In response to determining that the first CRC remainder 829 is non-zero, the receiver system can determine to fail the CRC check, and request for retransmitting the message (e.g., a copy of first encrypted payload) if available.

Referring to FIG. 8B, in response to the request for retransmitting the message, the transmitter system 810 can generate or store a second unencrypted (clear) payload 861 which contains the same bit values as the first unencrypted payload 811, and encrypt the second payload 861 by applying XOR 812 using a second keystream 863 (which is different from the first keystream 813) to generate a second encrypted payload 865. The transmitter system 810 may generate, based on the second encrypted payload 865 using the CRC generation 816, a second CRC code 867. The transmitter system 810 may transmit the second encrypted payload 865 and the second CRC code 867 via the wireless interface 850 to the receiver system 820. One or more bit errors 854 may occur during the transmission. The receiver system 820 may store a second received encrypted payload 871 and a second received CRC code 873, which correspond to the second encrypted payload 865 and the second CRC code 867, respectively. The receiver system 820 may decrypt the second received encrypted payload 871 by applying XOR 822 using the same keystream 875 as the second keystream 863 in the transmitter system 810 to generate a second decrypted payload 877. The receiver system 820 may perform the CRC check on the second received encrypted payload 871 and the second received CRC code 873 to generate a second CRC remainder 879. The receiver system may determine whether the second CRC remainder 879 is zero. In response to determining that the second CRC remainder 879 is zero, the receiver system may determine that the CRC check passes. In response to determining that the second CRC remainder 879 is non-zero, the receiver system can determine to fail the CRC check, and perform CRC-EC.

Referring to FIG. 8C, the receiver system 820 may compare (e.g., using XOR) the first decrypted payload 827 and the second decrypted payload 877 to generate a bitmap (e.g., XOR map 881). The receiver system 820 may identify, from the XOR map 881, D number of bit positions having different bit values between the first decrypted payload 827 and the second decrypted payload 877 (e.g., D number of bit positions having a value of 1 in the XOR map 881). Next, the receiver system 820 may perform a CRC-EC using the D number of bit positions. In some implementations, for each of the $2^D$ possible combinations of 1 and 0 out of these D bits, the receiver system 820 may determine whether the first CRC remainder 829 equals the sum of CRC syndromes corresponding to the possible combination. In response to determining that the first CRC remainder 829 equals the sum of the CRC syndromes, the receiver system 820 may determine to find a solution and correct the first decrypted payload 827 by flipping those bits in the first decrypted payload 827 corresponding to the bit positions of the solution. In response to determining that there is no match between the first CRC remainder 829 equals the sum of the CRC syndromes for all of the $2^D$ possible combinations of 1 and 0 out of these D bits, the receiver system 820 may determine that no solution is found and that there is one or more errors in the first CRC code 823.

In some implementations, for each of the $2^D$ possible combinations of 1 and 0 out of these D bits, the receiver system 820 may determine whether the second CRC remainder 879 equals the sum of CRC syndromes corresponding to the possible combination. In response to determining that the second CRC remainder 879 equals the sum of the CRC syndromes, the receiver system 820 may determine to find a solution and correct the second decrypted payload 877 by flipping those bits in the second decrypted payload 877 corresponding to the bit positions of the solution.

Figure 9B:
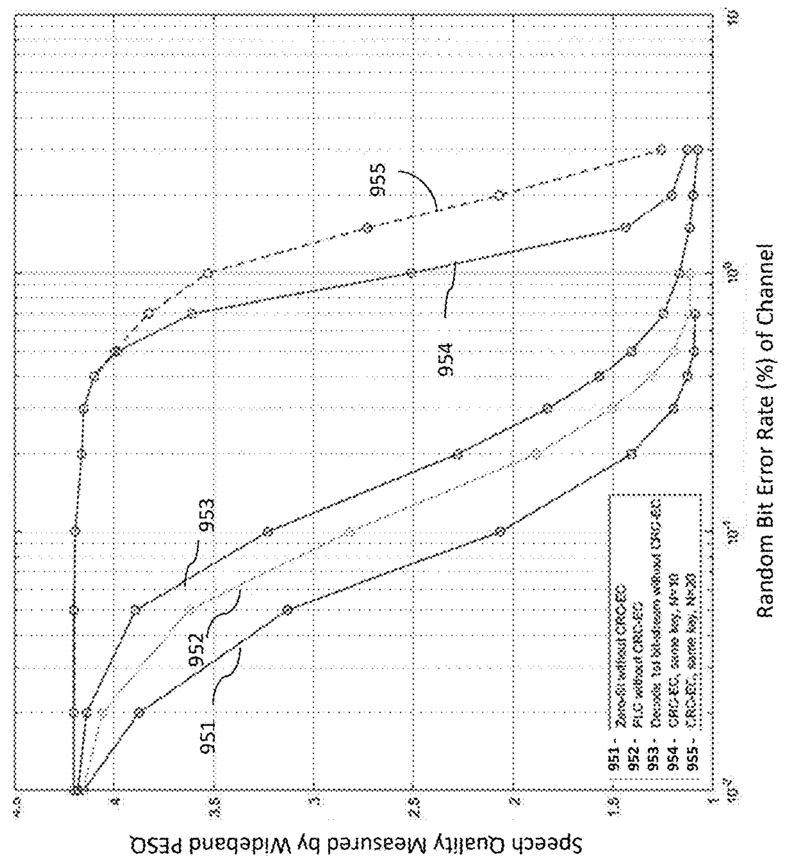
FIG. 9A and FIG. 9B are diagrams depicting example simulation results using different CRC-EC schemes on encrypted bit-streams, according to one or more embodiments.
Figure 9A:
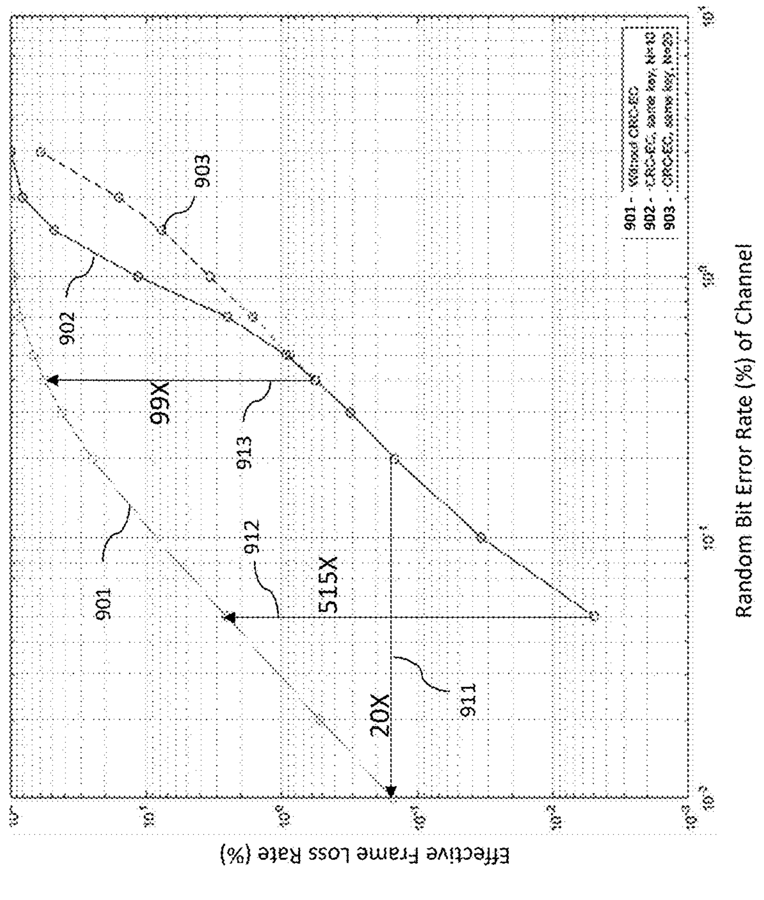

FIG. 9A and FIG. 9B are diagrams depicting example simulation results using different CRC-EC schemes on encrypted bit-streams, according to one or more embodiments. The simulation results show CRC-EC performance for 32 kbps LC3-encoded wideband speech (16 kHz sampling) with 1 retransmission (i.e., two transmissions) when the same keystream is used for the two transmissions. Referring to FIG. 9A, lines 901, 902, 903 correspond to simulation results (effective frame loss rate (%) vs random bit error rate (BER) (%) of the channel) using CRC-EC configurations of (1) no CRC-EC, (2) CRC-EC with the same keystream and a maximum number of bit error positions (N)=10, (3) CRC-EC with the same keystream and N=20, respectively. Typically one packet contains an integer number of frames where the integer is 1 or greater. Hence, the "effective frame loss rate" may be the same as effective packet loss rate. Referring to FIG. 9B, lines 951, 952, 953, 954, 955 correspond to simulation results (speech quality vs random BER) using CRC-EC configurations of (1) zero-fill without CRC-EC, (2) packet loss concealment (PLC) without CRC-EC, (3) decode the first bit-stream without CRC- EC, (4) CRC-EC with the same keystream and N=10, (5) CRC-EC with the same keystream and N=20, respectively. It is noted that the effective frame loss rate for 32 kbps LC3 was measured with 10 ms frames and 1 retransmission; and that the speech quality was measured using Wideband Perceptual Evaluation of Speech Quality (PESQ) as defined by the ITU-T Recommendation P.862 for 32 kbps LC3 with 10 ms frames and 1 retransmission. It is also noted that the "zero-fill" indicates filling zero values for all speech signal samples corresponding to packets that fail the CRC checks for both transmissions; and that the "PLC" indicates performing Packet Loss Concealment for any packet that fails the CRC checks for both transmissions. As shown in FIG. 9A, the effective frame loss rate of the configuration (3) (CRC-EC with the same keystream and N=20) at a high BER can be the same as that of the configuration (1) (no CRC-EC) at a low BER (e.g., 20 times lower than the high BER); at the same low BER, the configuration (1) can have the effective frame loss rate 515 times higher than the configuration (3); and at the same high BER, the configuration (1) can have the effective frame loss rate 99 times higher than the configuration (3). In summary, FIG. 9A shows that the CRC-EC in configurations (2) and (3) can withstand up to 20× higher BER for the same effective frame loss rate, or have 99 times to 515 times lower effective frame loss rate for the same BER.

Figure 10B:
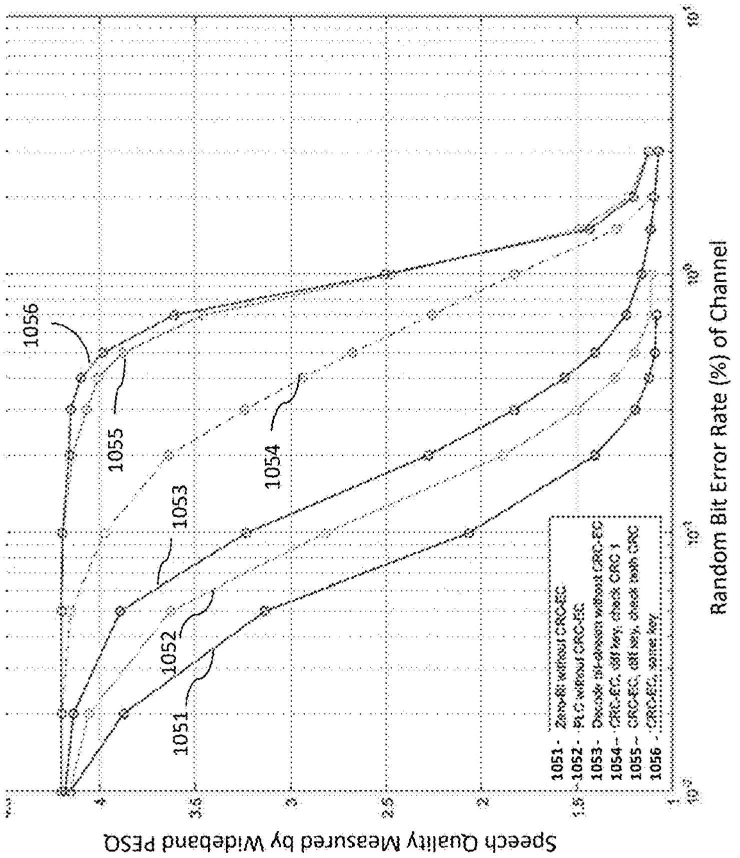
FIG. 10A and FIG. 10B are diagrams depicting example simulation results using different CRC-EC schemes on encrypted bit-streams, according to one or more embodiments.
Figure 10A:
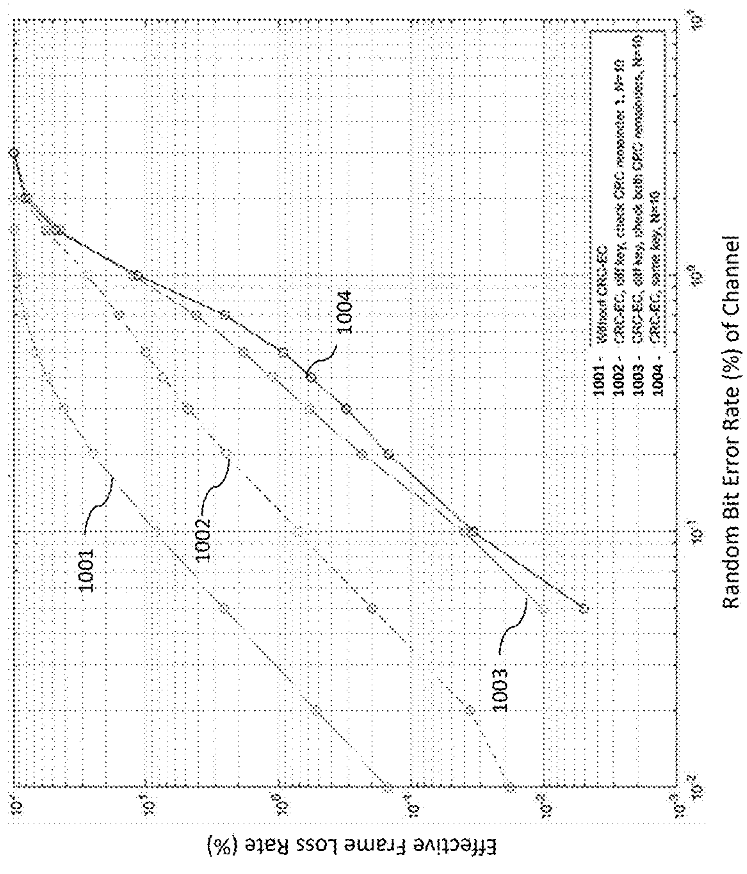

FIG. 10A and FIG. 10B are diagrams depicting example simulation results using different CRC-EC schemes on encrypted bit-streams, according to one or more embodiments. The simulation results show CRC-EC performance for 32 kbps LC3 wideband speech with 1 retransmission (i.e., two transmissions). Referring to FIG. 10A, lines 1001, 1002, 1003, 1004 correspond to simulation results (effective frame loss rate (%) vs random bit error rate (BER) (%) of the channel) using CRC-EC configurations of (1) no CRC-EC, (2) CRC-EC with different keystreams, a maximum number of bit error positions (N)=10 and checking the first CRC remainder only, (3) CRC-EC with different keystreams, N=10 and check both the first CRC remainder and the second CRC remainder, and (4) CRC-EC with the same keystream, N=10, respectively. Referring to FIG. 10B, lines 1051, 1052, 1053, 1054, 1055, 1056 correspond to simulation results (speech quality vs random BER) using CRC-EC configurations of (1) zero-fill without CRC-EC, (2) PLC without CRC-EC, (3) decode the first bit-stream without CRC-EC, (4) CRC-EC with different keystreams and checking the first CRC remainder only, (5) CRC-EC with different keystreams and checking both the first CRC remainder and the second CRC remainder, (6) CRC-EC with the same key, respectively. It is noted that the effective frame loss rate for 32 kbps LC3 was measured with 10 ms frames and 1 retransmission; and that the speech quality was measured using Wideband PESQ for 32 kbps LC3 with 10 ms frames and 1 retransmission.

Figure 11B:
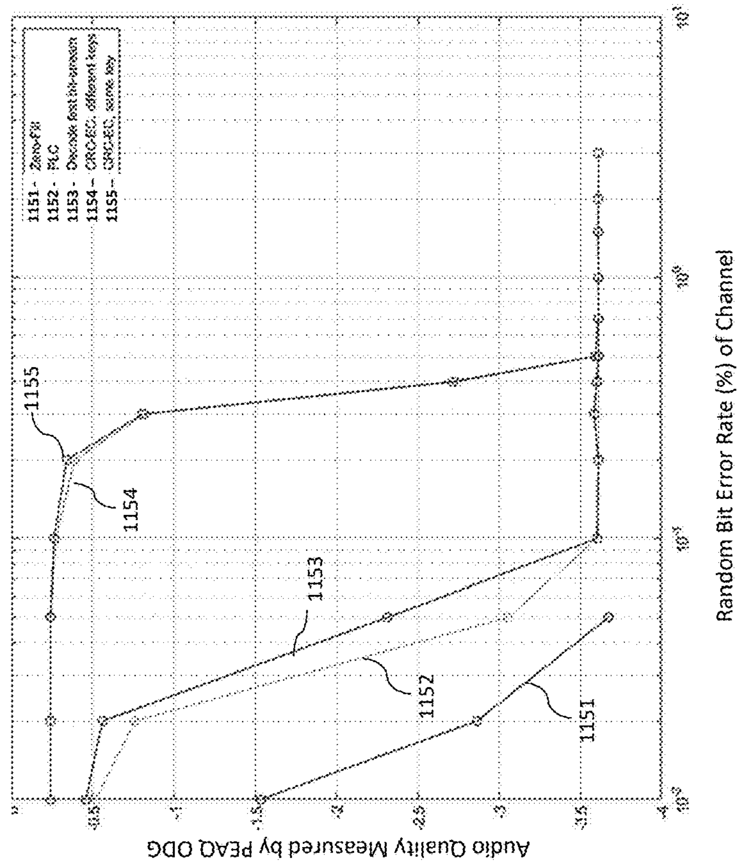
FIG. 11A and FIG. 11B are diagrams depicting example simulation results using different CRC-EC schemes on encrypted bit-streams, according to one or more embodiments.
Figure 11A:
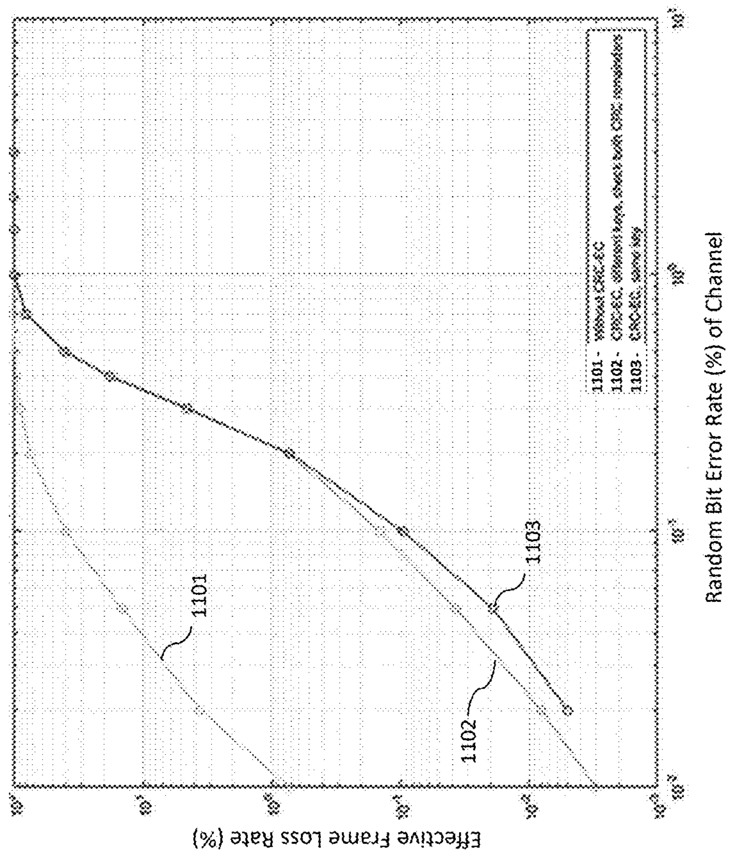

FIG. 11A and FIG. 11B are diagrams depicting example simulation results using different CRC-EC schemes on encrypted bit-streams, according to one or more embodiments. The simulation results show CRC-EC performance for 96 kbps LC3-encoded full-band (48 kHz sampling) audio signals including both music and speech with 1 retransmission (i.e., two transmissions). Referring to FIG. 11A, lines 1101, 1102, 1103 correspond to simulation results (effective frame loss rate (%) vs random bit error rate (BER) (%) of the channel) using CRC-EC configurations of (1) no CRC-EC, (2) CRC-EC with different keystreams and checking both the first CRC remainder and the second CRC remainder, (3) CRC-EC with the same keystream, respectively. Referring to FIG. 11B, lines 1051, 1052, 1053, 1054, 1055 correspond to simulation results (speech quality vs random BER) using CRC-EC configurations of (1) zero-fill without CRC-EC, (2) PLC without CRC-EC, (3) decode the first bit-stream without CRC-EC, (4) CRC-EC with different keystreams, (5) CRC-EC with the same key, respectively. It is noted that the effective frame loss rate for 96 kbps LC3 was measured with 10 ms frames and 1 retransmission; and that the audio quality was measured using Perceptual Evaluation of Audio Quality (PEAQ) as defined by the ITU-R Recommendation BS.1387 for 96 kbps LC3 with 10 ms frames, 1 retransmission and N=10.

V. CRC-EC Using Modem Soft Information

In some implementations, a wireless communication system (e.g., receiver system, decoder system) can receive a payload and a CRC code corresponding to the payload. The receiver system may identify, using modem soft information on the received payload and the received CRC code, D number of bit positions corresponding to D number of least reliable decoded bits among decoded bits of the received payload and the received CRC code. The modem soft information of received (or decoded) bits refers to soft demodulated information, soft bits information, log-likelihood ratios (LLRs), any information that indicates how likely each of the received (or decoded) bits is to be 0 or 1, or any information indicating the reliability of each received (decoded) bit. Next, the receiver system may perform a CRC-EC using the D number of bit positions. In some implementations, for each of the $2^D$ possible combinations of 1 and 0 out of these D bits, the receiver system may determine whether a CRC remainder generated from the received payload and the CRC code equals the sum of CRC syndromes corresponding to the possible combination. In response to determining that the CRC remainder equals the sum of the CRC syndromes, the receiver system may determine to find a solution and correct the received payload by flipping those bits in the received payload corresponding to the bit positions of the solution. The vast majority of the time only "one of" the sums of CRC syndromes can be equal to the CRC remainder, and that one can give the CRC-EC solution. In some implementations, the receiver system can configure CRC-EC to correct a maximum of N=10 bit errors. The receiver system can then use the modem soft information to identify the 10 least reliable decoded bits and then perform a CRC-EC search to correct bit errors. In this manner, the receiver system can perform a CRC-EC for only 1 transmission (and 0 retransmission).

In some implementations, even for 1 or 2 retransmissions, the receiver system can potentially combine the XOR map with the modem soft information to achieve even better CRC-EC performance. For example, if bit errors hit the same bit position in both bit-streams (e.g., the original transmission and a retransmission), an XOR map may miss this bit position because values at this bit position in both bit-streams are the same. In some implementations, the receiver system can use modem soft information to determine that this bit (or bit position) is not reliable for both bit-streams. In response to determining that a bit (or bit position) is not reliable and is not identified from the XOR map, the receiver system can add this bit position to the CRC-EC search and potentially correct this bit error.

In some implementations, a hybrid scheme can combine modem soft information with a result of the XOR of two bit-streams to identify potential bit error positions for CRC-EC search. This can have better performance than either of the two methods working alone (e.g., using modem soft information only or using XOR only) to identify potential bit error.

VI. CRC-EC for Bit Error Concealment (BEC) Using Majority Vote

For Bluetooth Low Energy (LE), packet loss concealment (PLC) can be performed to optimize for the LC3 codec (e.g., LC3). When the LC3 codec is used for transmission of audio signals through a Bluetooth LE wireless link, the transmission channel may be subject to packet loss and bit errors. While many PLC techniques are available to reduce the audio quality degradation due to packet loss, few techniques are available to improve audio quality when there are bit errors in the received bit-stream.

For the LC3 codec, bit error concealment (BEC) can be implemented in the form of CRC error correction (CRC-EC) to make an LC3 output robust to bit errors. Conventional CRC-EC techniques (e.g., Zopf's original CRC-EC scheme (Z-CRC-EC), or Grunert's CRC-EC enhancements (referred to as "G-CRC-EC")) can use the error detection capability of CRC to correct bit errors in a computationally efficient manner, and provide dramatic improvement to audio quality when the bit error rate is high. However, Z-CRC-EC cannot handle encrypted bit-streams and is grossly suboptimal for the case of 2 retransmissions. G-CRC-EC can handle some encrypted bit-streams and improve the performance for 2 retransmissions, but there is still substantial room for improvements. For example, for 2 retransmissions of a bit-stream (3 transmissions of the bit-stream), the Z-CRC-EC scheme uses XOR to find all D bit positions that did not have the same bit value for all 3 bit-streams, and then performs a CRC-EC search on these D bit positions. However, for a given bit error rate, the D value for 3 transmissions of a bit-stream may tend to be about 50% larger than the D value for 2 transmissions of the bit-stream, and the D value for 3 transmissions may likely exceed a cap or a threshold value (e.g., N=10) and the CRC-EC may likely abort.

Figure 12:
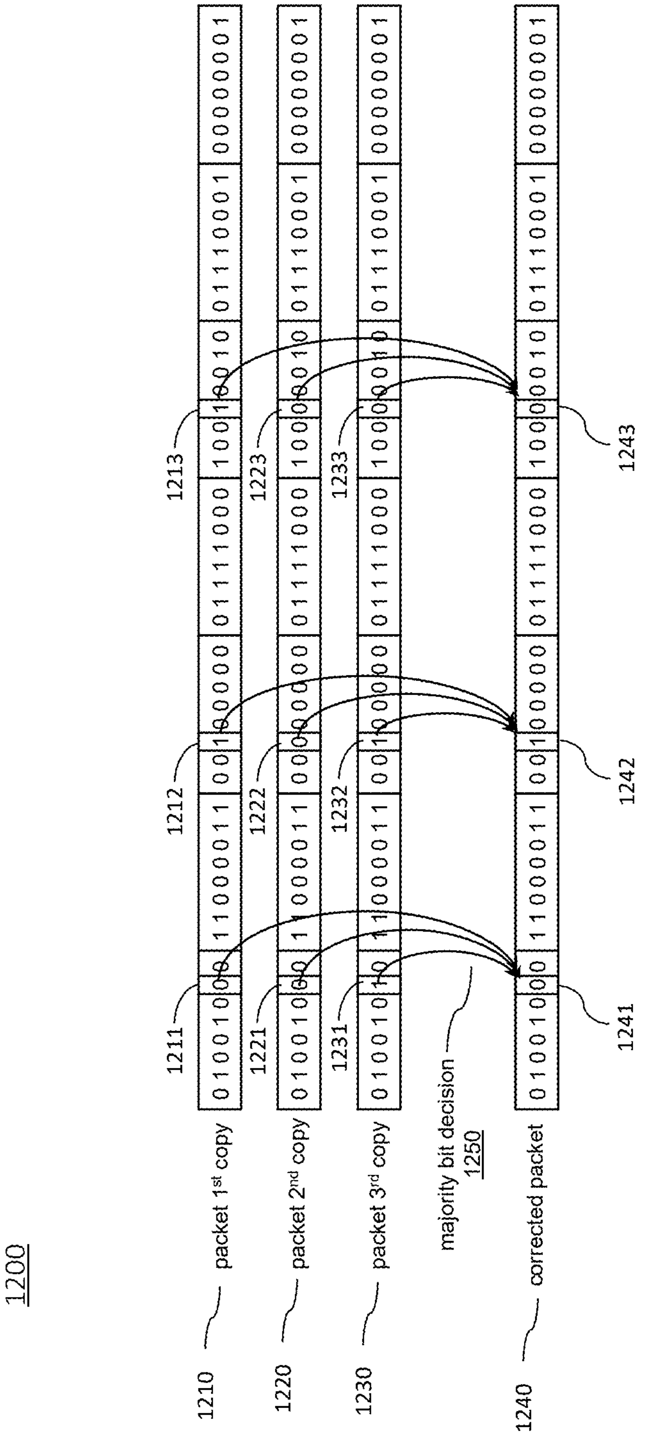
FIG. 12 is a diagram depicting an example majority bit decision according to one or more embodiments.

FIG. 12 is a diagram depicting an example majority bit decision according to one or more embodiments. For 3 transmissions 1210, 1220, 1230 of a bit-stream, one embodiment of the G-CRC-EC scheme can perform bit-by-bit majority bit decision for every bit position of 1210, 1220, and 1230. This can result in the bit-stream 1240, where the bit value of every bit position is the majority vote result of the corresponding bit values of bit-streams 1210, 1220, and 1230. Then, G-CRC-EC can run a CRC check on the bit-stream 1240 to determine if the bit-stream 1240 passes the CRC check. If it is determined that the bit-stream 1240 passes the CRC check, then the bit-stream 1240 is accepted as a solution of G-CRC-EC. This is called "CRC re-check" after majority bit decision.

Systems and methods according to some embodiments of the present disclosure can enhance the conventional CRC-EC techniques (e.g., Z-CRC-EC, G-CRC-EC) to achieve better performance when there are many bit errors. This enhanced CRC-EC scheme can be applied to not only LC3 compressed bit-stream (with special techniques added to make use of LC3-specific codec features to achieve better audio quality) but also other codecs or general non-codec data. In some implementations, a system (e.g., communication system 105, communication system 108, computing system 2000) can perform a CRC-EC for LC3 bit error concealment (BEC) to provide significant performance improvements over the conventional CRC-EC techniques.

In some implementations, for 3 transmissions of the same bit-stream (or packet), the system can perform various kinds of enhanced CRC-EC techniques such as using pair-wise XOR of two bit-streams (e.g., among 3 bit-streams) to identify D bit positions with different bit values for a CRC-EC search, and/or performing partial majority votes (e.g., performing a majority vote on remaining (D−N) bits when D>N) combined with a CRC-EC search. Subsequently, if a solution is not found, then the system can perform a majority vote of 3 bit-streams (e.g., a first (original) bit-stream, a second bit-stream, and a third bit-stream) to determine the bit value of each bit position, and if the majority vote does not produce a solution, the system can update a CRC state wherever the bit value of the first bit-stream is flipped. Then (e.g., after the CRC-EC search), the system can identify the bit positions that do not get a unanimous vote among the 3 bit-streams, and then the system can perform residual error corrections (RECs), e.g., using the identified bit positions to search for 1, 2, or 3 residual bit errors. The system can also search for a single residual bit error using all bit positions including those positions that get unanimous votes.

In some implementations, for a 2 retransmission (3 transmissions) of a bit-stream (e.g., encrypted using the same keystream), the system can find all D bit positions that do not have same bit value in all 3 bit-streams (e.g., a first (original) bit-stream, a second retransmitted bit-stream, a third retransmitted bit-stream). In some implementations, the system can use XOR to find all D bit positions that do not have same bit value in all 3 bit-streams. In some implementations, the system can use a counter (to count the number of bit values) to find all D bit positions that do not have same bit value in all 3 bit-streams. The system can determine whether D is greater than N (e.g., N=10). In response to determining D≤N, the system can perform a CRC-EC search on these D identified bits as in the Z-CRC-EC scheme. In response to determining D>N, the system can perform a CRC-EC search on N bits of the D identified bits, and perform a majority vote for the remaining (D−N) bits. In some implementations, the Nbits may be first (e.g., left-most) N bits of the D identified bits, but embodiments of the present disclosure are not limited thereto and the N bits may be any N bit positions among the D identified bits. This scheme of performing a majority vote for remaining (D−N) bits is referred to as "MVR-CRC-EC" hereinafter.

Figure 13:
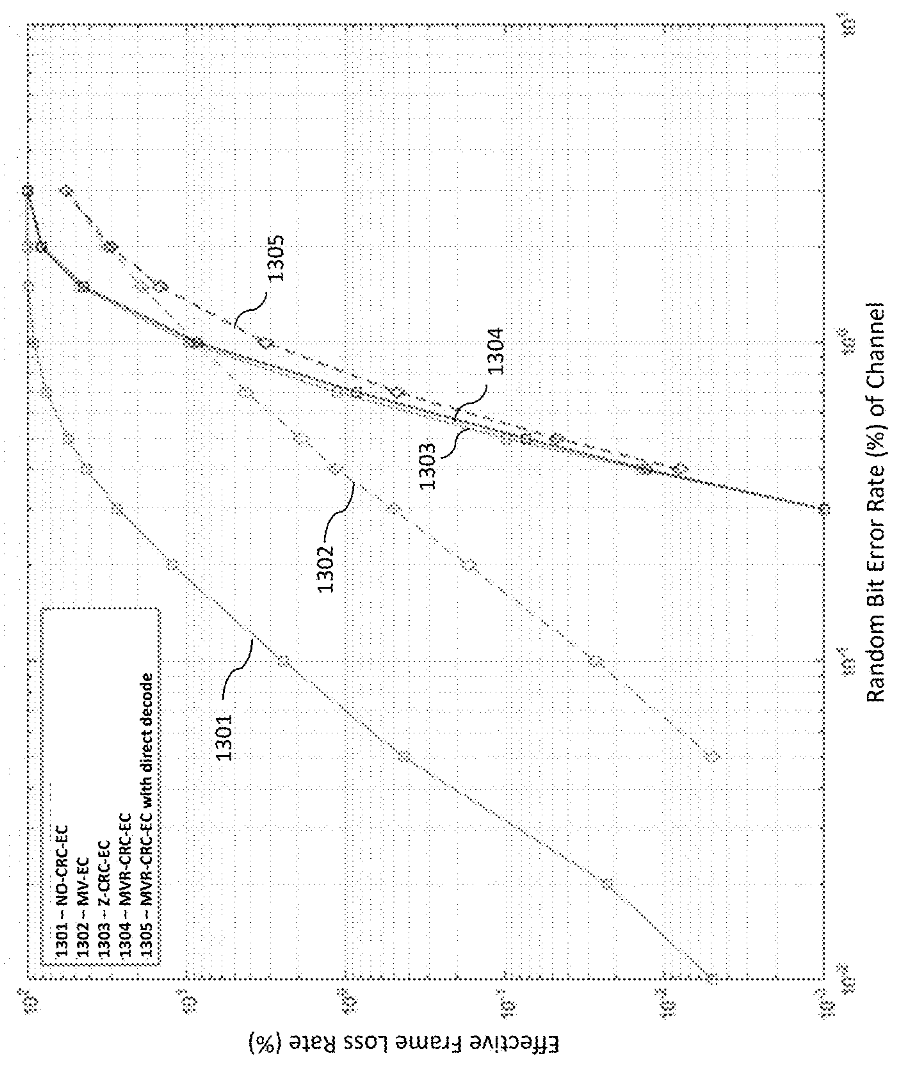
FIG. 13 is a diagram depicting example simulation results of different error correction schemes with 3 transmissions (2 retransmissions) of a bit-stream, according to one or more embodiments.

FIG. 13 is a diagram depicting example simulation results of different error correction schemes with 3 transmissions (2 retransmissions) of a bit-stream for 32 kbps LC3 with 10 ms frame, and N=10. Referring to FIG. 13, lines 1301, 1302, 1303, 1304, 1305 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC, (4) MVR-CRC-EC, and (5) MVR-CRC-EC with direct decode, where "direct decode" here means that for those packets that MVR-CRC-EC does not find a solution, just directly use the majority vote result as the bit-stream for decoding, even though such a bit-stream may contain bit errors. As shown in FIG. 13, performance of the MVR-CRC-EC scheme may be only slightly better than that of Z-CRC-EC.

In some implementations, for 3 transmissions of the same bit-stream (e.g., a first (original) bit-stream, a second (retransmitted) bit-stream, and a third (retransmitted) bit-stream), the system can perform XOR between 2 bit-streams rather than comparing 3 bit-streams to find bit positions with different bit values as candidate bit error positions. For example, the system can compare up to 3 pairs of 2 bit-streams (e.g., a pair of first and second bit-streams, a pair of second and third bit-streams, and a pair of first and third bit-streams) among the three bit-streams. This scheme is referred to as "2XOR-CRC-EC". Without performing a majority vote, the 2XOR-CRC-EC scheme can reduce the complexity of a CRC-EC search significantly and allow the system to correct more bit errors.

For example, it is supposed that each of the 3 bit-streams has 4 bit errors and no two bit errors happen in the same bit position. In other words, the 3 bit-streams have 12 bit errors in total and the 12 bit errors occur at different bit positions from each other. In this case, when performing a 3 bit-stream XOR, the system can find D=12 bit positions for the CRC-EC search. If N=10, since D>N=10, Z-CRC-EC will abort. On the other hand, when performing a 2 bit-stream XOR on each of 3 pairs of bit-streams, the system can find D=8 after performing a 2 bit-stream XOR on the first pair of bit-streams. Since D<N=10, the system can perform a CRC-EC search and correct bit errors with the first pair of bit-streams so that the system can find the D value only once to correct bit errors. In a worst case scenario, the system may need to find the D value 3 times. For example, it is supposed that 5, 6, 5 bit errors occur in the first, second and third bit-streams (such that all bit errors occur at different bit positions from each other). In this case, the system can perform a 2 bit-stream XOR in the order of pairs (1, 2), (2, 3), and (1, 3), finding D=11, D=11, D=10, respectively. In another example, it is supposed that 6, 6, 4 bit errors occur in the first, second and third bit-streams (such that all bit errors occur at different bit positions from each other). In this case, the system can perform a 2 bit-stream XOR in the order of pairs (1, 2), (2, 3), and (1, 3). After finding the D values two times (D=12, D=10), since D≤N=10, the system can perform a CRC-EC search and correct bit errors with the second pair of bit-streams.

Figure 14:
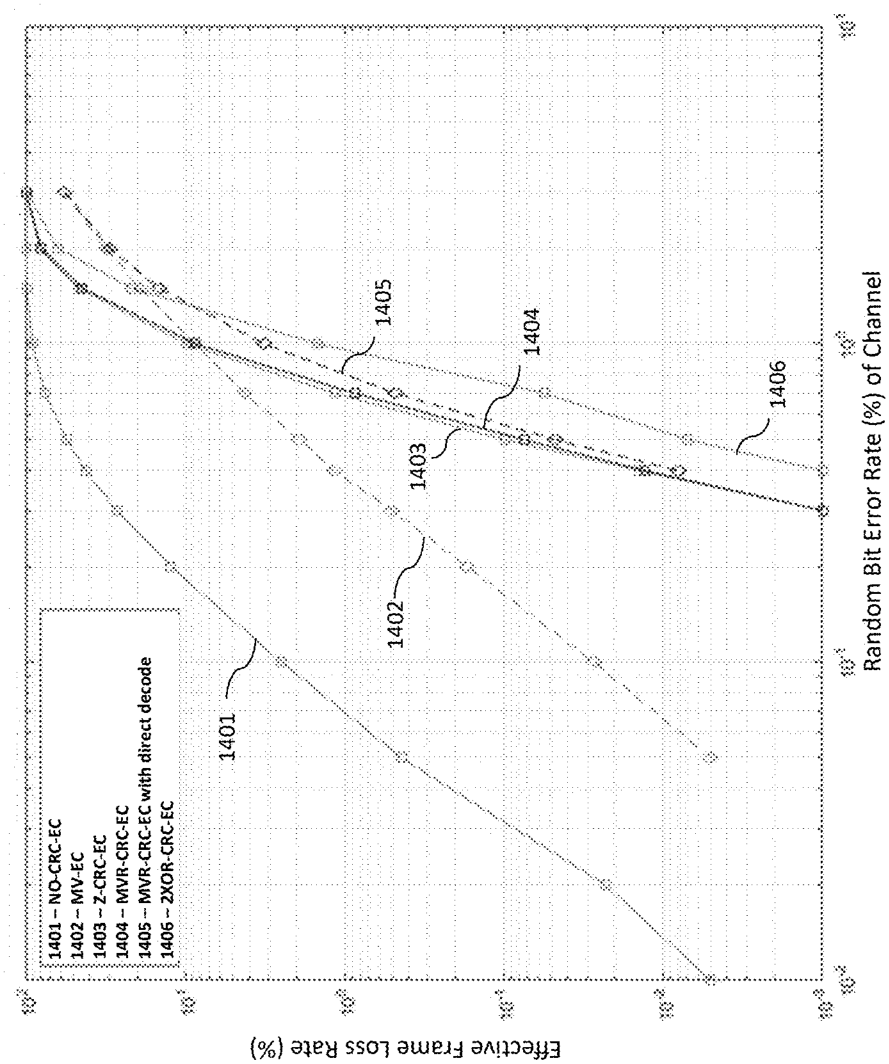
FIG. 14 is a diagram depicting example simulation results of different error correction schemes with 3 transmissions (2 retransmissions) of a bit-stream, according to one or more embodiments.

FIG. 14 is a diagram depicting example simulation results of different error correction schemes with 3 transmissions (2 retransmissions) of a bit-stream for 32 kbps LC3 with 10 ms frame, and N=10. Referring to FIG. 14, lines 1401, 1402, 1403, 1404, 1405 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC, (4) MVR-CRC-EC, (5) MVR-CRC-EC with direct decode, and (6) 2XOR-CRC-EC. As shown in FIG. 14, performance of the 2XOR-CRC-EC scheme can withstand a BER that is nearly 1.5 times higher than a BER Z-CRC-EC can withstand.

As described above, in the MVR-EC-CRC scheme, when the number of potential bit error positions (D) exceeds a limit (N) that the regular CRC-EC search can handle (e.g., D>N), the system can perform a majority vote to attempt to correct the last (D−N) bits of the D bit positions of possible bit errors, and then perform a CRC-EC search for the first N bit positions. In some implementations, for 3 transmission of a bit-stream (2 retransmissions), the system can combine a regular CRC-EC search with a majority vote in a hybrid scheme. That is, if D>N, the system can perform a majority vote on the bit positions above that limit (e.g., "remaining" bit positions (D-N) or "extra" bit positions), update the CRC remainder by performing XOR operations with the CRC syndromes of those extra bit positions that have changed by the majority vote, then start with the updated CRC remainder to perform a regular CRC-EC search. This hybrid scheme of combining a "partial" majority vote with a CRC-EC search is referred to as "PMV-CRC-EC".

In some implementations, the system can perform the PMV-CRC-EC scheme by performing a majority vote on the extra (D−N) bits, and then initializing a CRC state with 0 (zero). In some implementations, for every bit in the extra (D−N) of the D bit positions that has been flipped due to the majority vote, the system can account for the flipped bit by performing XOR between the (current) CRC state and the CRC syndrome of that flipped bit. After updating the CRC state completes, the system can start with this updated CRC state to perform a CRC-EC search on the N bits (e.g., left-most N bits of the D bits). In some implementations, the system can determine whether the (finally) updated CRC state matches the CRC remainder which may be calculated by CRC hardware. In response to determining that the (finally) updated CRC state matches the CRC remainder, the system can determine that it has found a solution and correct the first decrypted payload by flipping those bits in the first decrypted payload corresponding to the bit positions of the solution. For example, suppose a bit-stream having 320 bits of payload and 24 bits of CRC code for a total of 344 bits. If none of the bits are in error, then the CRC check (i.e., dividing the 344 bits by the generator polynomial G(x)) can generate a CRC remainder of 0, and the bit-stream can pass the CRC check. If there are one or more bit errors, then the CRC remainder of the long division can be an XOR sum of the CRC syndromes of all the bit error positions. Now, suppose N=10 and there are 12 potential bit error positions. For simplicity, it is assumed that the 12 potential bit error positions are at bit positions 10, 20, 30, 40, . . . , 90, 100, 110, and 120. Then, the XOR sum of the CRC syndromes of those bit errors (not necessarily all 12) among these 12 bit positions can be equal to the CRC remainder the CRC hardware calculated based on the received 344 bits (referred to as "CRC remainder 1"). The goal in the PMV-CRC-EC scheme is to find a combination of bit error positions among these 12 positions such that the XOR sum of the CRC syndromes corresponding to these bit error positions equals "CRC remainder 1." In this example here, it can be found that there are 12 potential bit error positions. Since 12>N=10, the system can perform the majority vote for bit positions 110 and 120. Suppose that both bit positions 110 and 120 are in error; that the majority vote can corrects both bit errors at bit positions 110 and 120; and that the system can flip the bit values of positions 110 and 120 in the first bit-stream. Then, the system may need to account for the bit-flipping by starting with a CRC state of 0 and do XOR between this initial CRC state of 0 and the two CRC syndromes for bit positions 110 and 120 to obtain a result CRC state (referred to as "CRC state 1"). Next, the system can start with "the CRC state 1" as the initial CRC state for the 10-bit CRC-EC search through $(2^{10}-1)=1023$ combinations of the remaining 10 bit positions 10, 20, . . . , 100. In each of the 1023 combinations of 0s and 1s for these 10 bit positions, at least one bit position can have a value of 1. For each of the 1023 combinations, the system can start with the CRC state 1 and do XOR sum between the CRC state 1 and the CRC syndromes of all the bit positions with a value of 1 in this combination to obtain a result CRC state (referred to as "CRC state 2" for that combination). If any of the 1023 bit position combinations gives the CRC state 2 that is equal to the CRC remainder 1 that the CRC hardware calculated for the first received bit-stream of 344 bits, then the system can determine that the PMV-CRC-EC scheme has found a solution, because the scheme has found all bit error positions where the XOR sum of the corresponding CRC syndromes equals the CRC remainder 1 produced by the CRC hardware. Now, the system can just flip the bits among the first 10 possible bit error positions where the "winning combination" has a bit value of 1.

Figure 15:
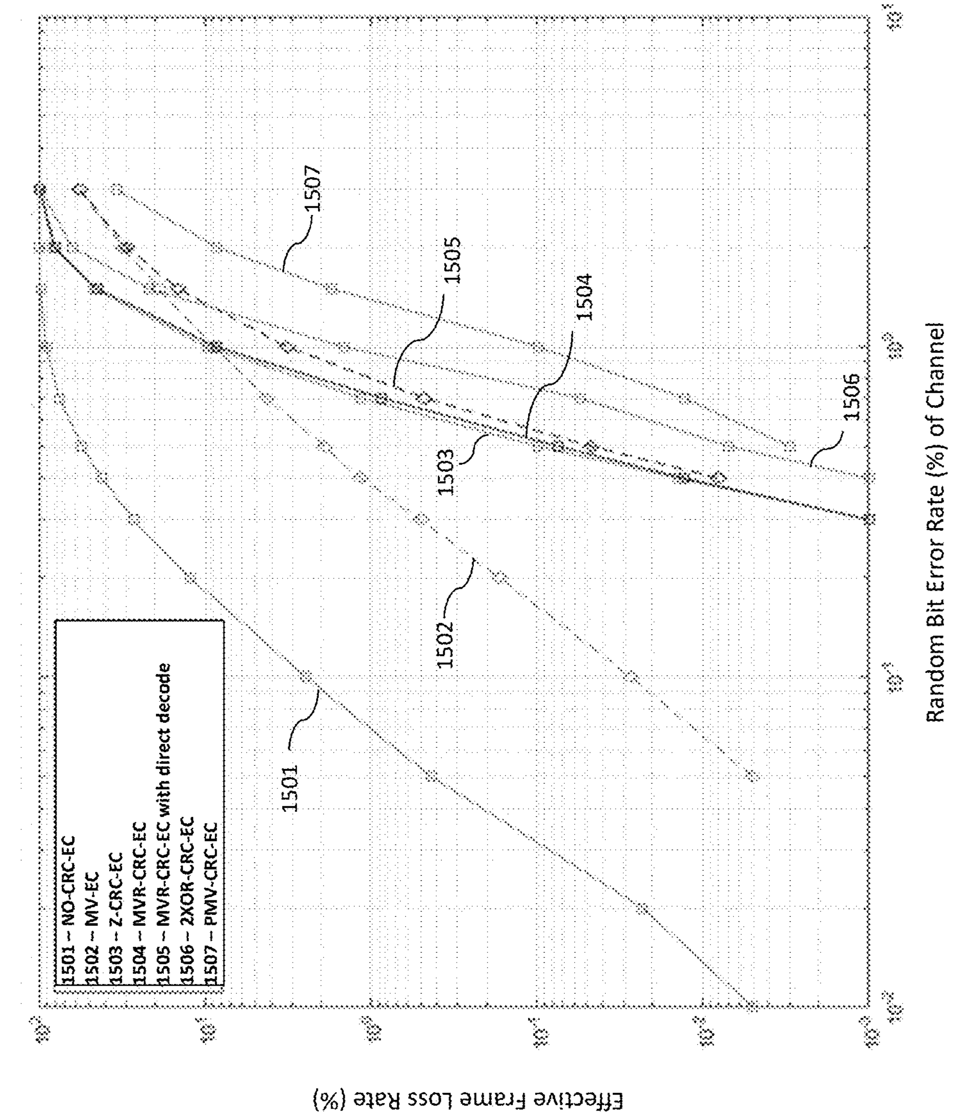
FIG. 15 is a diagram depicting example simulation results of different error correction schemes with 3 transmissions (2 retransmissions) of a bit-stream, according to one or more embodiments.

FIG. 15 is a diagram depicting example simulation results of different error correction schemes with 3 transmissions (2 retransmissions) of a bit-stream for 32 kbps LC3 with 10 ms frame, and N=10. Referring to FIG. 15, lines 1501, 1502, 1503, 1504, 1505, 1506 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC, (4) MVR-CRC-EC, (5) MVR-CRC-EC with direct decode, (6) 2XOR-CRC-EC, and (7) PMV-CRC-EC. As shown in FIG. 15, performance of the PMV-CRC-EC scheme can withstand a BER that is higher than a BER that 2XOR-CRC-EC can withstand.

Figure 16:
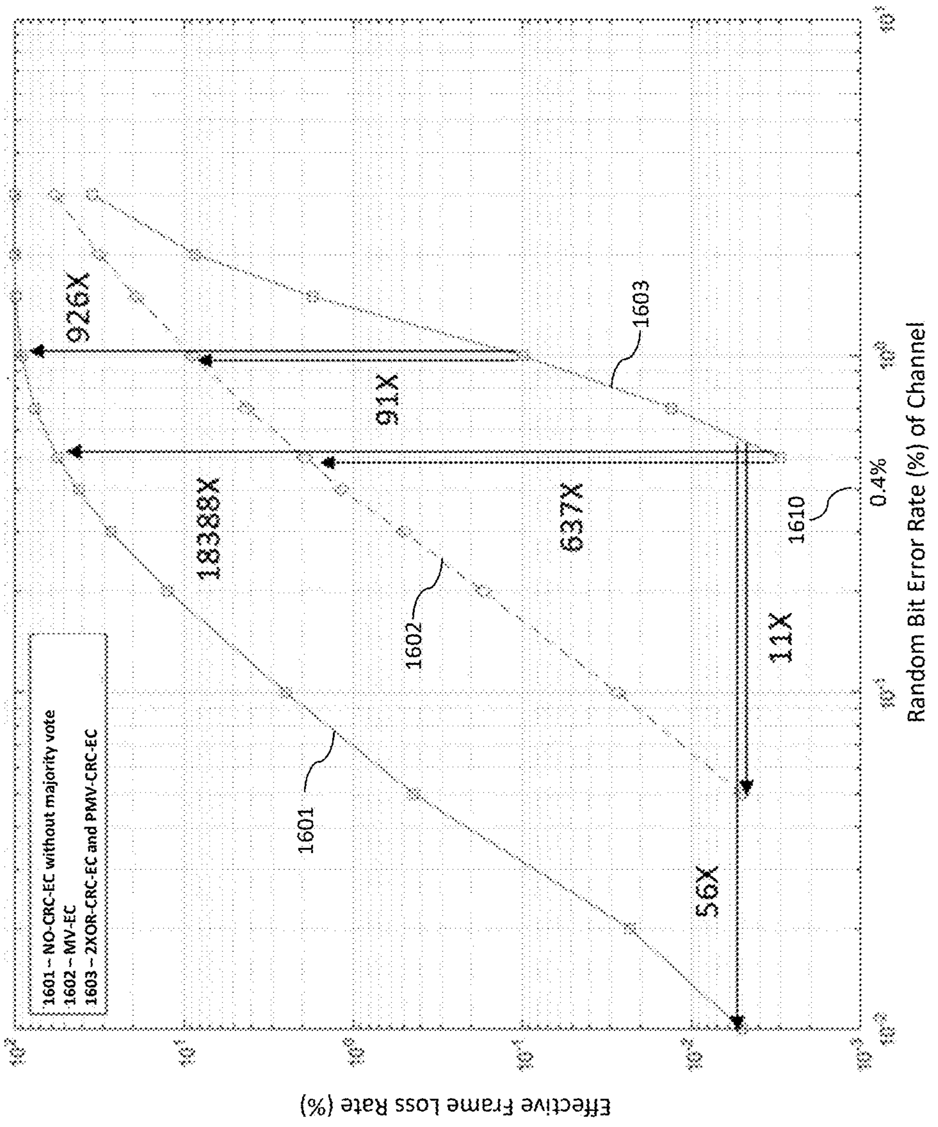
FIG. 16 is a diagram depicting example simulation results of different error correction schemes with 3 transmissions (2 retransmissions) of a bit-stream, according to one or more embodiments.

FIG. 16 is a diagram depicting example simulation results of different error correction schemes with 3 transmissions (2 retransmissions) of a bit-stream for 320-bit payload. Referring to FIG. 16, lines 1601, 1602, 1603 correspond to simulation results (effective frame loss rate (%) vs random BER (%) of the channel) using configurations of (1) no CRC-EC without majority vote (NO-CRC-EC without majority vote), (2) a majority vote-based error correction without CRC-EC (MV-EC) which corrects bits using a majority votes without performing CRC-EC, and (3) 2XOR-CRC-EC and PMV-CRC-EC (referred to as "2XOR-PMV-CRC-EC"). As shown in FIG. 16, enhanced CRC-EC (e.g., 2XOR-PMV-CRC-EC 1603) can achieve a huge reduction (e.g., orders of magnitude) in effective packet loss rate compared to conventional error correction methods (e.g., NO-CRC-EC without majority vote 1601 or MV-EC 1602). For example, at a relatively high BER of 1%, NO-CRC-EC without majority vote 1601 and MV-EC 1602 show packet loss rates that are 926 times and 91 times higher than a packet loss rate of 2XOR-PMV-CRC-EC 1603, respectively. At a lower BER of 0.5%, NO-CRC-EC without majority vote 1601 and MV-EC 1602 show packet loss rates that are 18388 times and 637 times higher than a packet loss rate of 2XOR-PMV-CRC-EC 1603, respectively. Also, performance of the 2XOR-PMV-CRC-EC 1603 scheme can withstand BERs that are 56 times and 11 times higher than a BER that NO-CRC-EC without majority vote 1601 can withstand, respectively. As shown in FIG. 16, for a 320-bit payload size and 76,800 packets simulated at a random BER of 0.4% (see the BER denoted by 1610), an enhanced CRC-EC scheme (2XOR-PMV-CRC-EC 1603) can achieve error-free transmissions after 2 retransmissions, while NO-CRC-EC without majority vote 1601 and MV-EC 1602 can achieve packet loss rates of 1.2% and 42%, respectively.

In some implementations, enhanced CRC-EC techniques (e.g., MVR-CRC-EC, 2XOR-CRC-EC, PMV-CRC-EC) can be generally applicable to not only LC3 or any other codec but also any data packet that is sent with one or more transmissions (e.g., 1, 2 or 3 transmissions).

In some implementations, the system can spend more computational complexity (e.g., spending more computing resources/power) to further improve the performance of the enhanced CRC-EC schemes. In some implementations, for 2 retransmissions (or 3 transmissions) of a bit-stream, if the above-noted enhanced CRC-EC techniques (e.g., MVR-CRC-EC, 2XOR-CRC-EC, PMV-CRC-EC) fail to produce a CRC-EC solution, then the system can optionally perform bit-by-bit majority votes between the 3 received bit-streams (e.g., a first (original) bit-stream, a second (retransmitted) bit-stream, and a third (retransmitted) bit-stream) to generate a resulting majority-voted bit-stream. The system can perform a CRC check on the resulting majority-voted bit-stream (e.g., division of the resulting majority-voted bit-stream by G(x)) and determine whether the resulting majority-voted bit-stream passes the CRC check (e.g., whether the division by G(x) results in a zero remainder). If the resulting majority-vote bit-stream does not pass the CRC check (e.g., the division by G(x) results in a non-zero remainder), then the system can try (or attempt) to correct a single, two, or three undetected (or residual) bit errors and/or co-located triple bit errors (e.g., errors happening to all 3 bit-streams at the same bit positions). The CRC-EC schemes to correct 1, 2, 3 residual bit errors, and co-located triple bit errors in a single bit position are referred to as "1-residual error correction (1-REC)", "2-REC", "3-REC", and "A1-REC", respectively.

In some implementations, the system can perform such REC schemes by exhaustive searches, e.g., by updating the CRC state with the CRC syndromes of the bit positions involved. In some implementations, the system can perform an REC by (1) identifying the bit positions that do not get a unanimous vote among the 3 bit-streams, and (2) using the identified bit positions to search for 1, 2, or 3 residual bit errors.

In some implementations, after performing a majority vote, the system can perform an REC scheme using a CRC-EC search/principle/technique to correct some of the remaining (residual) bit errors. To keep the computational complexity manageable, the system can restrict the search to those bit positions that do not have the same bit values for all 3 bit-streams (e.g., a first (original) bit-stream, a second (retransmitted) bit-stream and a third (retransmitted) bit-stream).

Figure 17A:
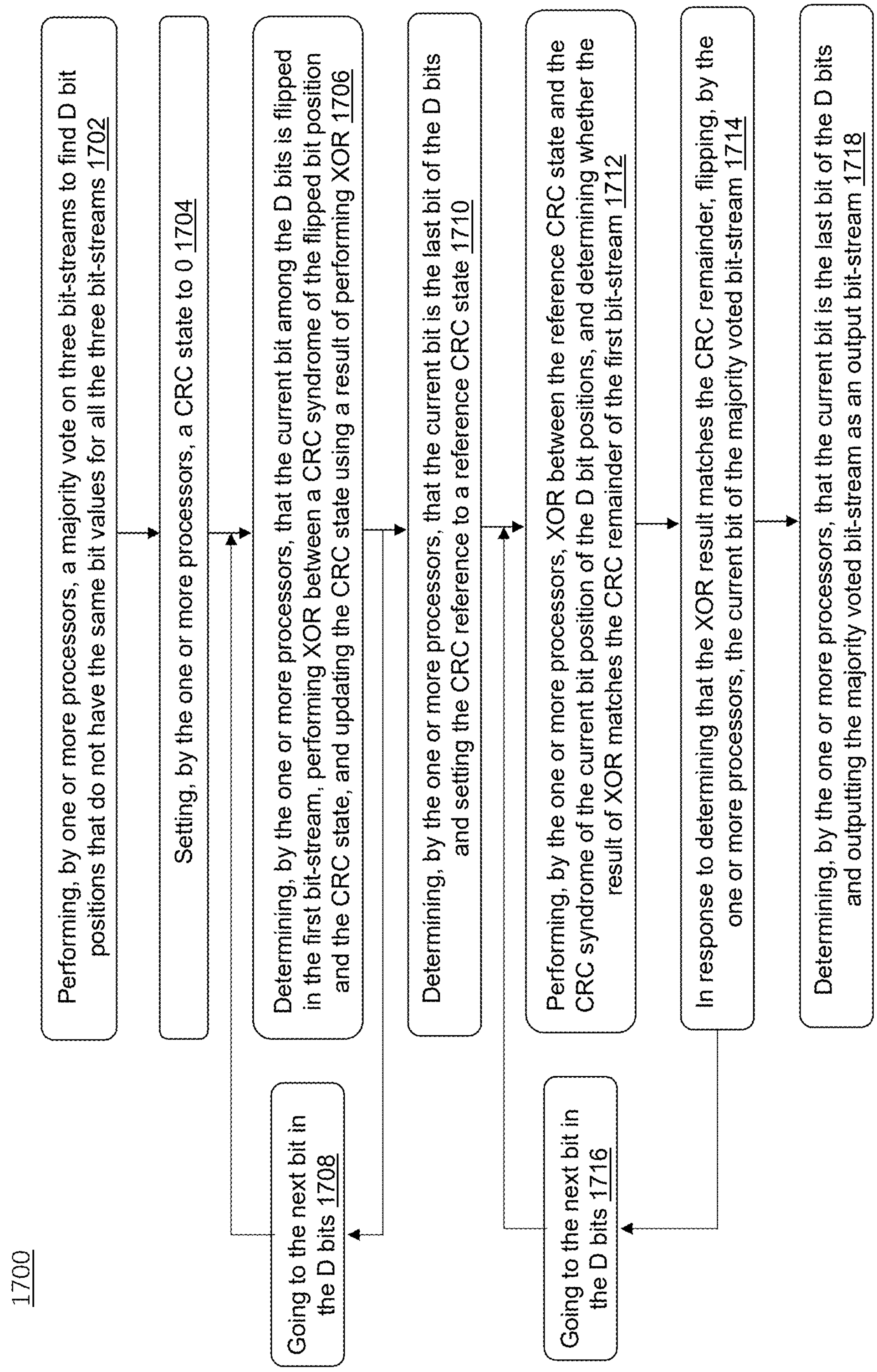
FIG. 17A is a flow diagram showing a process for performing a residual error correction (REC) scheme with 3 transmissions (2 retransmissions) of a bit-stream, according to one or more embodiments.

FIG. 17A is a flow diagram showing a process 1700*s* for performing an REC scheme (e.g., 1-REC) on 3 bit-streams, in accordance with an embodiment. Supposing there are D such bit positions that do not have the same bit values for all 3 bit-streams as a result of a majority vote, the system can perform the 1-REC scheme to correct a remaining (residual) single bit error after the majority vote as shown in FIG. 17A. In step 1702, the system (e.g., one or more processor 2010, a communication system 105, 108) can perform a majority vote on three bit-streams to find D bit positions that do not have the same bit values for all the three bit-streams. In step 1704, the system can set a CRC state to 0 (zero). In steps 1706 and 1708, the system can loop through the D identified bit positions, and whenever a bit is flipped in the first bit-stream due to majority vote, account for the flipped bit in the first bit-stream by performing XOR between the CRC syndrome of the flipped bit position and the CRC state, and use the result of XOR to update the CRC state. In step 1710, the system can set or determine the final updated CRC state at the end of the loop to be a reference CRC state. In steps 1712, 1714 and 1716, the system can loop through the D bit positions again. For each of the D bit positions, in step 1712, the system can perform XOR between the reference CRC state as determined above and the CRC syndrome of the current bit position and check or determine whether the result of XOR matches the CRC remainder of the first bit-stream (e.g., the CRC remainder that the CRC hardware has calculated based on the first bit-stream). In step 1714, in response to determining that the XOR result matches the CRC remainder, the system can flip the current bit of the majority voted bit-stream. In step 1718, the system can output the final majority voted bit-stream (as bit flipped) at the end of the loop as an output bit-stream of the 1-REC scheme. In some implementations, as a more efficient alternative, as soon as the XOR result matches the CRC remainder and the corresponding bit is flipped, the execution can break the loop (e.g., abort the remaining portion of the loop) to save computations.

In some implementations, the system can perform a 2-REC scheme to correct 2 (residual) bit errors remaining after a majority vote. The system can perform the 2-REC scheme using the same steps as the 1-REC scheme, except (1) replacing the second loop (e.g., steps 1712, 1714, 1716 in FIG. 17A) with 2 nested loops to go through C(D, 2)=D(D−1)/2 possible combinations of 2 bits out of D bits, and (2) replacing the XOR between the reference CRC state and the CRC syndrome of the current bit position (e.g., step 1712 in FIG. 17A) with XOR between the reference CRC state and the CRC syndromes of the current 2 bit positions in the second loop.

In some implementations, the system can perform a 3-REC scheme to correct 3 (residual) bit errors remaining after a majority vote. The system can perform the 3-REC scheme using the same steps as the 1-REC scheme, except (1) replacing the second loop (e.g., steps 1712, 1714, 1716 in FIG. 17A) with 3 nested loops to go through C(D, 3)=D(D−1)(D−2)/6 possible combinations of 3 bits out of D bits, and (2) replacing the XOR between the reference CRC state and the CRC syndrome of the current bit position (e.g., step 1712 in FIG. 17A) with XOR between the reference CRC state and the CRC syndromes of the current 3 bit positions in the third loop.

In some implementations, the system can perform an A1-REC scheme to correct a bit error at the same (single) bit position (co-located triple errors) after a majority vote. The system can perform the A1-REC scheme using the same steps as the 1-REC scheme, except replacing the second loop (e.g., steps 1712, 1714, 1716 in FIG. 17A) with a single loop through every bit in the payload and the CRC code corresponding to the payload (e.g., 24-bit CRC code).

Figure 17B:
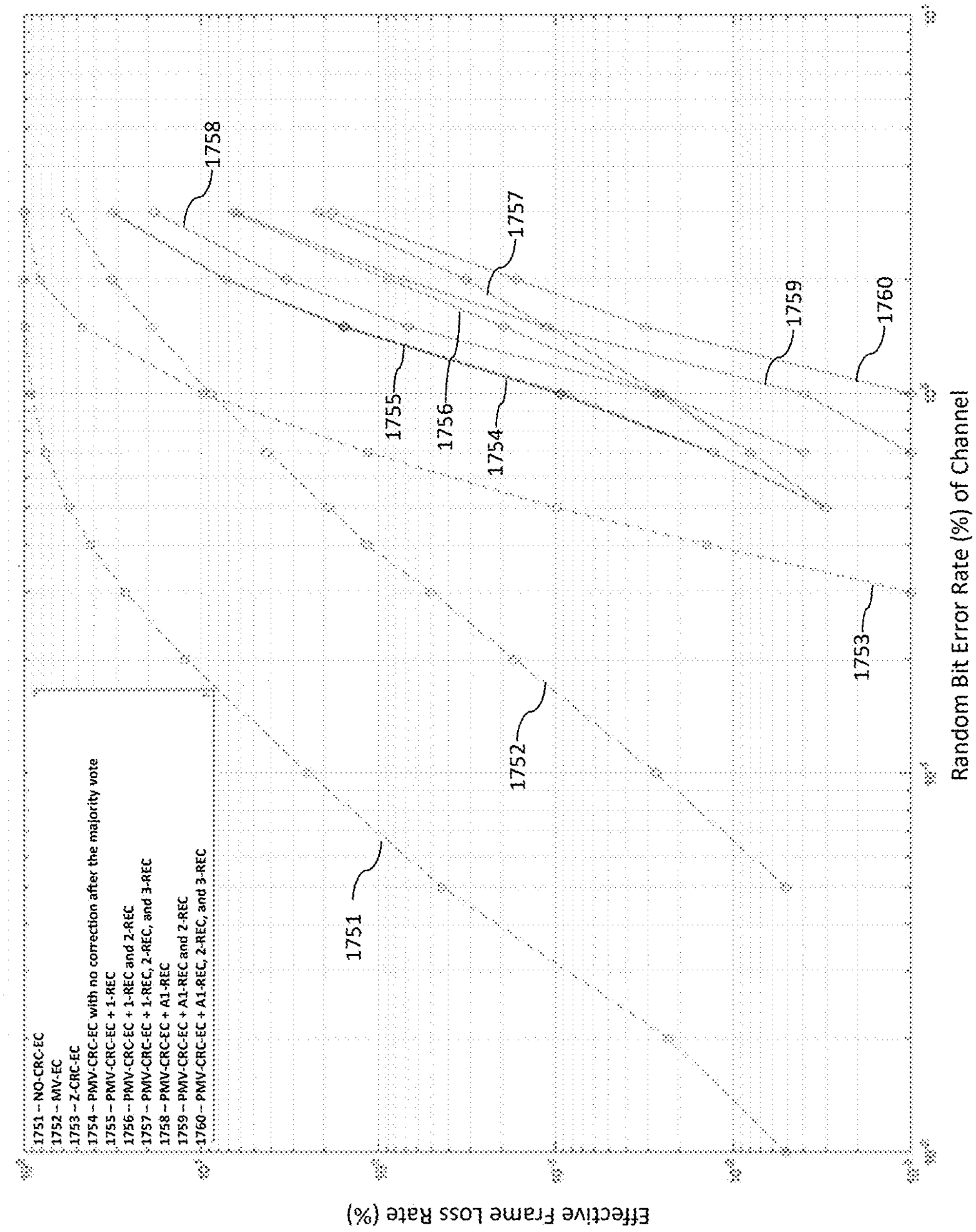
FIG. 17B is a diagram depicting example simulation results of different error correction schemes with 3 transmissions (2 retransmissions) of a bit-stream, including post-majority vote schemes, according to one or more embodiments.

FIG. 17B is a diagram depicting example simulation results of different error correction schemes with 3 transmissions (2 retransmissions) of a bit-stream for 32 kbps LC3 with 10 ms frame, the same keystream, and N=10. Referring to FIG. 17B, lines 1751, 1752, 1753, 1754, 1755, 1756, 1757, 1758, 1759, 1760 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC, (4) PMV-CRC-EC with no correction after the majority vote, (5) PMV-CRC-EC plus 1-REC, (6) PMV-CRC-EC plus 1-REC and 2-REC, (7) PMV-CRC-EC plus 1-REC, 2-REC and 3-REC, (8) PMV-CRC-EC plus A1-REC, (9) PMV-CRC-EC plus A1-REC and 2-REC, and (10) PMV-CRC-EC plus A1-REC, 2-REC and 3-REC. FIG. 17B shows effects of different post-majority-vote error correction strategies/schemes. For example, as shown in FIG. 17B, correcting the $2^{nd}$ and $3^{rd}$ bit errors in D bit positions (e.g., lines 1756 and 1757 versus 1755) can have more improvements at higher BERs >1% than at lower BERs <1%, and correcting co-located triple errors (a single bit error) in all positions (e.g., line 1759 versus 1756 and line 1760 versus 1757) can have more improvements at lower BERs <1.5% than at higher BERs >1.5%. It is noted that at higher BERs >1.5%, the computational complexity to correct the $3^{rd}$ bit error (e.g., lines 1757 and 1760) can quickly become prohibitively high because the computational complexity of 3-REC is a cubic function of D, which is proportional to the BER.

In one aspect, at high channel bit error rates, the post-majority-vote bit error correction schemes described above (e.g., 2-REC, 3-REC) may result in an unacceptable computational complexity. For example, the computational complexity of a search operation of 3-REC is a cubic function of the number of potential bit error locations to search through. In this case, the system can set a constraint of computational complexity and perform the post-majority-vote bit error correction schemes within the constraint. In some implementations, the system can calculate the computational complexity for each of the 4 kinds of searches (e.g., 1-REC, 2-REC, 3-REC, A1-REC), set an order of searches to try, set a maximum allowed computational complexity not to be exceeded, and then only perform the searches such that the total computational complexity for search is within the maximum allowed computational complexity. In this manner, the system can guarantee that the resulting computational complexity is within the set limit (e.g., maximum allowed computational complexity) but still can achieve significant performance improvement.

In some implementations, the system can limit the complexity to L "basic operations". In some implementations, each basic operation may consist of an XOR operation followed by a comparison with a target CRC state (e.g., a comparison to determine whether the result of the XOR operation is zero or not). In some implementations, the XOR operation is a 3 byte XOR operation and the target CRC state is 3 bytes long for 24-bit CRC, but in some implementations other length of XOR operation (e.g., 4 bytes for 32-bit CRC) can be used. In some implementations, each basic operation (e.g., one XOR operation and one comparison with a target CRC state) can be simpler than operations in each loop of a regular 10-bit CRC-EC search (e.g., calculating a sum of syndromes that correspond to each combination of bit positions, and comparing the sum of syndromes for each combination with a CRC remainder).

In some implementations, the system can perform a full exhaustive search for 2 residual bit errors among D bit positions (e.g., 2-REC search) using two nested loops where the outer loop is indexed from i=0 to i=D−1 and the inner loop is indexed from j=i+1 to j=D−1 (here the indexing convention of the C programming language is used). When indexing through the outer loop from i=0 to i=D−1, for each index i the system can check or determine whether flipping the bit value in the bit position corresponding to index i can give a solution, e.g., flipping the bit value in the bit position corresponding to index i can produce a bit stream that will pass the CRC check. In some implementations, the system can perform this check by performing an XOR operation between the existing CRC state and the stored CRC syndrome corresponding to the bit position indicated by index i, and then determine whether the result of the XOR operation is zero. In some implementations, this check can be defined as a 1 basic operation. In this manner, the system can perform the search for a single residual bit error in the outer loop of two nested loops for the search for 2 residual bit errors, and this search for 1 residual bit error can cost D basic operations. If each pair of possible outer loop index and inner loop index (i, j) is treated as the index of a matrix element, then the exhaustive set of such (i, j) pairs to be searched through can form the indices of the non-zero elements of an upper triangular matrix with (D−1) as the length on each side. The total number of such exhaustive (i, j) pairs can be the total number of such non-zero elements of this upper triangular matrix, which is D(D−1)/2, a quadratic function of D. If the D basic operations required by the search for 1 residual bit error implemented in the outer loop is added, then the total number of required basic operations for the combined search of 1 or 2 residual bit errors (e.g., 1-REC and 2-REC) can be calculated as follows:

$$D+\frac{D(D-1)}{2}=\frac{D(D+1)}{2}. \quad \text{(Equation 6)}$$

Similarly, the total number of required basic operations for the combined search of 1, 2 or 3 residual bit errors (e.g., 1-REC, 2-REC and 3-REC) can be calculated as follows:

$$D+\frac{D(D-1)}{2}+\frac{D(D-1)(D-2)}{6}=\frac{D^3+5D}{6}. \quad \text{(Equation 7)}$$

In some implementations, the system can perform a REC search for 3 residual bit errors (3-REC search) such that the 3-REC search also includes the searches for 2 residual bit errors (2-REC search) and 1 residual bit error (1-REC search). Similarly, if the search complexity for a 3-REC search is too high, then the system can set out to search for 2 residual bit errors (2-REC search), which includes a search for 1 residual bit errors (1-REC search).

When measured in such "basic operations," the computational complexity of a search for 3 residual bit errors may be a cubic function of the number of bit positions (D) to consider (see Equation 7). The computational complexity of a search for 2 residual bit errors may be a quadratic function of the number of bit positions (D) to consider (see Equation 6), and the complexity of a search for 1 residual bit error may be just the number of bit position (D) to consider. Since the computational complexity of a search for 3 residual bit errors is a cubic function of the number of bit positions to consider, as the bit error rate increases and the number of bit positions to consider increases with the bit error rate, the search complexity for 3 residual bit errors can quickly become so large that it would be impractical to implement in a reasonable real-time system. To address this problem, the system can use a complexity constraint by setting a target maximum number of basic operations (e.g., L number of basic operations) that the computational complexity of REC searches should not exceed.

In some implementations, the system can set a limit of computational complexity L (or maximum allowed computational complexity) to a range of 2000 to 4000. In some implementations the system can set L to 4000 as default. In some implementations, the system can pre-calculate a total number of basic operations to correct 1, 2, or 3 errors in D positions using Equation 7, for example. If the total number of basic operations exceeds L, the system can repeat calculating a total number of basic operations to correct 1 or 2 errors in D positions using Equation 6, for example. If the total number of basic operations still exceeds L, the system can try to perform 1-REC to correct 1 errors.

Figure 18:
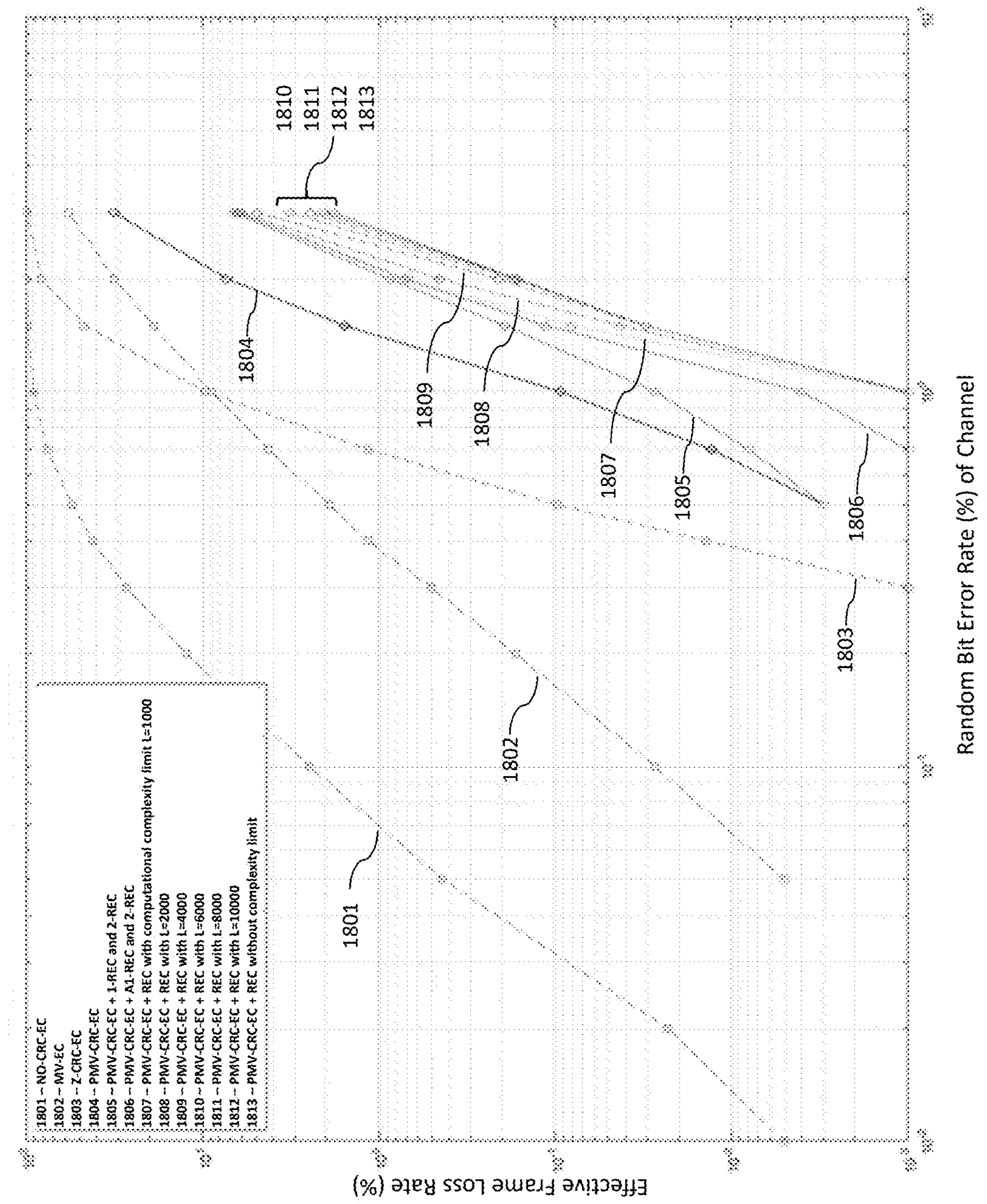
FIG. 18 is a diagram depicting example simulation results of different error correction schemes with 3 transmissions (2 retransmissions) of a bit-stream, including complexity constraint-based post-majority vote schemes, according to one or more embodiments.

FIG. 18 is a diagram depicting example simulation results of different error correction schemes with 3 transmissions (2 retransmissions) of a bit-stream, including complexity constraint-based post-majority vote schemes, for 32 kbps LC3 with 10 ms frame, the same keystream, and N=10. Referring to FIG. 18, lines 1801, 1802, 1803, 1804, 1805, 1806, 1807, 1808, 1809, 1810, 1811, 1812, 1813 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC, (4) PMV-CRC-EC with no correction after the majority vote, (5) PMV-CRC-EC plus 1-REC and 2-REC, (6) PMV-CRC-EC plus A1-REC and 2-REC, (7) PMV-CRC-EC plus REC with computational complexity L=1000, (8) PMV-CRC-EC plus REC with L=2000, (9) PMV-CRC-EC plus REC with L=4000, (10) PMV-CRC-EC plus REC with L=6000, (11) PMV-CRC-EC plus REC with L=8000, (12) PMV-CRC-EC plus REC with L=10000, and (13) PMV-CRC-EC plus REC without complexity limit.

In one example (referred to as "first example"), supposing the limit of the complexity constraint L=4000 basic operations, for a given number of bit positions D to consider, the system can first compare L with the number of basic operations required for the search for 3 residual bit errors among the D bit positions. If the number of basic operations is not greater than L=4000, the system can perform the search for 3 residual bit errors. If the number of basic operations (as the search complexity for 3 residual bit errors) is greater than L=4000, then the system can completely abandon the search for 3 residual bit errors and instead perform a search for 2 residual bit errors among the D bit positions. In this case, the search for 3 residual bit errors can be abandoned even if the search complexity for 2 residual bit errors is much smaller than L, thus leaving a lot of "unused" basic operations before the complexity reaches the limit L. Similarly, in another example (referred to as "second example"), even if the search complexity for 2 residual bit errors among the D bit positions is just slightly above the limit L, the system may completely abandon the search for 2 residual bit errors and instead only search for a single bit error, leaving many "available' basic operations "unused." This strategy may be simple to implement, but may leave many available basic operations unused.

To address this problem, in some implementations, the system can further improve the performance of CRC-EC by fully utilizing the allowed computational complexity budget (e.g., maximum allowed computational complexity L). In some implementations, the system can make use of such unused basic operations in a "partial search" for 3 residual bit errors in the first example above and in a partial search for 2 residual bit errors in the second example above. In some implementations, the system can perform the partial searches for 3 or 2 residual bit errors by searching through only some but not all of the possible combinations of bit positions for 3 or 2 bit errors while ensuring that the resulting search complexity does not exceed the maximum allowed L basic operations.

Figure 19:
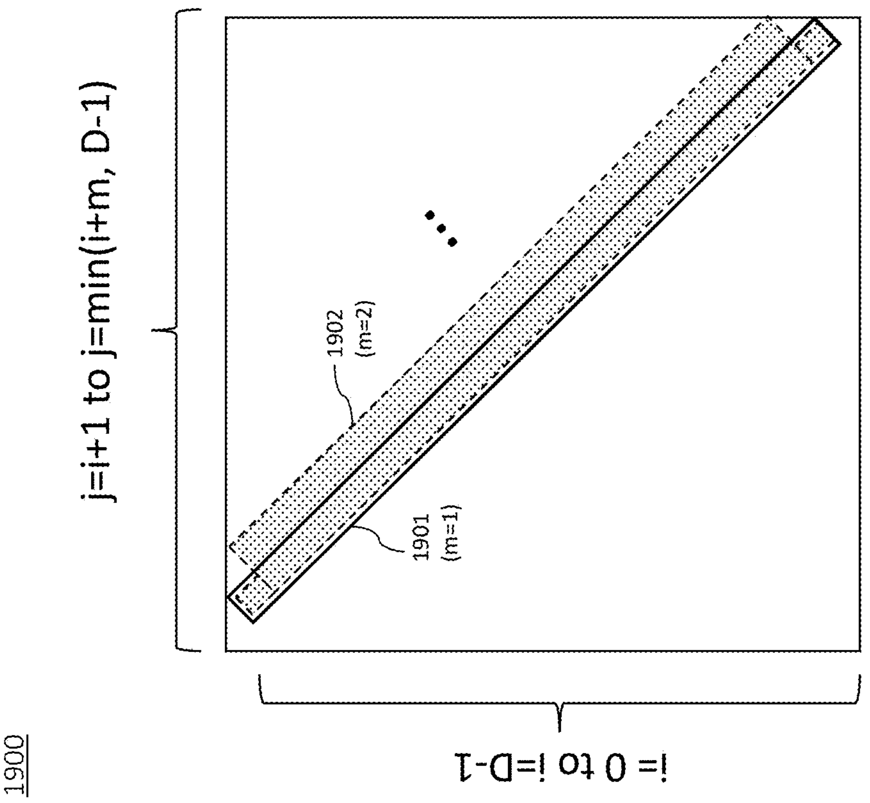
FIG. 19 is a diagram depicting an example matrix 1900 for a partial search for 2 residual bit errors, according to one or more embodiments.

In some implementations, the system can perform a partial search for 2 residual bit errors (referred to as PS-2-REC) with D number of bit positions (as a result of a majority vote) as follows. The system can calculate the total number of basic operations for a full (exhaustive) search for 1 or 2 residual bit errors (1-REC and 2-REC) as D(D+1)/2. The system can then determine whether the total number of basic operations for the full search D(D+1)/2 is smaller than (or within) the complexity constraint L. In response to determining that the total number of basic operations for the full search D(D+1)/2 is (slightly) higher than the complexity constraint L, the system can perform a full search for 1 residual bit error and a partial search for 2 residual bit errors while ensuring that the total number of basic operations does not exceed L, rather than completely abandoning the search for 2 residual bit errors. The system can perform a partial search for 2 residual bit errors by making the inner loop index go from j=i+1 to j=min(i+m, D−1), where the function min(a,b) returns the smaller of a and b. The system can find the value of m. FIG. 19 is a diagram depicting an example matrix 1900 for a partial search for 2 residual bit errors. For example, if m=1, then the system can use (D−1) basic operations to allow the search of index pairs (0,1), (1,2), (2,3), (3,4), . . . , (D−2,D−1), which is a subset of all possible index pairs (the pairs inside the solid-line rectangle denoted by 1901 in FIG. 19). Similarly, if m=2, then the system can use (D−1)+(D−2) basic operations to search through the index pairs of (0,1), (0,2), (1,2), (1,3), (2,3), (2,4), (3,4), (3,5), . . . , (D−3,D−2), (D−3,D−1), and (D−2,D−1) (the pairs inside the dashed-line shaded area denoted by 1902 in FIG. 19).

In some implementations, the system can determine the value of m as follows. The system can start with m=0 and set L'=(L−D) basic operations to allow the system to go through each index of the outer loop at least once for the search of a single residual bit error. Then, the system can enter a loop (e.g., "while" loop) in which the system (1) first subtracts from L' the value of (D−1) basic operations, (2) check or determine whether the subtraction result is still greater than zero, and (3) in response to determining that the subtraction result is greater than zero, increment the value of m by 1 and continue to subtract from the result the value of (D−2) basic operations and (4) check or determine whether the result is still greater than zero. As such, the system can increment the value of m by 1 and decrement the basic operation value to subtract by 1 each time the execution goes through the while loop. The system can continue this process until the while loop stops (e.g., determining that the subtraction result is small than or equal to zero). In response to the while loop stopping, the system can obtain the current value of m as the desired value. Using this desired value of m can ensure that the total search complexity is not greater than L.

Similarly, in response to determining that L>D(D+1)/2 but L is smaller than the computational complexity required for the full search of 1, 2, or 3 bit errors (see Equation 7), the system can perform a partial search through a subset of the possible combinations of 3 residual bit errors among the D bit positions of non-unanimous votes. To perform a partial search for 3 residual bit errors, the system can increase the index of the third loop (which is the innermost loop) from k=j+1 to k=min(j+m, D−1), and find the desired value of m before going into the 3 nested loop. To find the desired value of m, the system can start with m=0 and set L'=L−D(D+1)/2 available basic operations. The subtraction of D(D+1)/2 in L' can allow the system to go through all index combinations of the two outermost loops at least once for the search of 1 or 2 residual bit errors. Then, the system can enter a loop (e.g., "while" loop) in which the system (1) first subtract from L' the value of (D−1)(D−2)/2, (2) check or determine whether the result is still greater than zero, and (3) in response to determining that the subtraction result is greater than zero, continue to subtract from the result the value of (D−2)(D−3)/2 and (4) check or determine whether the result is still greater than zero. In the meantime, the system can increment the value of m by 1 each time the execution goes through the while loop. The system can continue this process until the while loop stops (e.g., determining that the subtraction result is small than or equal to zero). In response to the while loop stopping, the system can obtain the current value of m as the desired value. Using this desired value of m can ensure that the total search complexity is not greater than L.

Figure 20:
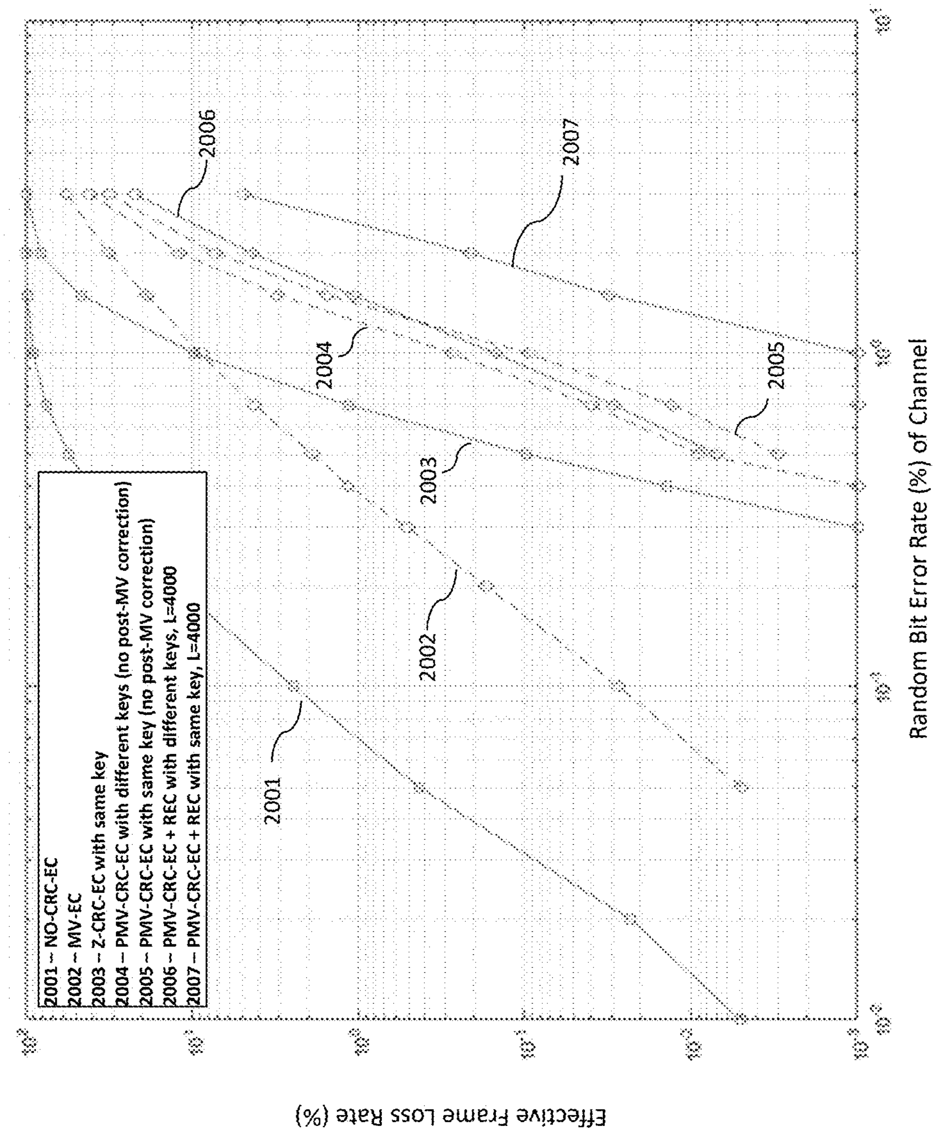
FIG. 20 is a diagram depicting example simulation results of different error correction schemes with 3 transmissions (2 retransmissions) of a bit-stream, including complexity constraint-based post-majority vote schemes with the same keystream or different keystreams, according to one or more embodiments.

FIG. 20 is a diagram depicting example simulation results of different error correction schemes with 3 transmissions (2 retransmissions) of a bit-stream, including complexity constraint-based post-majority vote schemes with the same keystream or different keystreams, for 32 kbps LC3 with 10 ms frame and 10-bit CRC-EC (N=10). Referring to FIG. 20, lines 2001, 2002, 2003, 2004, 2005, 2006, 2007 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, (3) Z-CRC-EC with the same key, (4) PMV-CRC-EC with no correction after the majority vote and with different keys, (5) PMV-CRC-EC with no correction after the majority vote and with the same key, (6) PMV-CRC-EC plus REC with L=4000 and different keys, and (7) PMV-CRC-EC plus REC with L=4000 and the same key.

As shown in FIG. 20, for PMV-CRC-EC without post-majority-vote error correction, performance difference between using the same key (e.g., line 2005 in FIG. 20) and using different keys (e.g., line 2004 in FIG. 20) can be small because the system checks both the CRC remainders of the first (original) bit-stream and the second (retransmitted) bit-stream. On the other hand, in some implementations, post-majority-vote error correction schemes (e.g., REC schemes) can check the CRC remainder of only the first (original) bit-stream and not the CRC remainders of the other bit-streams, and therefore, performance difference between using the same key (e.g., line 2007 in FIG. 20) and using different keys (e.g., line 2006 in FIG. 20) can be quite large for the post-majority-vote error correction. In some implementations, checking CRC remainders for all bit-streams can greatly reduce the performance difference but can increase the computational complexity significantly.

Figure 21:
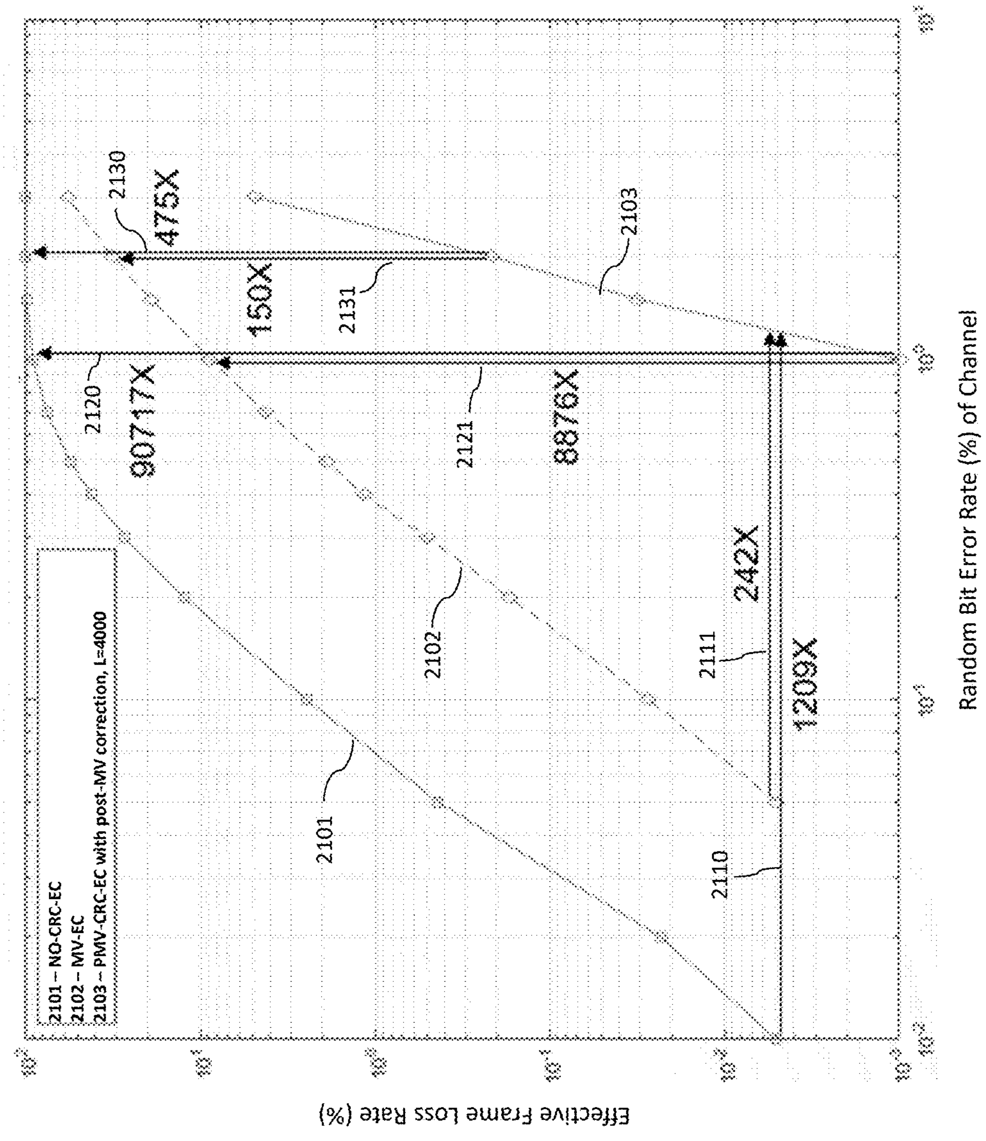
FIG. 21 is a diagram depicting example simulation results of different error correction schemes with 3 transmissions (2 retransmissions) of a bit-stream, including post-majority vote schemes, according to one or more embodiments.

FIG. 21 is a diagram depicting example simulation results of different error correction schemes with 3 transmissions (2 retransmissions) of a bit-stream, including post-majority vote schemes, for 320-bit payload. Referring to FIG. 21, lines 2101, 2102, 2103 correspond to simulation results (effective frame loss rate (%) vs random BER (%) of the channel) using configurations of (1) no CRC-EC (NO-CRC-EC), (2) a majority vote-based error correction without CRC-EC (MV-EC) which corrects bits using a majority votes without performing CRC-EC, and (3) PMV-CRC-EC with post-majority-vote correction, L=4000. As shown in FIG. 21, for 320-bit payload with 2 retransmissions, at a random bit error rate of 1%, the complexity constrained CRC-EC algorithm (PMV-CRC-EC with post-majority-vote correction, L=4000; line 2103 in FIG. 21) can achieve a huge reduction of frame loss rates from 8876 times (denoted by reference numeral 2121) to 90717 times (denoted by reference numeral 2120) compared with schemes without CRC-EC. At 2% random bit error rate, the complexity constrained CRC-EC algorithm can reduce frame loss rates by 150 times (denoted by reference numeral 2131) to 475 times (denoted by reference numeral 2130). At 0.005% frame loss rate, the complexity constrained CRC-EC algorithm can withstand 242 times (denoted by reference numeral 2111) to 1209 times (denoted by reference numeral 2110) higher random bit error rates in the communication channel.

In some implementations, the system can perform additional CRC-EC techniques including (1) checking for 1 co-located double bit errors throughout all payload bits when there are two bit-streams (or 1 retransmission); and/or (2) accepting the very first solution the system finds and performing an early termination of the CRC-EC search.

In some implementations, after the system performs one or more CRC-EC schemes (e.g., Z-CRC-EC, MVR-CRC-EC, 2XOR-CRC-EC, PMV-CRC-EC, 1-REC, 2-REC, 3-REC, 1A-REC, constraint-based RECs), the system can determine that all bit errors have not been corrected, and then try to correct a co-located double bit error (e.g., both received bit-streams have a bit error in the same bit position). In some implementations, the system can check for single co-located double bit errors throughout all payload bits when there are 2 bit-streams (1 retransmission). The system can correct this co-located double bit error by performing an XOR operation with the CRC syndrome of the bit position in question to update the CRC state. This scheme can reduce the effective frame loss rate by up to 5 times at low bit error rates but by an insignificant amount at higher bit error rates for 1 retransmission.

The Z-CRC-EC scheme searches through all possible combinations of bit error positions and tries to find a single unique CRC-EC solution. Instead, in some implementations, the system can stop the search loop (e.g., early termination of the search) as soon as the system finds a match to the CRC remainder. In some implementations, instead of searching through ($2^D-1$) possible combinations of bit error positions among the D bit positions that have different bit values in two received bit-streams and trying to find a single unique solution (while rejecting multiple solutions) as Z-CRC-EC does, the system can just accept the very first solution the system finds and break the loop to terminate the CRC-EC search early. Simulation results show that with this change (e.g., early termination of the search), only 15% of the 78 test conditions have a very slight increase in the effective packet loss rate in the order of 0.001% to 0.002% (compared to the Z-CRC-EC scheme), but this early termination scheme can allow the system to reduce the average CRC-EC search complexity by roughly a factor of 2. For 85% of the 78 test conditions, the system performs the early termination scheme to obtain the same solution as found by Z-CRC-EC. For the remaining 15% of test conditions, the effective frame loss rate is degraded by only 0.001% to 0.002%, which should not result in any meaningful difference in audio quality. Thus, the early termination scheme can cut the average computational complexity by half while maintaining essentially the same audio quality.

Embodiments in the present disclosure have at least the following advantages and benefits. First, embodiments in the present disclosure can provide useful techniques for performing CRC-EC schemes for 2 retransmissions (or 3 transmissions) with BT LE encryption. For example, simulation results show that for the condition of 2 retransmissions, the enhanced CRC-EC schemes according to some embodiments can correct all bit errors at random bit error rates of 0.7% and 0.2% for 32 kbps and 128 kbps LC3, respectively.

Second, embodiments in the present disclosure can provide useful techniques for achieving significant algorithm enhancements compared to conventional CRC-EC schemes (e.g., Z-CRC-EC or G-CRC-EC). For 2 retransmissions and 32 kbps LC3 with a random bit error rate of 1%, the enhanced CRC-EC schemes according to some embodiments can reduce the effective packet loss rate by nearly 5 orders of magnitude (from 90.7% to 0.001%) compared with using only conventional CRC error detection. When applied to the LC3 codec, the enhanced CRC-EC schemes according to some embodiments can improve the output audio from nearly no sounds or very bad quality to nearly perfect audio quality at random bit error rates as high as 1.5% to 2% for the condition of 2 retransmissions.

VII. CRC-EC for Four or More Transmissions (Three or More Retransmissions)

The foregoing sections described CRC-EC schemes that can enhance the performance of the conventional CRC error correction schemes when the system has up to 3 transmissions (e.g., 2 retransmissions) of the same packet available. If the system has 4 or more transmissions of the same packet, such as in Bluetooth High Data Throughput (HDT) mode, the schemes for 3 transmissions cannot be applied to the condition of 4 or more transmissions without change (e.g., resolution of a 2:2 tie vote). Thus, there is a need for new enhanced CRC-EC techniques that can be applied to 4 or more transmissions.

To address the problem, a system (e.g., a communication system 105, 108, a computing system 2010) can perform enhanced CRC error correction for four or more transmissions (or equivalently three or more retransmissions). In some implementations, for the condition of 4 transmissions of the same packet, the system can perform one or more aforementioned enhanced CRC-EC schemes (e.g., 2XOR-CRC-EC, PMV-CRC-EC), with the addition of the $4^{th}$ transmission, but the computational complexity would significantly increase. In some implementations, for the condition of 4 transmissions of the same packet, to save computational complexity, the system can directly perform a majority vote for each bit position among all 4 received packets (without applying one or more aforementioned enhanced CRC-EC schemes). In some implementations, after performing the majority vote for each bit position among all 4 received packets, (1) if there is no 2:2 "tie" vote where two bit-streams have bit value "0" and two bit-streams have bit value "1" for any bit position, and (2) if the resulting bit-stream obtained by the majority vote passes the CRC check (e.g., division of the resulting bit-stream by G(x) results in the received CRC remainder), then the system can determine to have a "supposedly" error-free solution. The "supposedly" error-free solution can still have some bit errors because with a very low probability a bit-stream that passes the CRC check can still have some bit errors.

In some implementations, the system can determine whether the majority vote on the 4-bit-streams gives, provides, generates, or produces a solution (e.g., by performing the CRC check). In response to determining that the majority vote on the 4-bit-streams does not give a solution, the system can update the CRC state for every flipped bit in the first bit-stream due to the majority vote. Here, in updating the CRC state (e.g., CRC remainder), the system can initially set the CRC state to zero, and perform a bit-by-bit XOR operation between the previous CRC state and the stored CRC syndrome of the bit that is getting flipped (e.g., changed in bit value). Then, the system can identify all bit positions that have a 2:2 tie vote, and use such identified "tied" bit positions to perform a CRC-EC search using the updated CRC state. Here, a "CRC-EC search" for a CRC-EC scheme that is configured to correct up to N bit errors (where N=10 in our simulations) refers to for given N bit positions, searching through $2^N-1$ possible combinations of 0s and 1s in these N bit positions (where 0 means no bit error and 1 means bit error) to determine whether any particular bit combination generates a bit-stream that passes the CRC check. The number of combinations to search through can be $2^N-1$ rather than $2^N$, because the combination of all 0s (which means no bit error) is not a valid solution, as the system already detects or recognizes (e.g., based on the CRC check) that there is at least one bit error in these N bit positions. The system can determine whether such a CRC-EC search for the 2:2 tie vote bit positions gives, provides, generates, or produces a solution. In response to determining that the CRC-EC search for the 2:2 tie vote bit positions does not give a solution, the system can use these tie vote bit positions to perform the Residual Error Correction (REC) searches. In some embodiments, in performing the REC searches, the system can perform partial searches for 2 or 3 residual bit errors. The above-described new enhanced CRC-EC schemes for 4 transmissions based on tie votes (TV) are referred to as "TV-4STR-CRC-EC".

In some implementations, the system can improve performance of CRC-EC on 4 transmissions by using or considering all bit positions with non-unanimous votes (NUV). In some implementations, in addition to the bit positions corresponding to 2:2 tie votes, the system can consider the bit positions corresponding to the other non-unanimous votes, for example, the 1:3 votes and 3:1 votes. Here, the expression "x:y" at a given bit position refers to votes in which x bit-streams has bit value 0 and y bit-streams has bit value 1 at the given bit position. However, if the system blindly uses all bit positions corresponding to non-unanimous votes (1:3, 2:2, and 3:1) for both the CRC-EC search and the REC searches, then the resulting packet loss rate may be actually worse than the scheme above that uses only the bit positions corresponding to the 2:2 tie votes (the TV-4STR-CRC-EC scheme). The reason is that there are many more 1:3 and 3:1 votes than 2:2 tie votes, to the point that at a relatively low bit error rate, the total number of bit positions corresponding to all non-unanimous votes already exceeds the N=10 bits that the CRC-EC search can handle. To address this problem, the system can use different subsets of bit positions for the CRC-EC search versus the REC searches. In some implementations, the system can use only the bit positions corresponding to 2:2 tie votes for the CRC-EC search but use all bit positions corresponding to non-unanimous votes for the REC searches. This scheme is referred to as "TV-NUV-4STR-CRC-EC".

In some implementations, the system can extend or generalize the enhanced CRC-EC scheme for 4 transmissions to more than 4 transmissions (e.g., T number of transmissions). In response to determining that the number of transmissions T is an odd number and T>=3 (referred to as "first case"), the system can use the bit positions with vote results of (T−1)/2:(T+1)/2 or (T+1)/2:(T−1)/2 in the CRC-EC search and the search of 1, 2, or 3 residual bit errors. In response to determining that the number of transmissions T is an even number and T>=4 (referred to as "second case"), the system can use the bit positions with the tie vote result of T/2:T/2 in the CRC-EC search and use the bit positions of the tie votes plus the bit positions with vote results of (T−2)/2:(T+2)/2 or (T+2)/2:(T−2)/2 in the search of 1, 2, or 3 residual bit errors. In some implementations, to improve the performance, the system can apply partial searches for 2 residual bit errors or 3 residual bit errors to both the first case and the second case above to make nearly full use of the allowed computational complexity budget.

Figure 22:
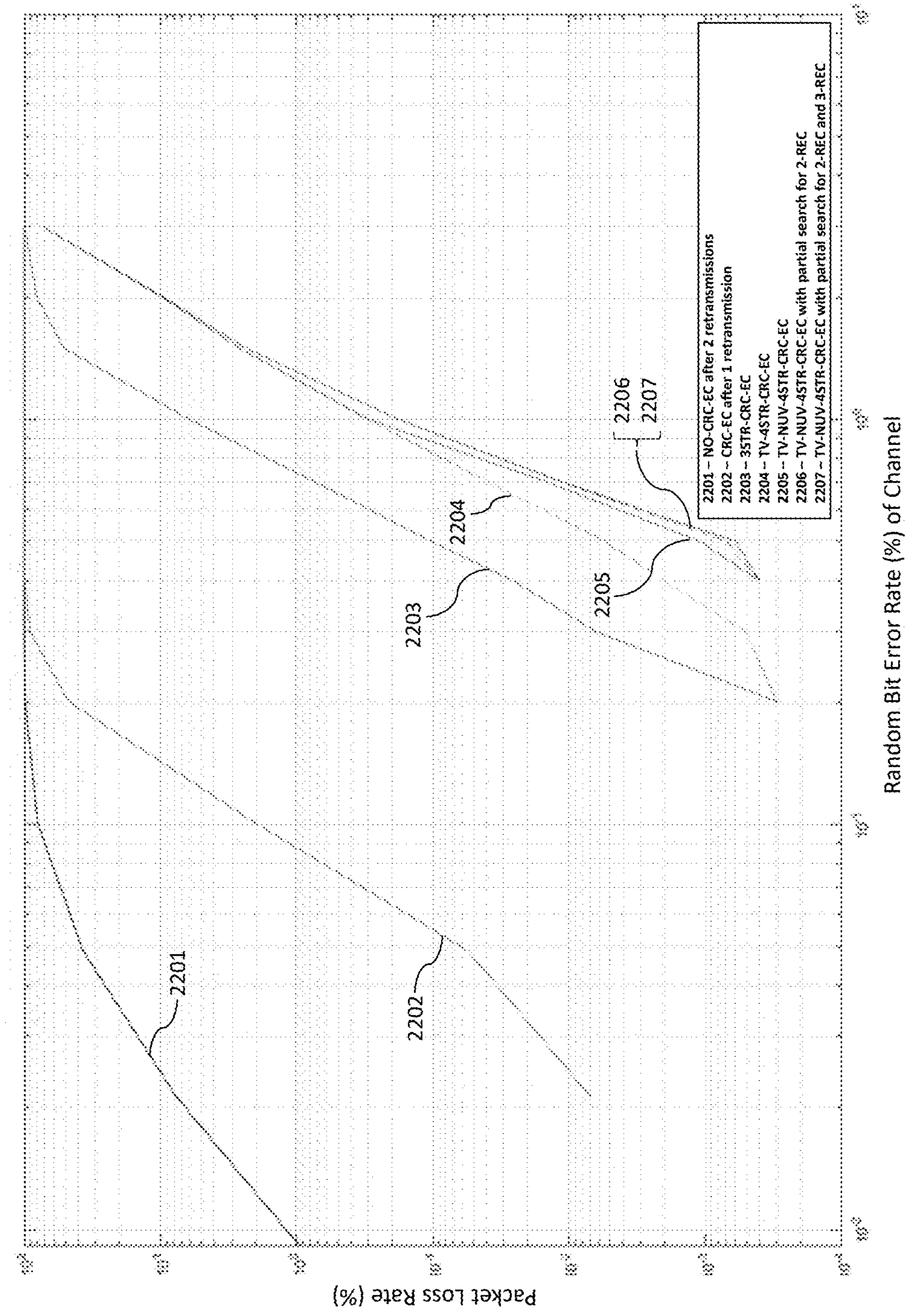
FIG. 22 is a diagram depicting example simulation results of different error correction schemes with 4 transmissions (3 retransmissions) of a bit-stream, according to one or more embodiments.

FIG. 22 is a diagram depicting example simulation results of different error correction schemes with 4 transmissions (3 retransmissions) of a bit-stream, for 320-byte payload or packets with 10-bit CRC-EC search (N=10) for 32-bit CRC. Referring to FIG. 22, lines 2201, 2202, 2203, 2204, 2205, 2206, 2207 correspond to simulation results (effective frame loss rate (%) vs random BER (%) of the channel) using configurations of (1) no CRC-EC (NO-CRC-EC) after 2 retransmissions, (2) CRC-EC after 1 retransmission, (3) 3STR-CRC-EC, (4) TV-4STR-CRC-EC, (5) TV-NUV-4STR-CRC-EC, (6) TV-NUV-4STR-CRC-EC with partial search for 2-REC, and (7) TV-NUV-4STR-CRC-EC with partial search for 2-REC and 3-REC. Here, the 3STR-CRC-EC scheme is the best enhanced CRC-EC for 3 transmissions.

As shown in FIG. 22, using the TV-4STR-CRC-EC scheme (e.g., line 2204 in FIG. 22), the system can achieve about an order of magnitude of packet loss rate reduction for most of the bit error rates from 0.3% to 2% when compared with the enhanced CRC-EC scheme for 3 transmissions (3STR-CRC-EC; line 2203 in FIG. 22). Compared with the TV-4STR-CRC-EC scheme (e.g., line 2204 in FIG. 22), the TV-NUV-4STR-CRC-EC scheme (e.g., line 2205 in FIG. 22) can provide further significant reduction of the packet loss rate for bit error rate from 0.4% to 0.7%. Line 2206 in FIG. 22 shows the performance of the TV-NUV-4STR-CRC-EC scheme with partial search for 2-REC if D(D+1)/2>L. Line 2207 in FIG. 22 shows the performance of the TV-NUV-4STR-CRC-EC scheme with partial search for 2-REC and 3-REC. Note that there is no reason for lines 2203 and 2204 to join at 0.2% BER and 0.0003% packet loss rate (PLR) or for lines 2206 and 2207 to join line 2205 at 0.4% BER and 0.0004% PLR. This is most likely just artifacts due to insufficient sampling of extremely-low-probability events. Although as many as 1 million packets were simulated for each CRC-EC scheme at each BER in FIG. 22, here there are only 3 or 4 packets out of a million that are not corrected. If a much, much larger number of packets were simulated, then these 5 lines mentioned above probably would not join at any point. Similar explanations can be applied to earlier performance plots such as FIGS. 13, 14, 15, 17B, 18, 20, 23A, 28B, and 29B.

VIII. CRC-EC for Audio Codec Bit Error Concealment (BEC)

In one aspect, unlike general data transmission that does not allow bit errors, for codec applications some residual bit errors or packet loss can be tolerated. For example, even when an error correction scheme (e.g., majority-vote based CRC-EC) on a bit-stream fails, the bit-stream can be decoded. Such error toleration can allow the system to use additional techniques to further improve the output audio quality (e.g., LC3 BEC output audio quality). For example, if a CRC-EC search does not find a unique solution to correct all bit errors after 2 retransmissions (e.g., after 3 transmissions), then rather than calling PLC (which may reduce the audio quality degradation), the system can use a majority vote result as the output bit-stream and directly decode the majority vote result as is. This scheme (direct decoding of the majority vote result) can potentially give an error-free bit-stream and reduce the effective frame loss rate. Even if the scheme does not give an error-free bit-stream, in some cases the output audio quality can be better than throwing away all bits and calling PLC. For example, perceptual evaluation of speech quality (PESQ) measurements show that the direct decoding of the majority vote result can improve average PESQ scores.

In one aspect, wideband speech (WBS) sampled at 16 kHz, also known as wideband voice or HD voice, is high definition voice quality for telephony audio. The quality of wideband speech can be measured with PESQ. A standard (e.g., ITU-T P.800) specifies how to conduct a subjective listening test to measure speech quality in mean opinion score (MOS) as follows. After listening to each of many sentence pairs, a listener is to give an opinion score about the speech quality using the 1-5 scale in Table 1. For each test condition, the average of all such scores from all listeners is the MOS for that condition. However, generally formal subjective listening tests like MOS are very costly and time-consuming.

TABLE 1

| Speech Quality Scale | |
|---|---|
| Speech Quality | Score |
| Excellent | 5 |
| Good | 4 |
| Fair | 3 |
| Poor | 2 |
| Bad | 1 |

A standard (e.g., ITU-T P.862) also specifies PESQ that uses computer software to predict the MOS by analyzing the original speech and distorted version.

Figure 23A:
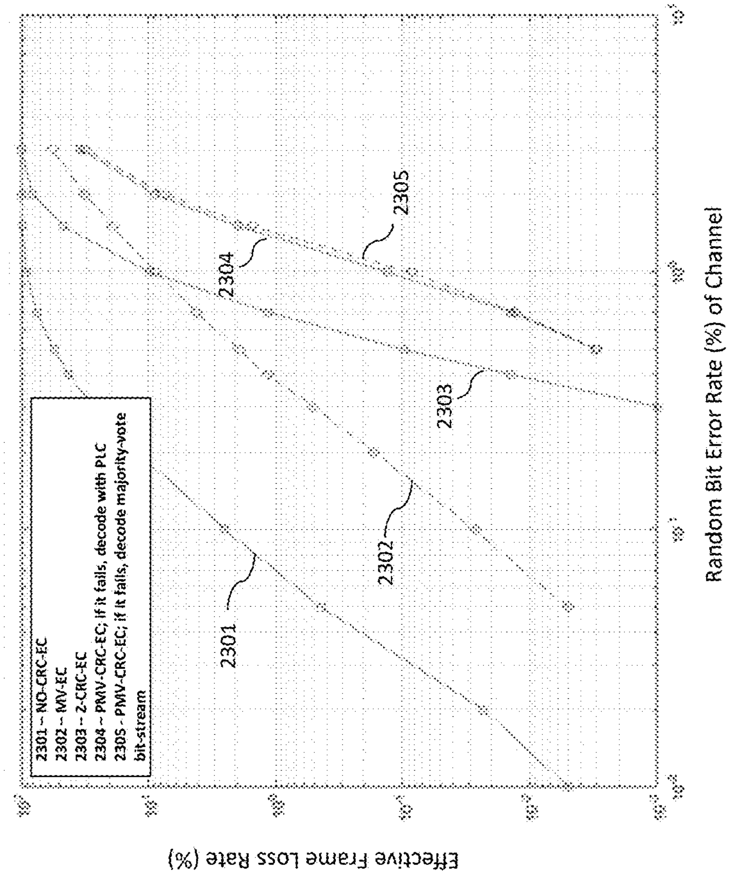
FIG. 23A and FIG. 23B are diagrams depicting example simulation results of different error correction and/or decoding schemes with 3 transmissions (2 retransmissions) of a bit-stream, according to one or more embodiments.

FIG. 23A is a diagram depicting example simulation results of different error correction and/or decoding schemes with 3 transmissions (2 retransmissions) of a bit-stream, for 32 kbps LC3 with 10 ms frames and 10-bit CRC-EC search (N=10). Referring to FIG. 23A, lines 2301, 2302, 2303, 2304, 2305 correspond to simulation results (effective frame loss rate (%) vs random BER (%) of the channel) using configurations of (1) no CRC-EC (NO-CRC-EC), (2) a majority vote-based error correction without CRC-EC (MV-EC), (3) Z-CRC-EC (using XOR of three bit-streams), (4) PMV-CRC-EC; if it fails, decode with PLC, and (5) PMV-CRC-EC; if it fails, decode the majority-vote bit-stream.

Figure 23B:
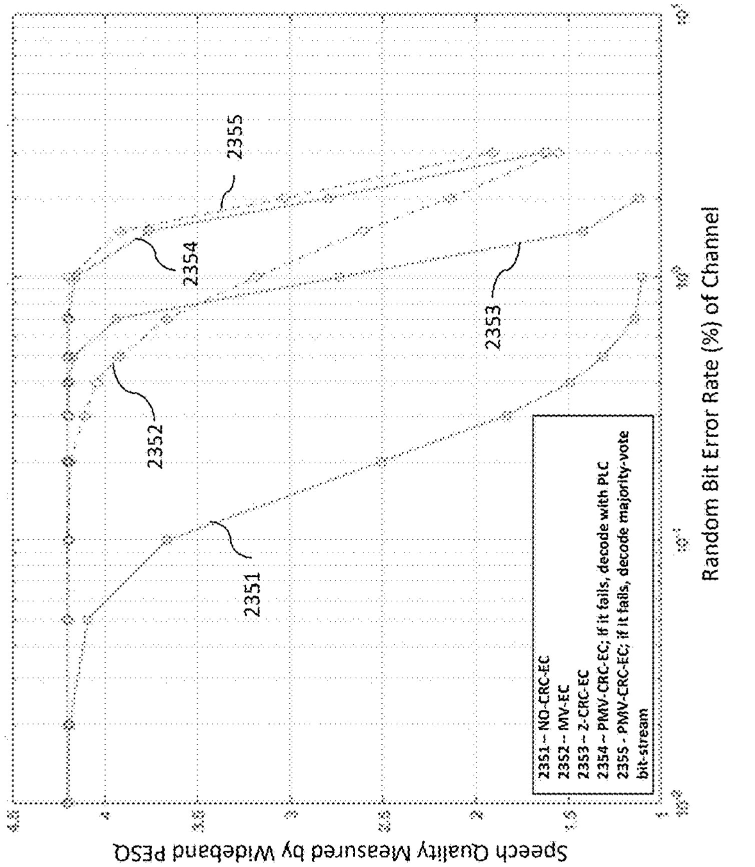

FIG. 23B is a diagram depicting example simulation results of different error correction and/or decoding schemes with 3 transmissions (2 retransmissions) of a bit-stream, for 32 kbps LC3 with 10 ms frames and 10-bit CRC-EC search (N=10). Referring to FIG. 23B, lines 2351, 2352, 2353, 2354, 2355 correspond to simulation results (speech quality measured by wideband PESQ vs random BER (%) of the channel) using configurations of (1) no CRC-EC (NO-CRC-EC), (2) a majority vote-based error correction without CRC-EC (MV-EC), (3) Z-CRC-EC (using XOR of three bit-streams), (4) PMV-CRC-EC; if it fails, decode with PLC, and (5) PMV-CRC-EC; if it fails, decode the majority-vote bit-stream. For the simulations of FIG. 23B, 96 sentence pairs of wideband speech were used, each exactly 8 seconds long, thereby being a total of 768 seconds, or 12.8 minutes of speech. PESQ score for each of the LC3 BEC outputs for the 96 sentence pairs was calculated and the average of these 96 PESQ scores for each test condition is presented in FIG. 23B.

Figure 24:
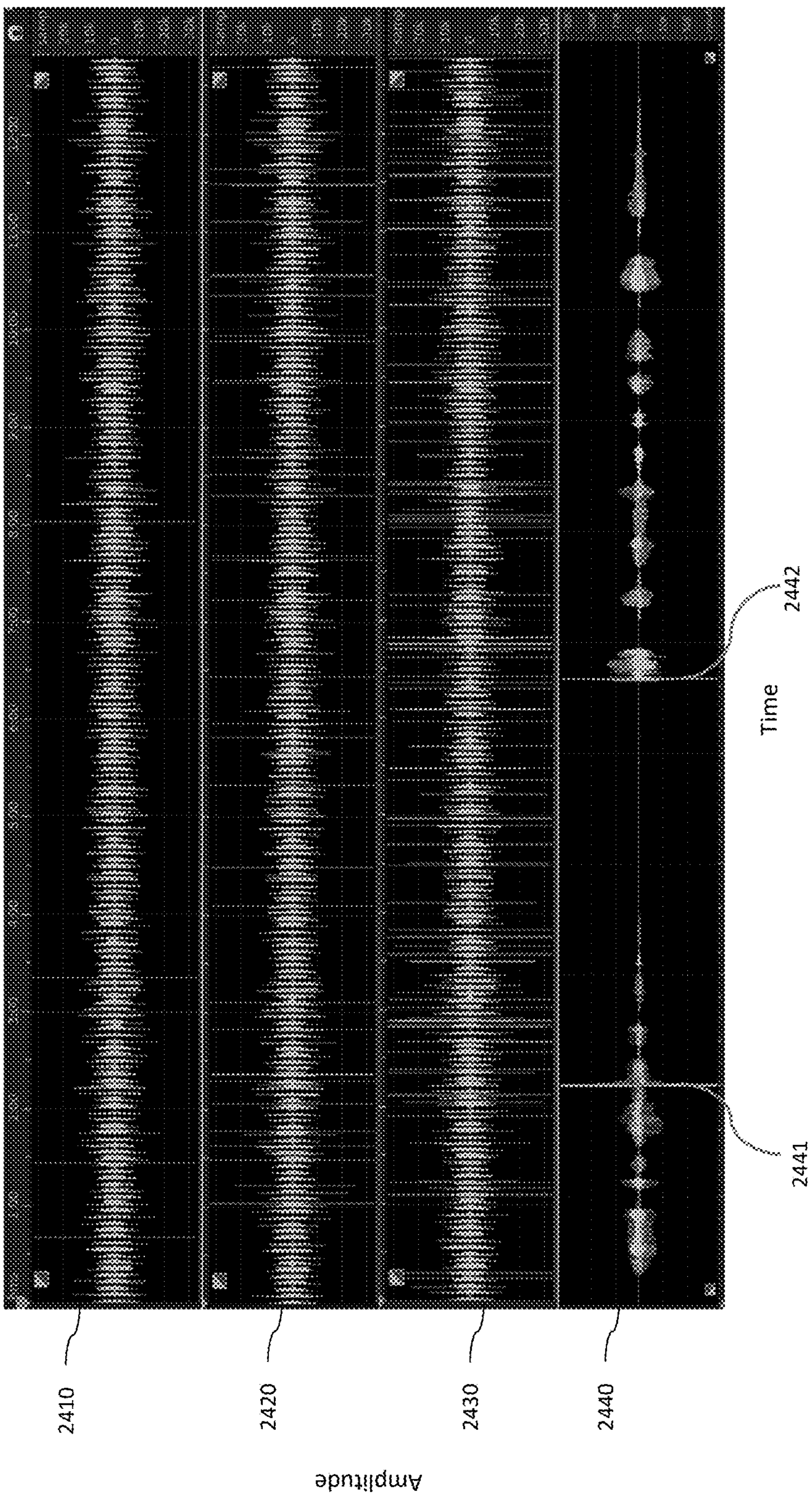
FIG. 24 is a diagram depicting amplitudes of speech signals over times, according to one or more embodiments.

In one aspect, at BER of 1.5% and above, there may be occasional "gain spikes" that may ruin or degrade the audio quality of the affected speech sentences. FIG. 24 is a diagram 2400 depicting amplitudes of speech signals 2410, 2420, 2430, 2440 over times. The speech signals 2410, 2420, 2430 including 96 sentence pairs correspond to BERs of 1.5%, 2%, 3%, respectively. The speech signals 2440 correspond to a zoomed-in version of the speech signal 2430 including 2 sentences. The speech signals 2410, 2420, 2430, 2440 include gain spikes. For example, the speech signal 2440 includes two examples of gain spikes 2441 and 2442. It is observed that no gain spike appears at BER≤1% while progressively more gain spikes appear at BER≥1.5% as shown in FIG. 24. It is observed that at high channel bit error rates (e.g. 1.5% and above), there are occasional residual bit errors even after the complexity-constrained post-majority-vote bit error correction described above. Some of these residual bit errors may cause large "pops" or "gain spikes" in the LC3 decoder output audio signal.

To address this "gain spikes" problem, a system (e.g., a communication system 105, 108, a computing system 2010) can eliminate, remove or reduce gain spikes based on the observation that if residual bit errors hit insensitive bits, the output audio quality can be better than throwing away all bits and calling PLC. In some implementations, the system can perform LC3-specific techniques to eliminate, remove or reduce gain spikes, but in some implementations, these techniques can be applied to any codec other than LC3.

In some implementations, the system can identify one or more potential bit error positions in a bit-stream (e.g., LC3 bit-stream) including audio frames (e.g., 10-ms frames) and check or determine whether the identified potential bit error positions hit some of sensitive bits in a current frame. Here, the sensitive bits refers to those bits that when bit errors occur in the corresponding bit positions can cause a significantly large degradation to the output audio quality. Examples of the sensitive bits include first few most significant bits (MSBs) of an 8-bit global gain. The global gain of an audio frame refers to a parameter to control the volume level of the audio frame. In some implementations, the sensitive bits may be the most sensitive bits among all sensitive bits that can cause a large degradation to the output audio quality when bit errors occur in the corresponding bit positions. In response to determining that the identified potential bit error positions hit some of sensitive bits in the current frame, the system can use PLC rather than decoding the current frame directly. In some implementations, the system can use a detector to detect a few remaining residual gain spikes and use PLC to eliminate or remove such gain spikes. It is observed from simulations that after using both techniques above (e.g., (1) removing gain spikes based on potential bit error positions and sensitive bit positions, and (2) removing residual gain spikes), there were no more gain spikes left.

In some implementations, to address the gain spikes problem, the system can measure, determine or detect a bit error sensitivity of a codec payload (e.g., LC3 payload) at each bit position. For example, the bit error sensitivity of a payload may be a sensitivity of audio quality to bit errors at each bit position in a 32 kbps LC3 payload. In some implementations, for each of bit positions in a payload (e.g., each of 320 bit positions in an LC3 payload), simulations can be performed such that the bit in that bit position is always in error for every frame and there are no bit errors in other bit positions. The system can measure or determine a resulting wideband PESQ score with each bit position being in error. The system can calculate or determine a value of PESQ degradation for a bit position by subtracting the resulting wideband PESQ score (with that bit position being in error) from the PESQ score of a clear-channel decoder output (e.g., LC3 decoder output). The system can determine a bit error sensitivity of a bit position such that the higher the degradation value for the bit position is (e.g., the more audio quality degradation a bit error in the bit position can cause), the more sensitive to bit errors the bit position is. In some implementations, the system can determine a threshold for audio quality degradation (or PESQ score degradation), and in response to determining that a value of the PESQ degradation in a bit position is greater than the threshold, the system can determine that bit position to be a sensitive bit position.

Figure 25:
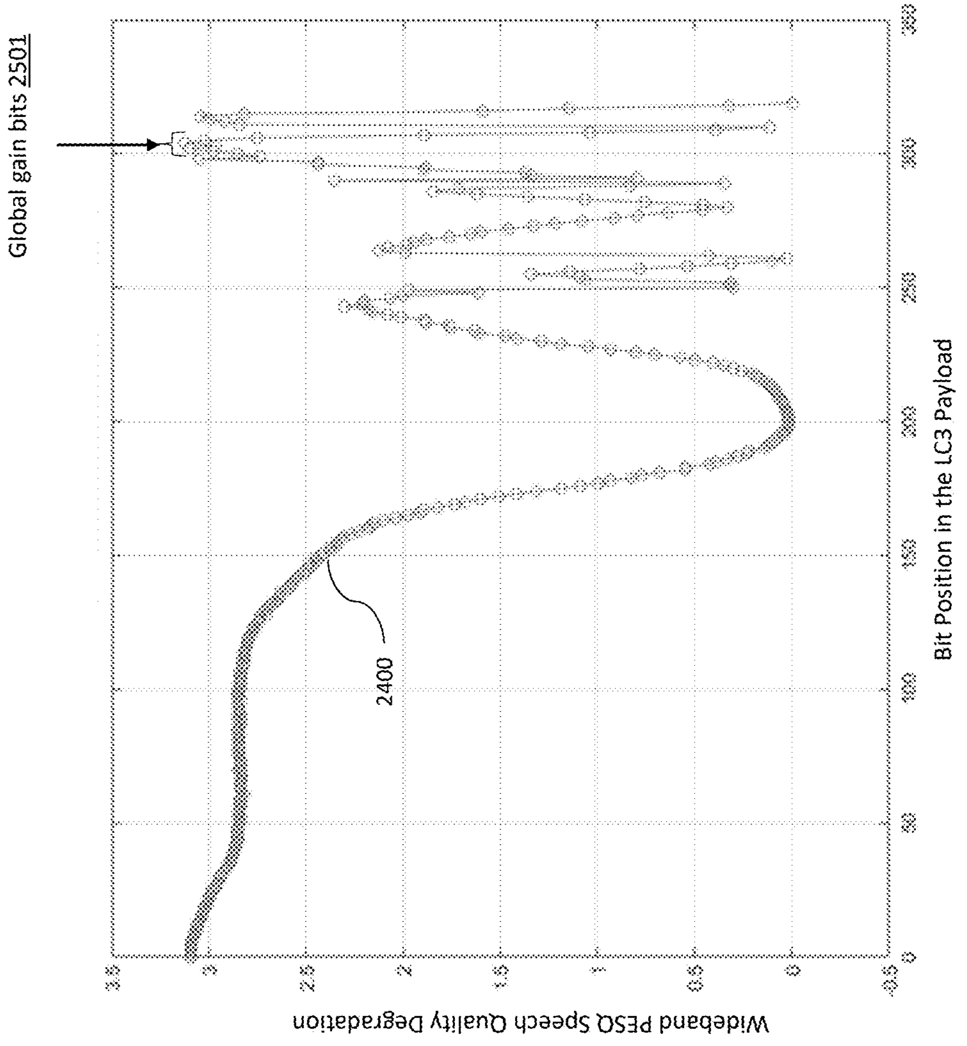
FIG. 25 is a diagram depicting example simulation results of wideband Perceptual Evaluation of Speech Quality (PESQ) degradation when each bit position in an LC3 payload is always in error, according to one or more embodiments.

FIG. 25 is a diagram depicting example simulation results of wideband PESQ degradation when each bit position in an LC3 payload is always in error. FIG. 25 shows that the highest degradation values 2501 which correspond to global gain bits of the LC3 payload.

In some implementations, the system can perform XOR between multiple bit-streams (e.g., 2 bit-streams or 3 bit-streams) to obtain an XOR map, and identify one or more (bit-error) sensitive bit positions (which correspond to the most sensitive bits among all sensitive bits that can cause a large degradation to the output audio quality). The system can then determine whether any of potential bit error positions identified by the XOR map hits or corresponds to any sensitive bit position. In response to determining that any of potential bit error positions identified by the XOR map hits or corresponds to a sensitive bit position, the system can call PLC to eliminate, remove or reduce gain spikes (for example, PLC does not produce or output any gain spike).

In some implementations, the system can initially set the PESQ degradation threshold to a first value (e.g., 2.7) and in response to determining that a PESQ degradation value in a bit position is greater than the first value, determine that bit position as sensitive. In response to determining that any of potential bit error positions hits or corresponds to a sensitive bit position (among sensitive bit positions determined based on the first threshold), the system can call PLC to eliminate, remove or reduce gain spikes. In response to determining that PLC is called too frequently (resulting in lower PESQ scores and choppy sounds, for example), in the design phase the system can increase the PESQ degradation threshold to a second threshold (e.g., 3) and so on until the system obtains sufficiently high PESQ scores. In some implementations, the system can set the PESQ degradation threshold such that global gain bits of a bit-stream can be determined as sensitive bit positions. In some implements, the system can set or determine only a portion of MSBs of global gain bits as sensitive bit positions. For example, the system can set or determine only four (4) MSBs of eight (8) global gain bits as sensitive bit positions. A simulation result shows that as the PESQ degradation threshold is set to a higher value (resulting in higher PESQ scores), more than 90% of original gain spikes were eliminated but a very small number of gain spikes still remained (referred to as "residual gain spikes"). If the system attempts to eliminate all gain spikes by calling PLC, then the system would get lower PESQ scores and choppier sounds.

In some implementations, the system can eliminate a majority of gain spikes caused by bit errors in a global gain (e.g., a 8-bit global gain in an LC3 bit-stream). In some implementations, the system can perform a CRC-EC search on a bit-stream for a solution, determine that the CRC-EC search cannot find a solution, and directly decode the bit-stream resulting from a majority vote of 3 received bit-streams. The system can then check a portion of global gain bits of the bit-stream (e.g., 4 MSBs of 8 global gain bits in the LC3 bit-stream) and determine whether any of the portion of the global gain bits has the same bit values in all 3 received bit-streams. In response to determining that any of the portion of the global gain bits does not have the same bit values in all 3 received bit-streams, the system can call PLC to reduce the majority of gain spikes in the bit-stream.

Figure 26:
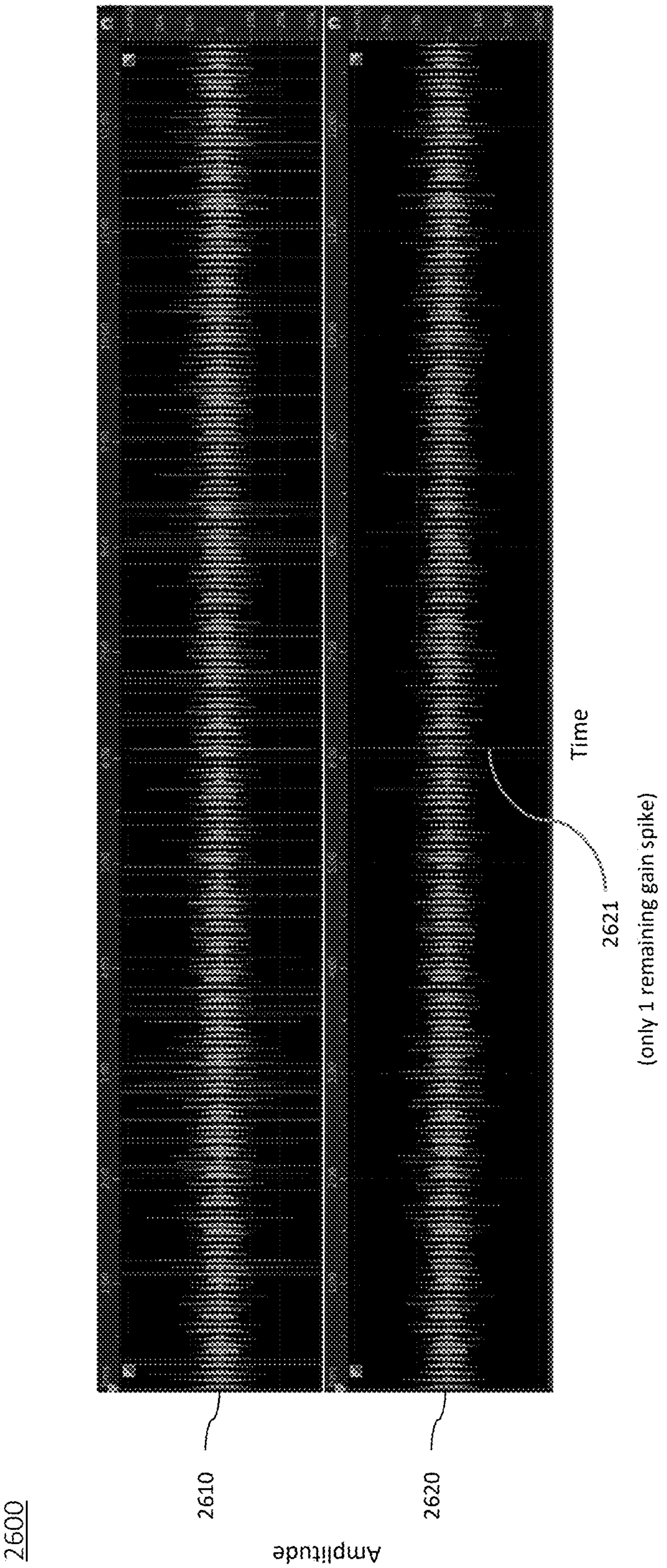
FIG. 26 is a diagram depicting amplitudes of speech signals over times, according to one or more embodiments.

FIG. 26 is a diagram 2600 depicting amplitudes of speech signals 2610, 2620 over times. The speech signals 2610, 2620 including 96 sentence pairs in a LC3 bit-stream correspond to BERs of 3%. The speech signal 2610 is obtained before the system checks 4 MSBs of 8 global gain bits in the LC3 bit-stream, while the speech signal 2620 is obtained after the system checks 4 MSBs of 8 global gain bits in the LC3 bit-stream and calls PLC if any of the 4 MSBs of 8 global gain bits do not have the same bit values in all 3 received bit-streams. As shown in FIG. 26, checking the 4 MSBs of 8 global gain bits and calling PLC can reduce the number of "rail-to-rail" gain spikes from 87 (e.g., number of gain spikes in the speech signal 2610) to just 1 (e.g., the only gain spike 2621 in the speech signal 2620) at BER=3%.

In some implementations, the system can eliminate gain spikes (e.g., residual gain spike 2621 in FIG. 26) by (1) detecting the gain spikes and (2) calling PLC. In some implementations, the system can detect only the gain spikes that significantly degrade the audio quality. For example, a gain spike of a current frame, of which the maximum signal magnitude of two frames before the current frame is sufficiently large (e.g., greater than 22,000 out of a maximum of 32768 for 16-bit integer representation of the signal), does not significantly degrade the audio quality. In some implementations, the system can detect gain spikes by looking for clipped audio signals (e.g., a clipped LC3 decoded output signal). In some implementations, the system can detect gain spikes in clipped audio signals that are not clipped signals from recorded original music signals because distortion would be introduced if the system detects such clippings as gain spikes and calls PLC.

In some implementations, supposing that a decoded signal (e.g., an LC3 decoded output signal) in the current frame is clipped, the system can determine, as a first condition, whether the decoded signal in the current frame has 5 or more consecutive samples at digital saturation. Here, digital saturation refers to a point at which a digital signal reaches its maximum level and cannot increase further. In some implementations, the first condition can be met if a decoded signal in the current frame has 5 or more consecutive samples each having a sample value of 32767 or −32768 for 16-bit pulse code modulation (PCM). Supposing that a decoded signal (e.g., an LC3 decoded output signal) in the current frame is clipped, the system can determine, as a second condition, whether the maximum magnitude (or amplitude) of the decoded signal (e.g., LC3 decoded output signal) at 2 frames before the current frame is less than a threshold magnitude. In some implementations, the second condition can be met if the maximum magnitude of an LC3 decoded output signal at 2 frames before the current frame is less than 22,000 for 16-bit PCM. The system can determine whether both the first condition and the second condition are met. In response to determining that both the first condition and the second condition are met, the system can detect one or more gain spike of the current frame and call PLC to eliminate the gain spike. Reasons for the second condition will be described as follows. If a recorded original music signal is clipped, the maximum magnitude of the music signal at 2 frames before the current frame may be usually very high. On the other hand, due to the LC3 overlapping window, if a decoded signal of the current frame is clipped due to bit errors, then the decoded signal in the last frame may already have a wrongly elevated signal level, while the maximum signal magnitude of the decoded signal at 2 frames before the current frame does not have a wrongly elevated signal level. In response to determining that the maximum magnitude of an LC3 decoded output signal at 2 frames before the current frame is greater than 22,000 and bit errors cause clipping in the current frame, then the system may not detect such a gain spike, but then the gain spike would be only slightly louder than previous frames, so the gain spike would not significantly degrade the audio quality. If the system does not check this second condition, and if a recorded original music signal is already clipped, then the system may detect the clipped segments of the current frame as gain spikes and call PLC even if such clipped segments of the current frame are already there in the original signal and are not due to bit errors. Calling PLC in this case will degrade the audio quality of the original music signal.

Figure 27A:
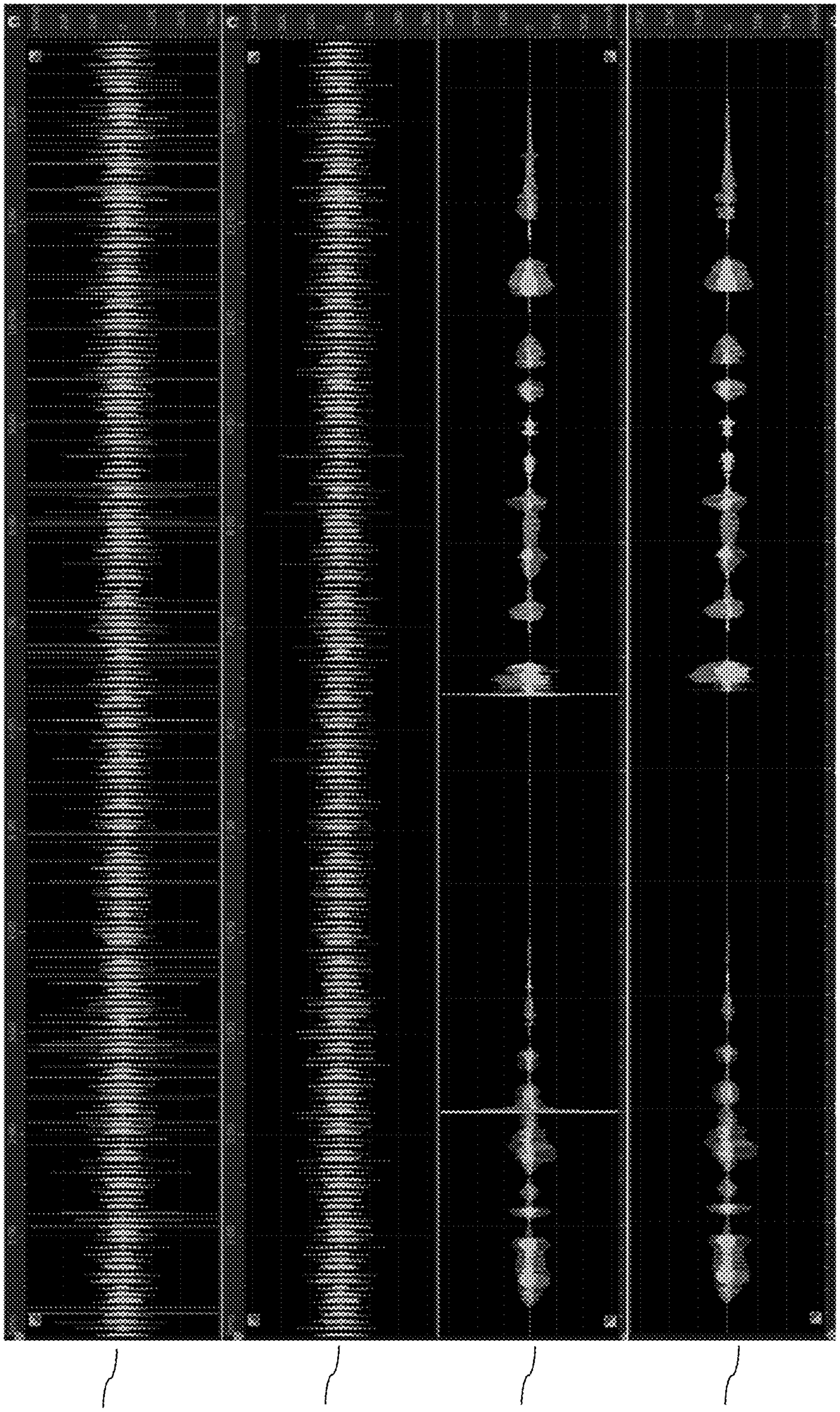
FIG. 27A is a diagram depicting amplitudes of speech signals over times, according to one or more embodiments.

FIG. 27A is a diagram 2700 depicting amplitudes of speech signals 2710, 2720, 2730, 2740 over times. The speech signals 2710, 2720, including 96 sentence pairs correspond to BERs of 3%, and represent a signal before the gain spike elimination (as described in the preceding section) and a signal after the gain spike elimination, respectively. The speech signal 2730 corresponds to a zoomed-in version of the speech signal 2710 including 2 sentences. The speech signal 2740 corresponds to a zoomed-in version of the speech signal 2720 including 2 sentences. As shown in FIG. 27A, the residual gain spikes shown in the speech signal 2730 are eliminated in the speech signal 2740 after the gain spike elimination.

Figure 27B:
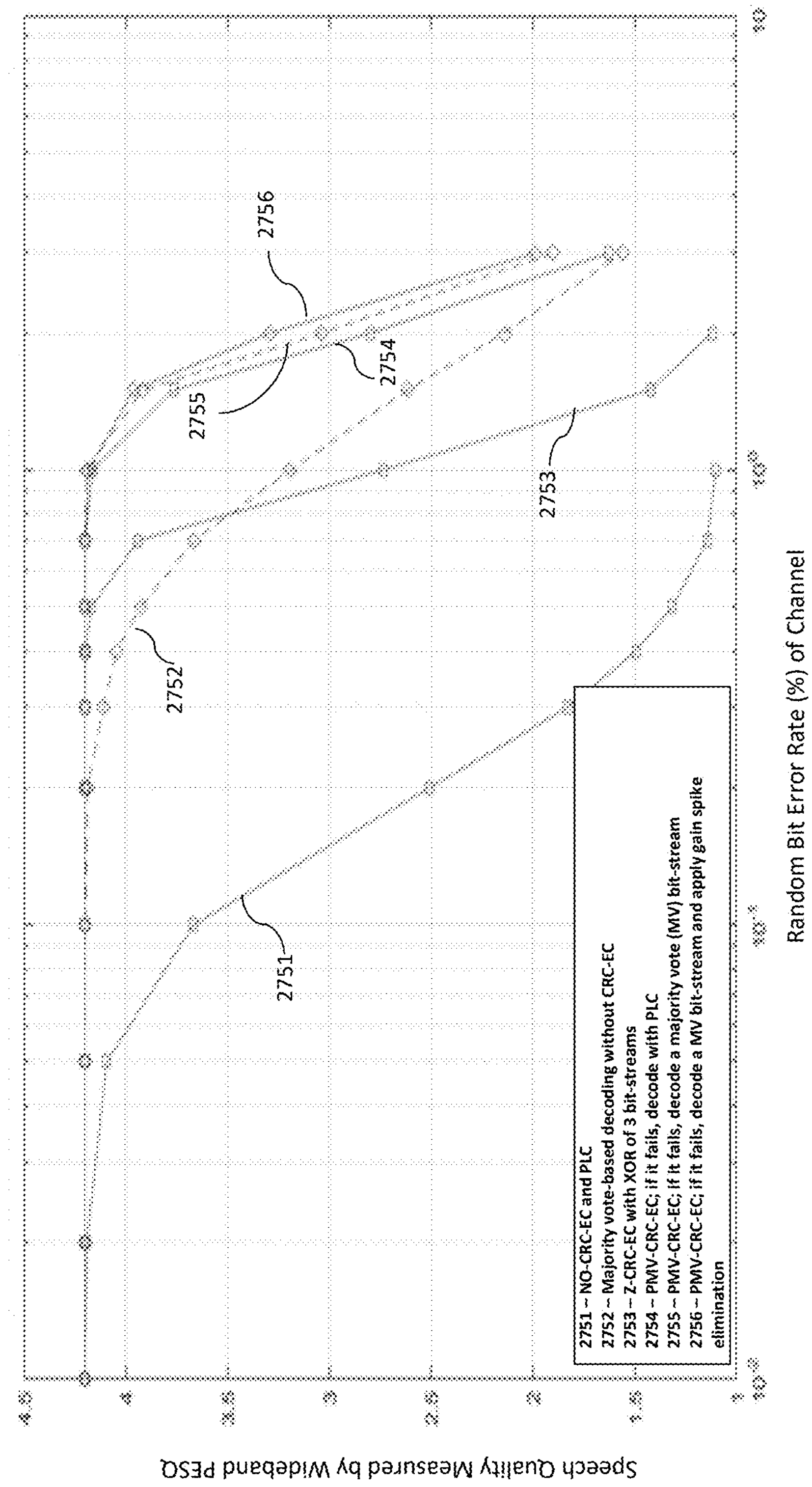
FIG. 27B is a diagram depicting example simulation results of different error correction and/or decoding schemes with 3 transmissions (2 retransmissions) of a bit-stream and using the same keystream, according to one or more embodiments.

FIG. 27B is a diagram depicting example simulation results of different error correction and/or decoding schemes with 3 transmissions (2 retransmissions) of a bit-stream and using the same keystream, for 32 kbps LC3 with 10 ms frames and 10-bit CRC-EC search (N=10). Referring to FIG. 27B, lines 2751, 2752, 2753, 2754, 2755, 2756 correspond to simulation results (speech quality measured by wideband PESQ vs random BER (%) of the channel) using configurations of (1) no CRC-EC (NO-CRC-EC) and use PLC, (2) a majority vote-based decoding without CRC-EC, (3) Z-CRC-EC (using XOR of three bit-streams), (4) PMV-CRC-EC; if it fails, decode with PLC, (5) PMV-CRC-EC; if it fails, decode the majority-vote bit-stream, and (6) PMV-CRC-EC; if it fails, decode the majority-vote bit stream and apply gain spike elimination. As shown in FIG. 27B, gain spike elimination (e.g., line 2756 in FIG. 27B) gives significant improvements in the wideband PESQ score averaged over 96 sentence pairs, compared to decoding a result of majority vote without performing gain spike elimination (e.g., line 2755 in FIG. 27B), even though effective frame loss rate is essentially the same. In other words, gain spike elimination (e.g., line 2756 in FIG. 27B) achieves huge PESQ and perceptual speech quality improvements for those particular sentence pairs hit by gain spikes.

Figure 28A:
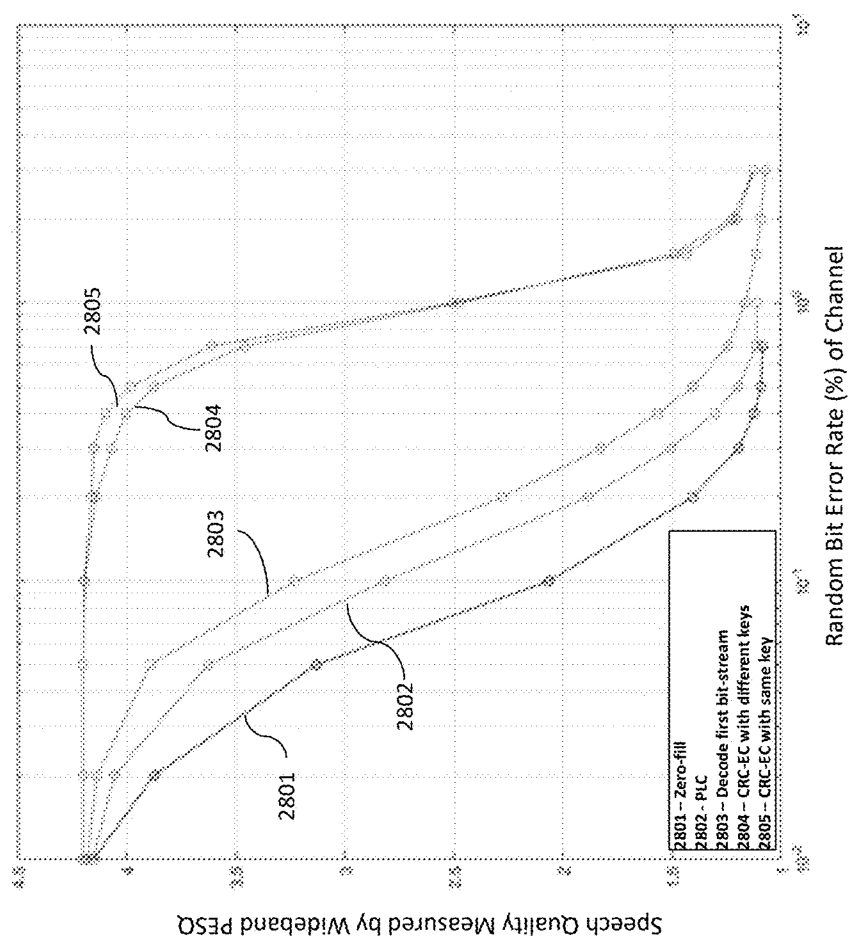
FIG. 28A is a diagram depicting example simulation results of different error correction and/or decoding schemes with 2 transmissions (1 retransmission) of a bit-stream, according to one or more embodiments.

FIG. 28A is a diagram depicting example simulation results of different error correction and/or decoding schemes with 2 transmissions (1 retransmission) of a bit-stream, for 32 kbps LC3 with 10 ms frames and 10-bit CRC-EC search (N=10). Referring to FIG. 28A, lines 2801, 2802, 2803, 2804, 2805 correspond to simulation results (speech quality measured by wideband PESQ vs random BER (%) of the channel) using configurations of (1) zero-fill, (2) PLC, (3) Decode the first bit-stream, (4) CRC-EC using different keys, and (5) CRC-EC using the same key.

Figure 28C:
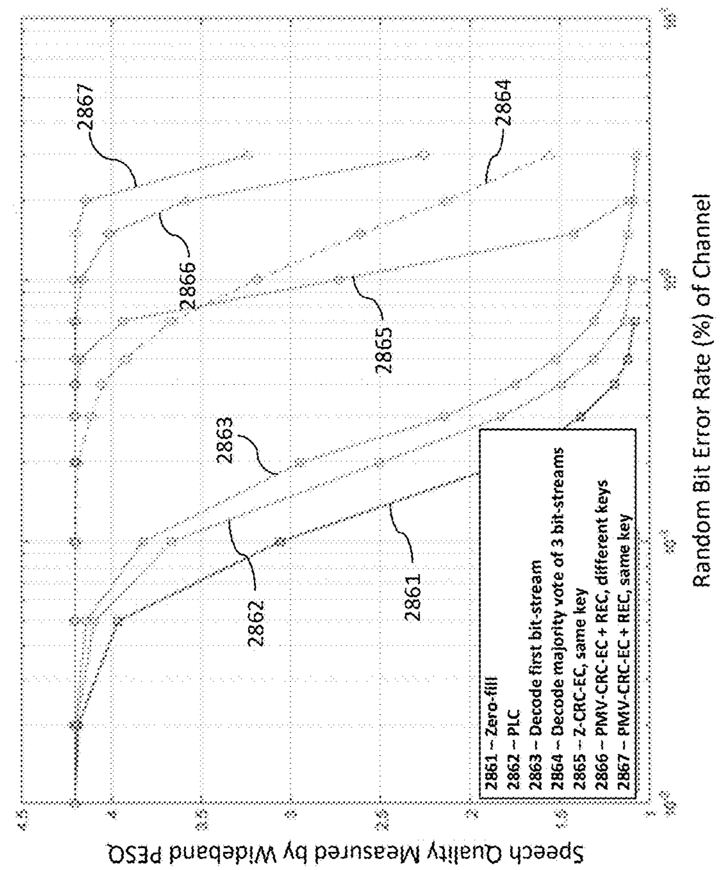
FIG. 28B and FIG. 28C are diagrams depicting example simulation results of different error correction and/or decoding schemes with 3 transmissions (2 retransmissions) of a bit-stream, according to one or more embodiments.
Figure 28B:
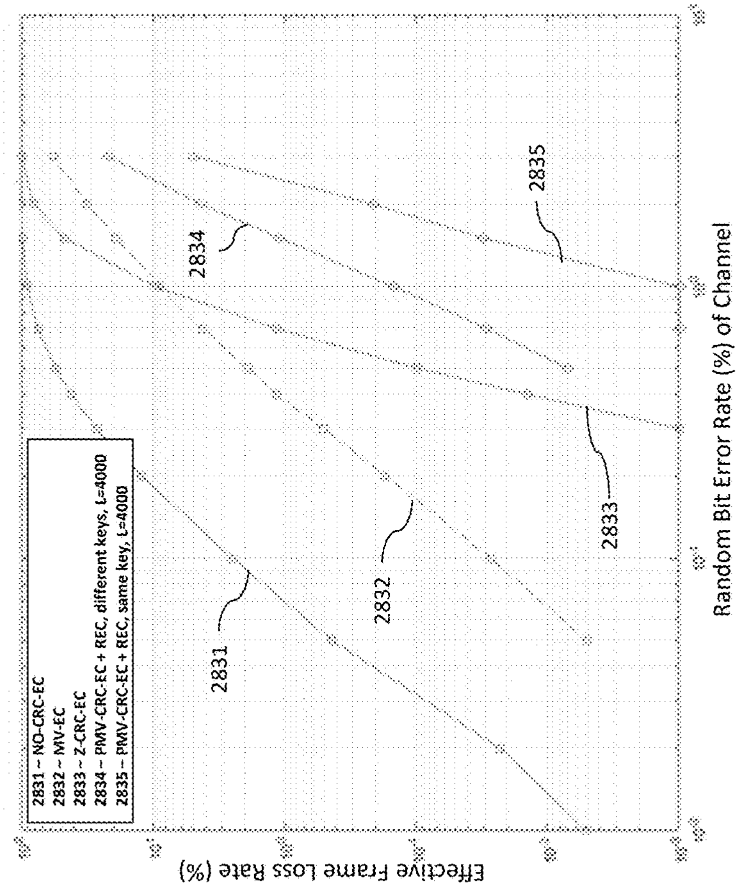

FIG. 28B is a diagram depicting example simulation results of different error correction and/or decoding schemes with 3 transmissions (2 retransmissions) of a bit-stream, for 32 kbps LC3 with 10 ms frames and 10-bit CRC-EC search (N=10). Referring to FIG. 28B, lines 2831, 2832, 2833, 2834, 2835 correspond to simulation results (effective frame loss rate vs random BER (%) of the channel) using configurations of (1) no CRC-EC (NO-CRC-EC), (2) a majority vote-based error correction without CRC-EC (MV-EC), (3) Z-CRC-EC, (4) PMV-CRC-EC plus REC with different keys, L=4000, and (5) PMV-CRC-EC plus REC with the same key, L=4000.

FIG. 28C is a diagram depicting example simulation results of different error correction and/or decoding schemes with 3 transmissions (2 retransmissions) of a bit-stream, for 32 kbps LC3 with 10 ms frames and 10-bit CRC-EC search (N=10). Referring to FIG. 28C, lines 2861, 2862, 2863, 2864, 2865, 2866, 2867 correspond to simulation results (speech quality measured by wideband PESQ vs random BER (%) of the channel) using configurations of (1) zero-fill, (2) PLC, (3) Decode the first bit-stream, (4) Decode majority vote of 3 bit-streams, (5) Z-CRC-EC with the same keys, (6) PMV-CRC-EC plus REC with different keys, and (7) PMV-CRC-EC plus REC with the same key.

In some implementations, audio quality can be measured with ITU-R Recommendation BS.1387 Perceptual Evaluation of Audio Quality (PEAQ), which uses computer software to calculate the Objective Difference Grade (ODG) by analyzing an original audio and a distorted version of the original audios. Table 2 shows scales used in ODG. To evaluate various CRC-EC schemes for LC3 BEC according to some implementations, PEAQ was used to measure audio quality for 48 kHz music and speech. For example, 22 audio test files including 20 stereo music files and 2 mono speech files were used, and the ODG score for each of the LC3 BEC outputs for the 22 audio test files was calculated. The average of these 22 ODG scores for each test condition is presented here (see FIG. 29A, 29C, 30B, for example).

TABLE 2

| ODG Scale | |
|---|---|
| Impairment Description | ODG |
| Imperceptible | 0 |
| Perceptible, but not annoying | −1 |
| Slightly annoying | −2 |
| Annoying | −3 |
| Very annoying | −4 |

Figure 29A:
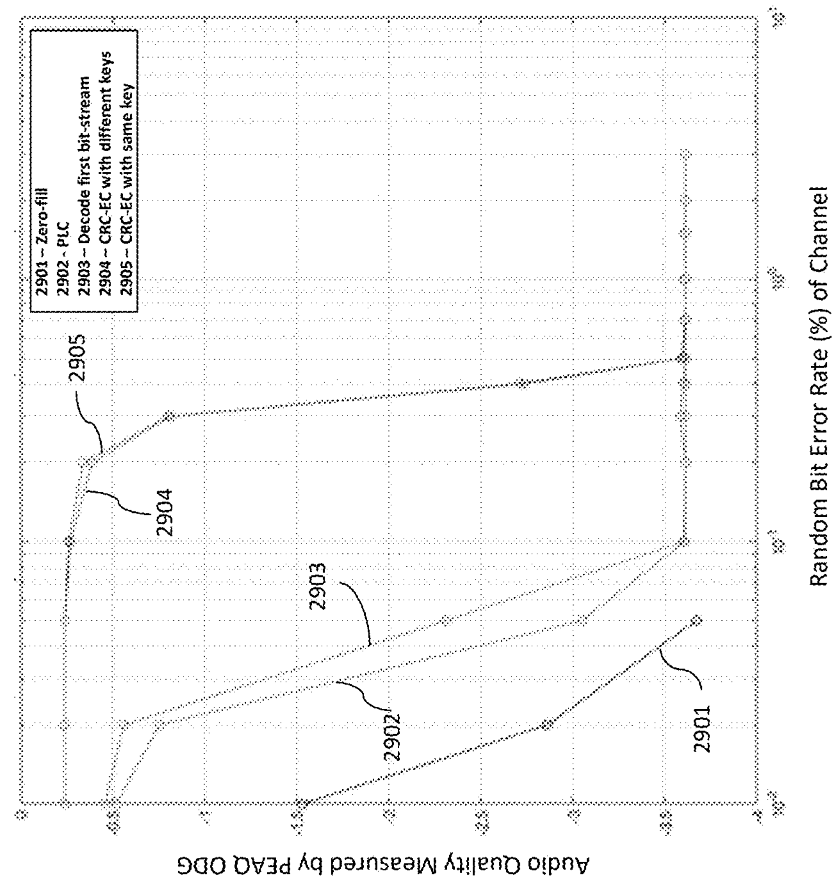
FIG. 29A is a diagram depicting example simulation results of different error correction and/or decoding schemes with 2 transmissions (1 retransmission) of a bit-stream, according to one or more embodiments.

FIG. 29A is a diagram depicting example simulation results of different error correction and/or decoding schemes with 2 transmissions (1 retransmission) of a bit-stream, for 96 kbps/channel LC3 48 kHz music/speech with 10 ms frames and 10-bit CRC-EC search (N=10). Referring to FIG. 29A, lines 2901, 2902, 2903, 2904, 2905 correspond to simulation results (audio quality measured by PEAQ ODG vs random BER (%) of the channel) using configurations of (1) zero-fill, (2) PLC, (3) Decode the first bit-stream, (4) CRC-EC using different keys, and (5) CRC-EC using the same key.

Figure 29C:
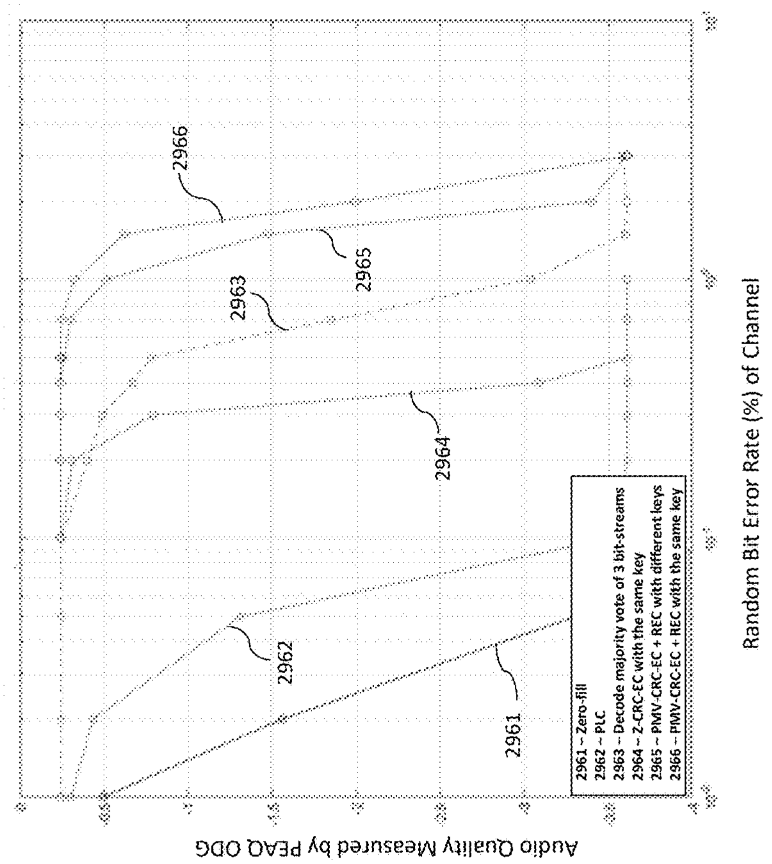
FIG. 29B and FIG. 29C are diagrams depicting example simulation results of different error correction and/or decoding schemes with 3 transmissions (2 retransmissions) of a bit-stream, according to one or more embodiments.
Figure 29B:
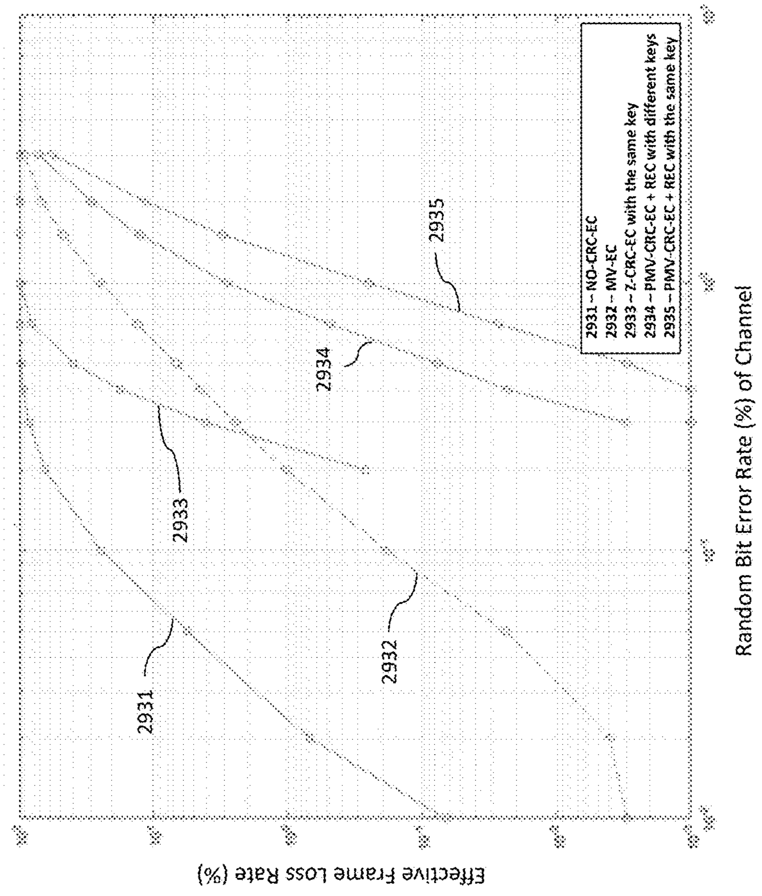

FIG. 29B is a diagram depicting example simulation results of different error correction and/or decoding schemes with 3 transmissions (2 retransmissions) of a bit-stream, for 96 kbps/channel LC3 48 kHz music/speech with 10 ms frames and 10-bit CRC-EC search (N=10). Referring to FIG. 29B, lines 2931, 2932, 2933, 2934, 2935 correspond to simulation results (effective frame loss rate vs random BER (%) of the channel) using configurations of (1) no CRC-EC (NO-CRC-EC), (2) a majority vote-based error correction without CRC-EC (MV-EC), (3) Z-CRC-EC with the same key, (4) PMV-CRC-EC plus REC with different keys, and (5) PMV-CRC-EC plus REC with the same key.

FIG. 29C is a diagram depicting example simulation results of different error correction and/or decoding schemes with 3 transmissions (2 retransmissions) of a bit-stream, for 96 kbps/channel LC3 48 kHz music/speech with 10 ms frames and 10-bit CRC-EC search (N=10). Referring to FIG. 29C, lines 2961, 2962, 2963, 2964, 2965, 2966 correspond to simulation results (audio quality measured by PEAQ ODG vs random BER (%) of the channel) using configurations of (1) zero-fill, (2) PLC, (3) Decode majority vote of 3 bit-streams, (4) Z-CRC-EC with the same key, (5) PMV-CRC-EC plus REC with different keys, and (6) PMV-CRC-EC plus REC with same key.

Figure 30B:
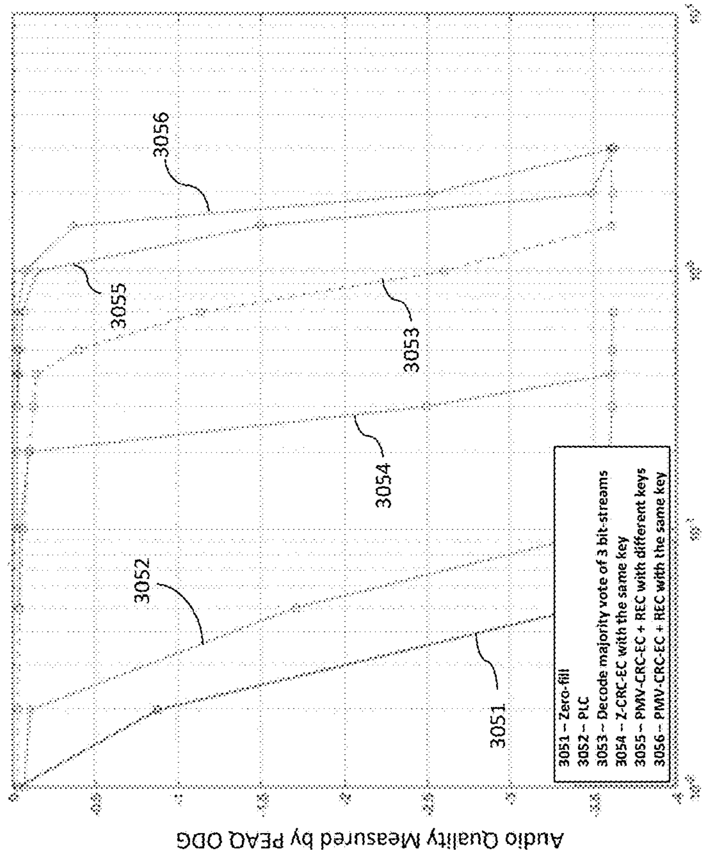
FIG. 30A and FIG. 30B are diagrams depicting example simulation results of different error correction and/or decoding schemes with 3 transmissions (2 retransmissions) of a bit-stream, according to one or more embodiments.
Figure 30A:
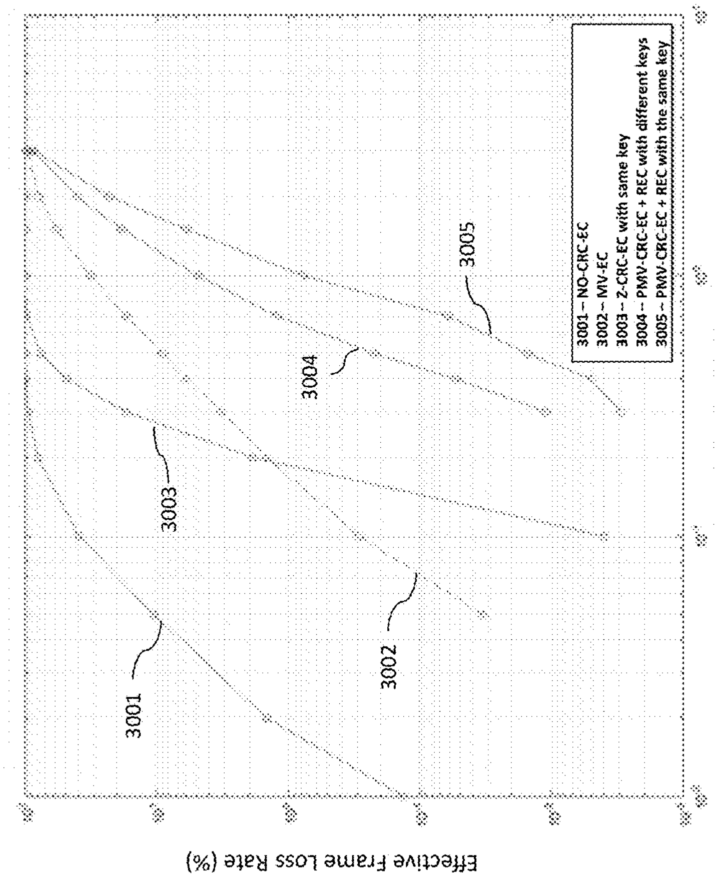

FIG. 30A is a diagram depicting example simulation results of different error correction and/or decoding schemes with 3 transmissions (2 retransmissions) of a bit-stream, for 128 kbps LC3 with 10 ms frames and 10-bit CRC-EC search (N=10). Referring to FIG. 30A, lines 3001, 3002, 3003, 3004, 3005 correspond to simulation results (effective frame loss rate vs random BER (%) of the channel) using configurations of (1) no CRC-EC (NO-CRC-EC), (2) a majority vote-based error correction without CRC-EC (MV-EC), (3) Z-CRC-EC with the same key, (4) PMV-CRC-EC plus REC with different keys, and (5) PMV-CRC-EC plus REC with the same key.

FIG. 30B is a diagram depicting example simulation results of different error correction and/or decoding schemes with 3 transmissions (2 retransmissions) of a bit-stream, for 128 kbps LC3 with 10 ms frames and 10-bit CRC-EC search (N=10). Referring to FIG. 30B, lines 3051, 3052, 3053, 3054, 3055, 3056 correspond to simulation results (audio quality measured by PEAQ ODG vs random BER (%) of the channel) using configurations of (1) zero-fill, (2) PLC, (3) Decode majority vote of 3 bit-streams, (4) Z-CRC-EC with the same key, (5) PMV-CRC-EC plus REC with different keys, and (6) PMV-CRC-EC plus REC with the same key.

In some implementations, post-majority-vote correction schemes may increase complexity, depending on choice of L. In some implementations, CRC syndromes can be stored in a CRC syndrome table. The CRC syndrome table can have 320+24 to 1280+24 entries of 24-bit CRC syndromes for 32 kbps to 128 kbps LC3. In some implementations, the CRC syndrome table can be pre-calculated because the LC3 (encoding) bit-rate is not expected to change in the middle of a session. In some implementations, if the LC3 bit-rate or payload size changes on the fly, only those few needed CRC syndromes can be calculated. For example, if a new payload size does not change for a while, the CRC syndrome table can be re-calculated in the background and/or CRC-EC can be paused for a few packets to complete the table calculation. In some implementations, the system can "mix and match" the error correction techniques (including CRC-EC or error correction techniques that do not use CRC) according to some embodiments. In some implementations, the system can use all applicable techniques or use only some of them so that when all applicable techniques are used, the system can achieve a maximum audio quality improvement.

Embodiments in the present disclosure have at least the following advantages and benefits. Embodiments in the present disclosure can provide enhanced CRC-EC techniques that achieve huge improvement to output an audio quality that is a day-and-night difference when applied to some reference conditions. For example, for a condition of 32 kbps LC3 for 16 kHz wideband speech, the enhanced CRC-EC schemes according to some implementations can maintain a good speech quality at bit error rates of 0.5% and 2% for 1 and 2 retransmissions, respectively. For a condition of 96 kbps/channel LC3 for 48 kHz music/speech, the enhanced CRC-EC schemes according to some implementations can maintain a good audio quality at bit error rates of 0.2% and 1% for 1 and 2 retransmissions, respectively. The enhanced CRC-EC schemes according to some implementations can potentially be used to improve CRC-based multiple transmissions of other codec data or general non-codec data.

Figure 31:
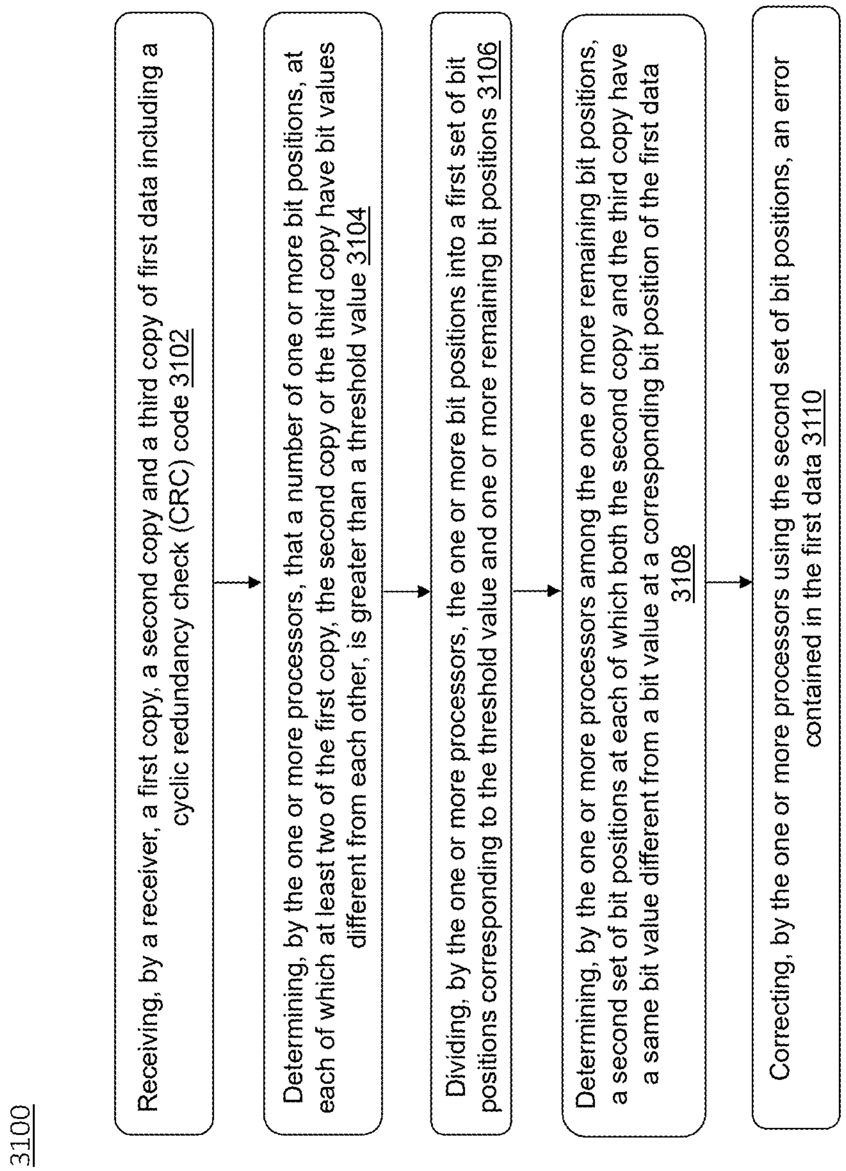
FIG. 31 is a flow diagram showing a process for performing CRC-EC on three bit-streams using a majority vote, in accordance with an embodiment.

FIG. 31 is a flow diagram showing a process 3100 for performing CRC-EC (e.g., PMV-CRC-EC) on three bit-streams using a majority vote, in accordance with an embodiment. In some implementations, the process 3100 is performed by one or more processors of a device (e.g. processor 2010 of communication system 108) and/or a receiver of the device (e.g., receiver circuitry 140 of communication system 108). In other embodiments, the process 3100 is performed by other entities (e.g., a computing system other than the communication system 108). In some implementations, the process 3100 includes more, fewer, or different steps than shown in FIG. 31.

At step 3102, the receiver may receive a first copy, a second copy and a third copy of first data including a cyclic redundancy check (CRC) code.

For example, suppose the transmitter transmits a bit-stream with 320 bits of payload and 24 bits of CRC code for a total of 344 bits. If none of the bits are in error, then the CRC check (i.e., dividing the 344 bits by the generator polynomial G(x)) can generate a CRC remainder of 0, and the bit-stream can pass the CRC check. If there are one or more bit errors, then the CRC remainder of the long division can be an XOR sum of the CRC syndromes of all the bit error positions.

At step 3104, the one or more processors may determine that a number of one or more bit positions (e.g., D=12 bits), at each of which at least two of the first copy, the second copy or the third copy have bit values different from each other (e.g., D bit positions in which the first copy, the second copy and the third copy have different values), is greater than a threshold value (e.g., N=10 bits).

At step 3106, the one or more processors may divide the one or more bit positions (e.g., D=12 bits) into a first set of bit positions (e.g., N=10 bits) corresponding to the threshold value and one or more remaining bit positions (e.g., (D−N) =2 remaining bits).

For example, suppose N=10 and there are 12 potential bit error positions. For simplicity, it is assumed that the 12 potential bit error positions are at bit positions 10, 20, 30, 40, . . . , 90, 100, 110, and 120. Then, the XOR sum of the CRC syndromes of those bit errors (not necessarily all 12) among these 12 bit positions can be equal to the CRC remainder the CRC hardware calculated based on the received 344 bits (referred to as "CRC remainder 1"). The goal in the PMV-CRC-EC scheme is to find a combination of bit error positions among these 12 positions such that the XOR sum of the CRC syndromes corresponding to these bit error positions equals "CRC remainder 1."

At step 3108, the one or more processors may determine, among the one or more remaining bit positions, a second set of bit positions at each of which both the second copy and the third copy have a same bit value different from a bit value at a corresponding bit position of the first copy (e.g., the second set of bit positions among the 2 remaining bits to be flipped based on the majority vote result).

At step 3110, the one or more processors may correct, using the second set of bit positions, an error contained in the first copy. In some implementations, in correcting the error contained in the first copy, the one or more processors may perform a bit flip on the first copy at the second set of bit positions (e.g., perform a bit flip on the first copy among the 2 remaining bits according to the majority vote result).

For example, since (D=12)>(N=10), the system can perform the majority vote for bit positions 110 and 120. Suppose that both bit positions 110 and 120 are in error; that the majority vote can correct both bit errors at bit positions 110 and 120; and that the system can flip the bit values of positions 110 and 120 in the first bit-stream. Then, the system may need to account for the bit-flipping by starting with a CRC state of 0 and do XOR between this initial CRC state of 0 and the two CRC syndromes for bit positions 110 and 120 to obtain a result CRC state (referred to as "CRC state 1").

In some implementations, the one or more processors may calculate a CRC remainder (e.g., "CRC remainder 1") using the first copy. The one or more processors may calculate a first sum (e.g., "CRC state 1") of one or more CRC syndromes at the second set of bit positions. The one or more processors may determine one or more error positions (e.g., a solution of PMV-CRC-EC) in the first set of bit positions (e.g., N bit positions) using the CRC remainder (e.g., "CRC remainder 1") and the first sum (e.g., "CRC state 1"). In some implementations, the one or more processors may perform a bit flip on the first copy at the one or more error positions in the first set of bit positions (e.g., perform a bit flip on the first copy according to the solution found).

For example, the system can start with "the CRC state 1" as the initial CRC state for the 10-bit CRC-EC search through $(2^{10}-1)=1023$ combinations of the remaining 10 bit positions 10, 20, . . . , 100. In each of the 1023 combinations of 0s and 1s for these 10 bit positions (e.g., a subset of the 10 bit positions in which each bit of the subset indicates a value of 1), at least one bit position can have a value of 1. For each of the 1023 combinations, the system can start with the CRC state 1 and do XOR sum between the CRC state 1 and the CRC syndromes of all the bit positions with a value of 1 in this combination (e.g., the CRC syndromes corresponding to the subset of the 10 bit positions) to obtain a result CRC state (referred to as "CRC state 2" for that combination). If any of the 1023 bit position combinations gives the CRC state 2 that is equal to the CRC remainder 1 that the CRC hardware calculated for the first received bit-stream of 344 bits, then the system can determine that the PMV-CRC-EC scheme has found a solution, because the scheme has found all bit error positions where the XOR sum of the corresponding CRC syndromes equals the CRC remainder 1 produced by the CRC hardware. Now, the system can just flip the bits among the first 10 possible bit error positions where the "winning combination" has a bit value of 1.

In some implementations, in determining the one or more error positions (e.g., a solution of PMV-CRC-EC) in the first set of bit positions (e.g., N bit positions), the one or more processors may determine a second sum of one or more CRC syndromes corresponding to a subset of the first set of bit positions. The one or more processors may determine that the CRC remainder (e.g., "CRC remainder 1") equals a third sum (e.g., "CRC state 2") of (1) the first sum (e.g., "CRC state 1") and (2) the second sum. The one or more processors may determine that the one or more error positions are the subset of the first set of bit positions (e.g., the solution of PMV-CRC-EC is a subset of N bit positions). The subset of the first set of bit positions may include at least one bit position (e.g., the solution is not a set of bits having all 0s). Each of the first sum, the second sum and the third sum may be an exclusive OR (XOR) sum.

In some implementations, the one or more processors may calculate a CRC remainder (e.g., "CRC remainder 1") using the first copy. The one or more processors may determine all subsets of the first set of bit positions (e.g., all potential or candidate solutions that make the "CRC state 2" equal to "CRC remainder 1") such that the CRC remainder equals a sum (e.g., "CRC state 2") of (1) one or more CRC syndromes at the second set of bit positions (e.g., "CRC state 1") and (2) one or more CRC syndromes corresponding to each of the all subsets of the first set of bit positions. The one or more processors may determine that the all subsets are a single subset of the first set of bit positions (e.g., correct the first copy using the solution only if the number of potential solutions is 1). The one or more processors may perform a bit flip on the first copy at one or more bit positions corresponding to the single subset. In some implementations, each of the all subsets of the first set of bit positions may include at least one bit position (e.g., each of potential or candidate solutions is not a set of bits having all 0s). In some implementations, the sum may be an exclusive OR (XOR) sum.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It should be noted that certain passages of this disclosure can reference terms such as "first" and "second" in connection with subsets of transmit spatial streams, sounding frames, response, and devices, for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., STAs, APs, beamformers and/or beamformees) that can operate within a system or environment. It should be understood that the systems described above can provide multiple ones of any or each of those components and these components can be provided on either a standalone machine or, In some implementations, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

I claim:

1. An apparatus comprising:

a receiver configured to receive a first copy, a second copy and a third copy of first data including a cyclic redundancy check (CRC) code; and one or more processors configured to:

determine that a number of one or more bit positions, at each of which at least two of the first copy, the second copy or the third copy have bit values different from each other, is greater than a threshold value, wherein the threshold value indicates a number of candidate bit error positions;

divide the one or more bit positions into a first set of bit positions corresponding to the threshold value and one or more remaining bit positions;

determine, among the one or more remaining bit positions, a second set of bit positions at each of which both the second copy and the third copy have a same bit value different from a bit value at a corresponding bit position of the first copy; and correct, using the second set of bit positions, an error contained in the first copy.

2. The apparatus of claim 1, wherein in correcting the error contained in the first copy, the one or more processors are configured to:

perform a bit flip on the first copy at the second set of bit positions.

3. The apparatus of claim 1, wherein the one or more processors are configured to:

calculate a CRC remainder using the first copy;

calculate a first sum of one or more CRC syndromes at the second set of bit positions; and determine one or more error positions in the first set of bit positions using the CRC remainder and the first sum.

4. The apparatus of claim 3, wherein the one or more processors are configured to:

perform a bit flip on the first copy at the one or more error positions in the first set of bit positions.

5. The apparatus of claim 3, wherein in determining the one or more error positions in the first set of bit positions, the one or more processors are configured to:

determine a second sum of one or more CRC syndromes corresponding to a subset of the first set of bit positions;

determine that the CRC remainder equals a third sum of (1) the first sum and (2) the second sum; and determine that the one or more error positions are the subset of the first set of bit positions.

6. The apparatus of claim 5, wherein the subset of the first set of bit positions includes at least one bit position.

7. The apparatus of claim 5, wherein each of the first sum, the second sum and the third sum is an exclusive OR (XOR) sum.

8. The apparatus of claim 1, wherein the one or more processors are configured to:

calculate a CRC remainder using the first copy;

determine all subsets of the first set of bit positions such that the CRC remainder equals a sum of (1) one or more CRC syndromes at the second set of bit positions and (2) one or more CRC syndromes corresponding to each of the all subsets of the first set of bit positions;

determine that the all subsets are a single subset of the first set of bit positions; and perform a bit flip on the first copy at one or more bit positions corresponding to the single subset.

9. The apparatus of claim 8, wherein each of the all subsets of the first set of bit positions includes at least one bit position.

10. The apparatus of claim 8, wherein the sum is an exclusive OR (XOR) sum.

11. A method comprising:

receiving, by a receiver, a first copy, a second copy and a third copy of first data including a cyclic redundancy check (CRC) code;

determining, by one or more processors, that a number of one or more bit positions, at each of which at least two of the first copy, the second copy or the third copy have bit values different from each other, is greater than a threshold value, wherein the threshold value indicates a number of candidate bit error positions;

dividing, by the one or more processors, the one or more bit positions into a first set of bit positions corresponding to the threshold value and one or more remaining bit positions;

determining, by the one or more processors among the one or more remaining bit positions, a second set of bit positions at each of which both the second copy and the third copy have a same bit value different from a bit value at a corresponding bit position of the first copy; and correcting, by the one or more processors using the second set of bit positions, an error contained in the first copy.

12. The method of claim 11, wherein correcting the error contained in the first copy comprises:

performing a bit flip on the first copy at the second set of bit positions.

13. The method of claim 11, further comprising:

calculating a CRC remainder using the first copy;

calculating a first sum of one or more CRC syndromes at the second set of bit positions; and determining one or more error positions in the first set of bit positions using the CRC remainder and the first sum.

14. The method of claim 13, further comprising:

performing a bit flip on the first copy at the one or more error positions in the first set of bit positions.

15. The method of claim 13, wherein determining the one or more error positions in the first set of bit positions comprises:

determining a second sum of one or more CRC syndromes corresponding to a subset of the first set of bit positions;

determining that the CRC remainder equals a third sum of (1) the first sum and (2) the second sum; and determining that the one or more error positions are the subset of the first set of bit positions.

16. The method of claim 15, wherein the subset of the first set of bit positions includes at least one bit position.

17. The method of claim 15, wherein each of the first sum, the second sum and the third sum is an exclusive OR (XOR) sum.

18. The method of claim 11, further comprising:

calculating a CRC remainder using the first copy;

determining all subsets of the first set of bit positions such that the CRC remainder equals a sum of (1) one or more CRC syndromes at the second set of bit positions and (2) one or more CRC syndromes corresponding to each of the all subsets of the first set of bit positions;

determining that the all subsets are a single subset of the first set of bit positions; and performing a bit flip on the first copy at one or more bit positions corresponding to the single subset.

19. The method of claim 18, wherein each of the all subsets of the first set of bit positions includes at least one bit position.

20. The method of claim 18, wherein the sum is an exclusive OR (XOR) sum.

* * * * *